Dec. 24, 1940.  J. P. BENOIT ET AL  2,225,898
HYDRAULIC MACHINE FOR MOLDING GLASS ARTICLES
Filed Jan. 14, 1937  34 Sheets-Sheet 6
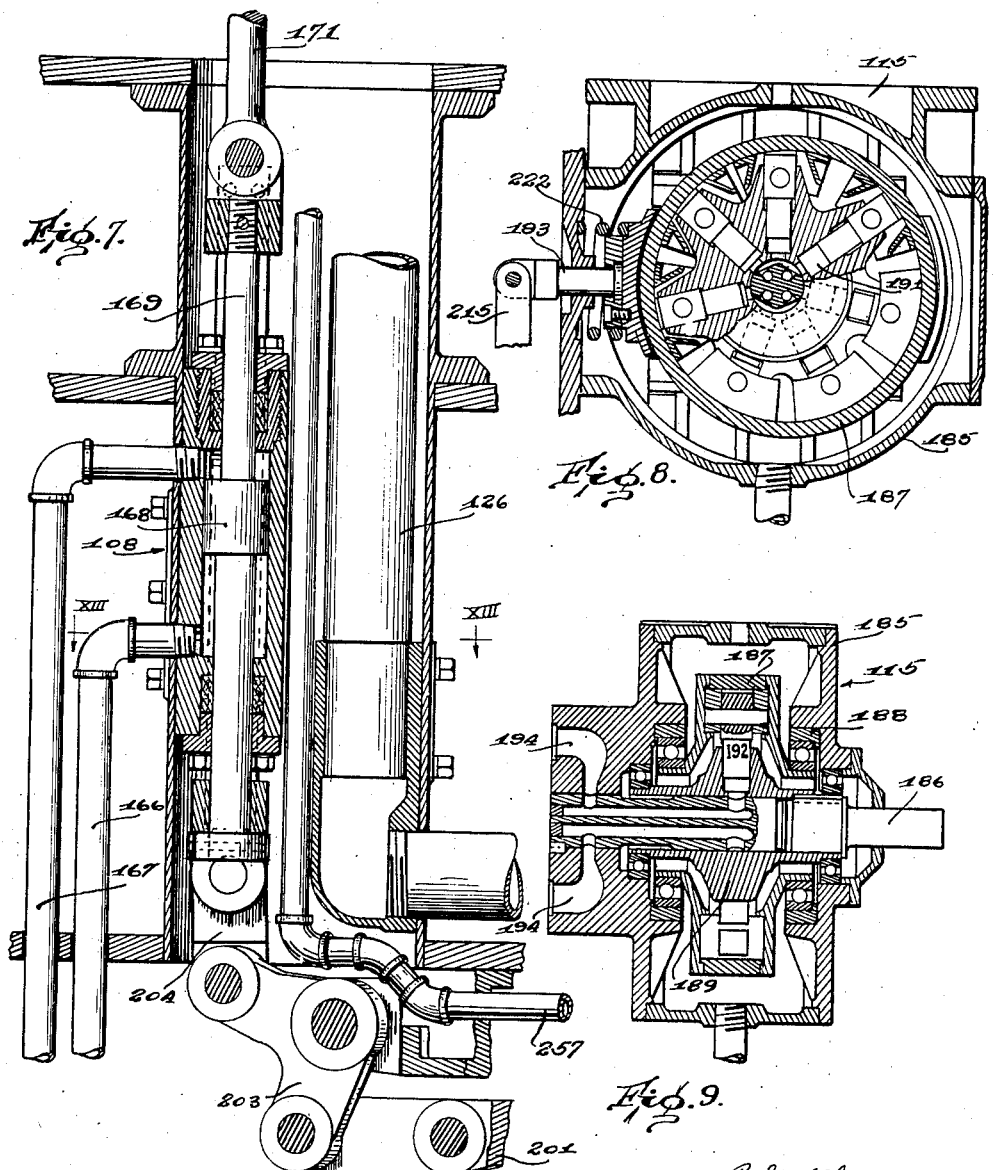
R. G. Allen
J. P. Benoit
C. C. Kinker
H. A. Rohrwick
C. W. Schreiber
INVENTORS
BY Rule & Hoge
ATTORNEYS.

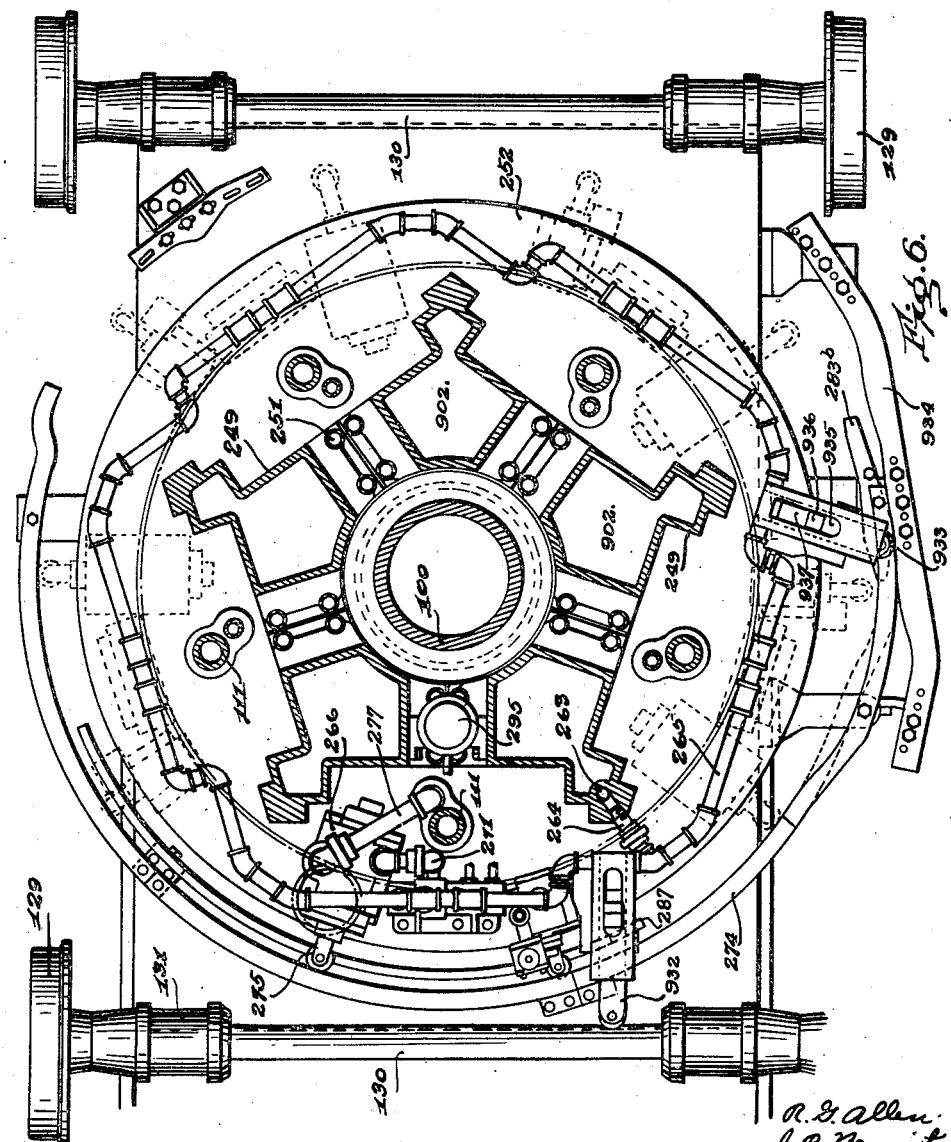

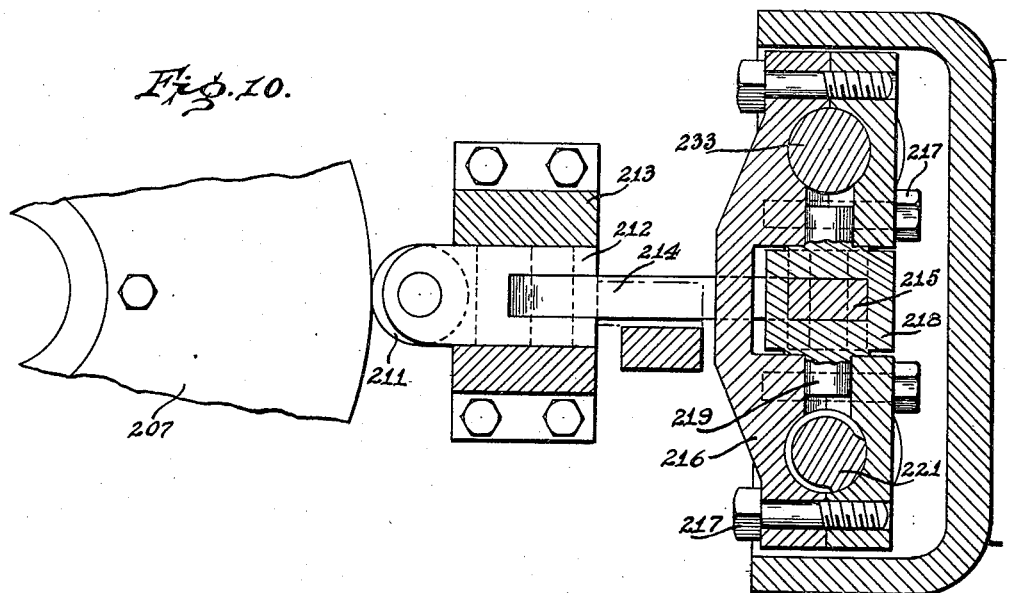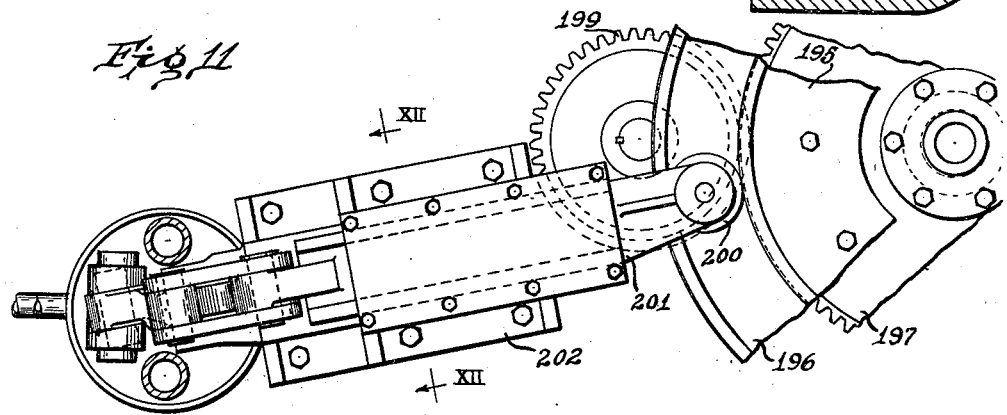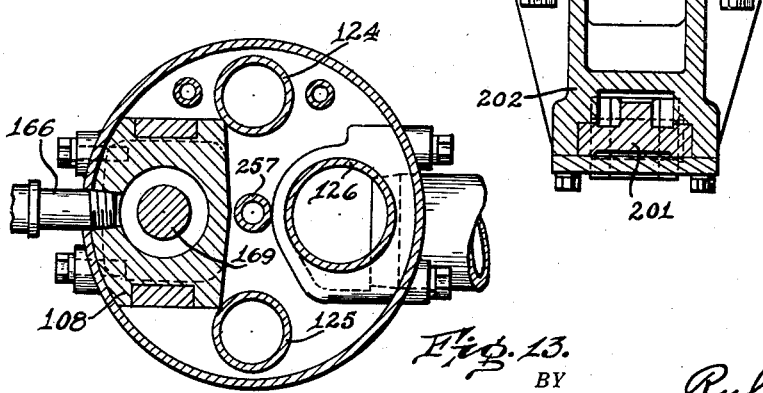

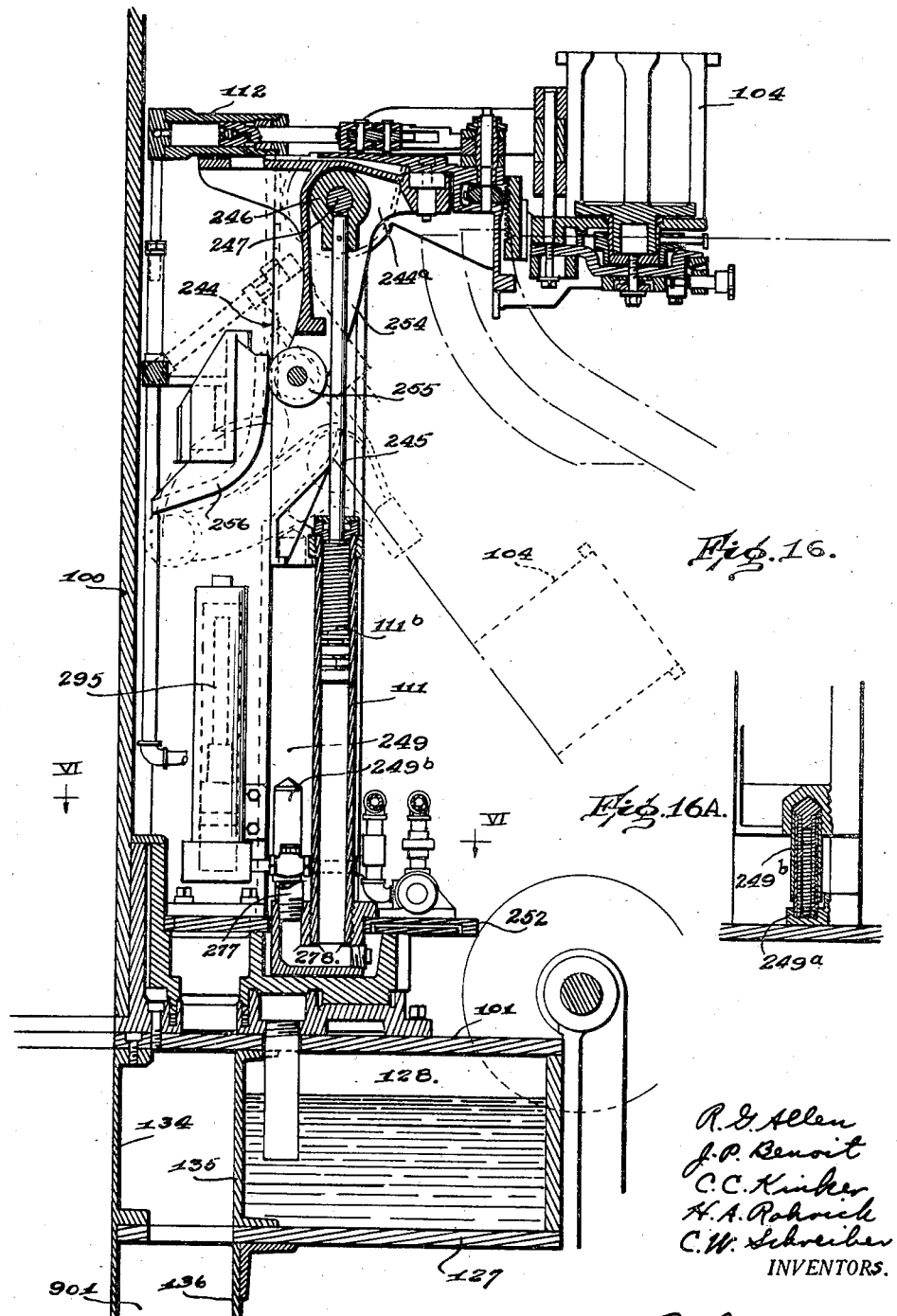

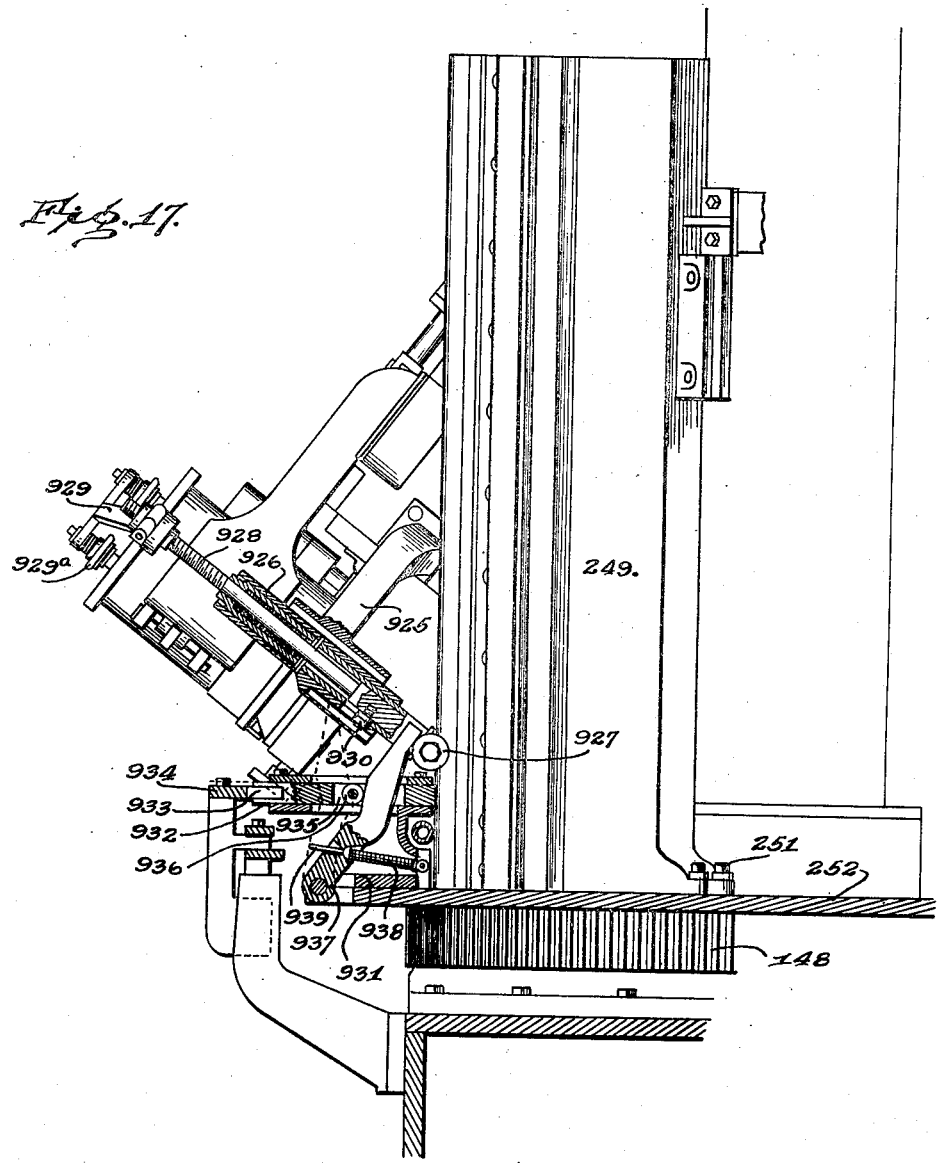

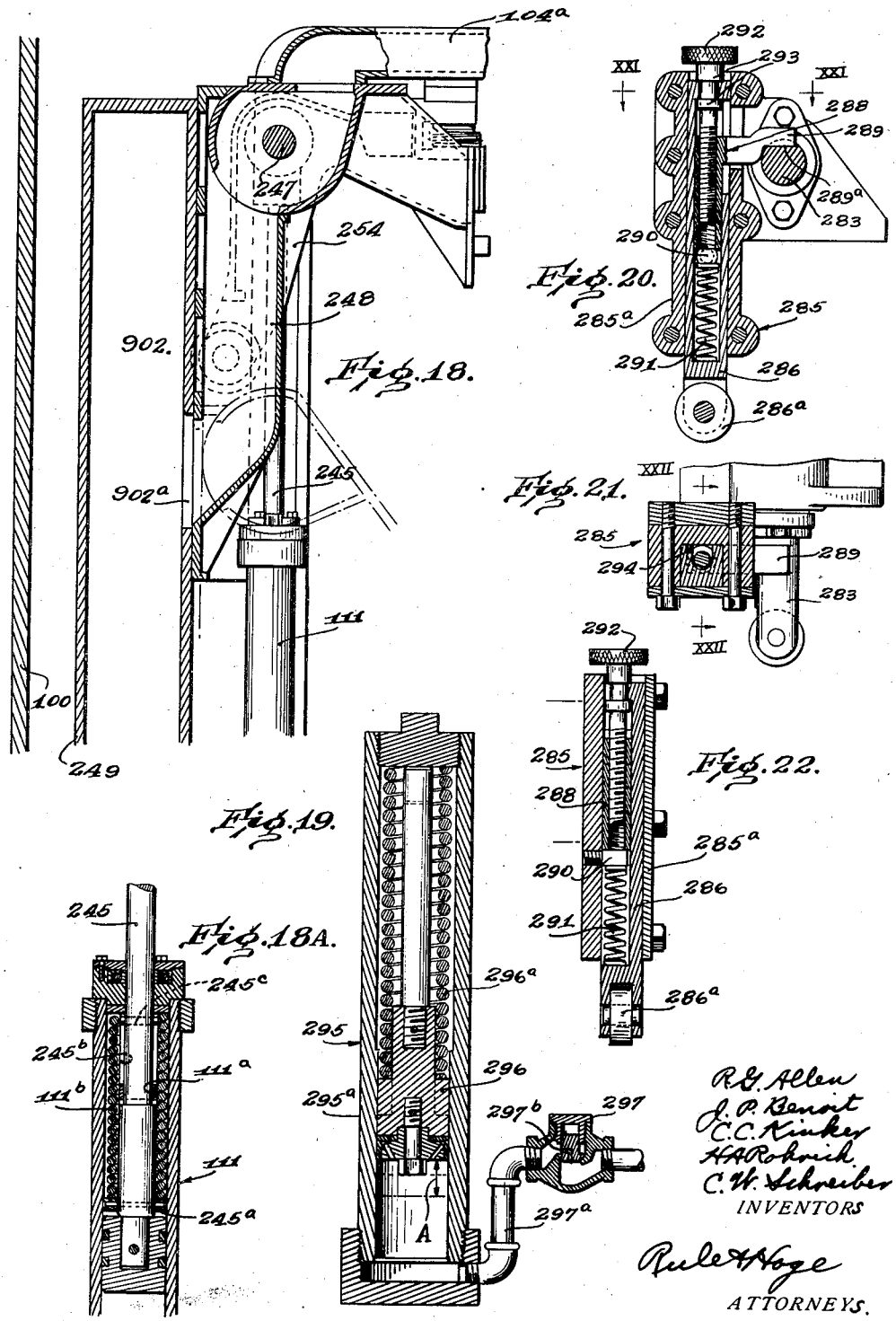

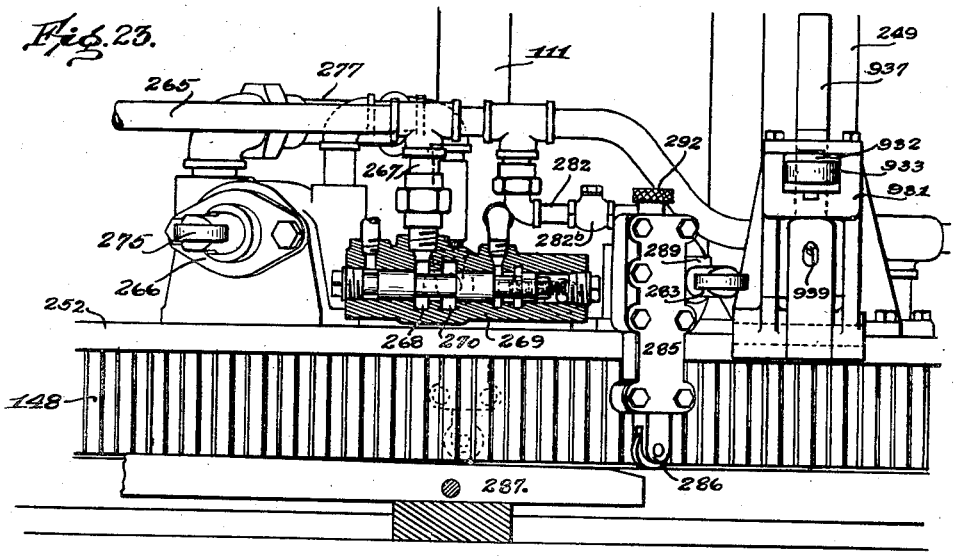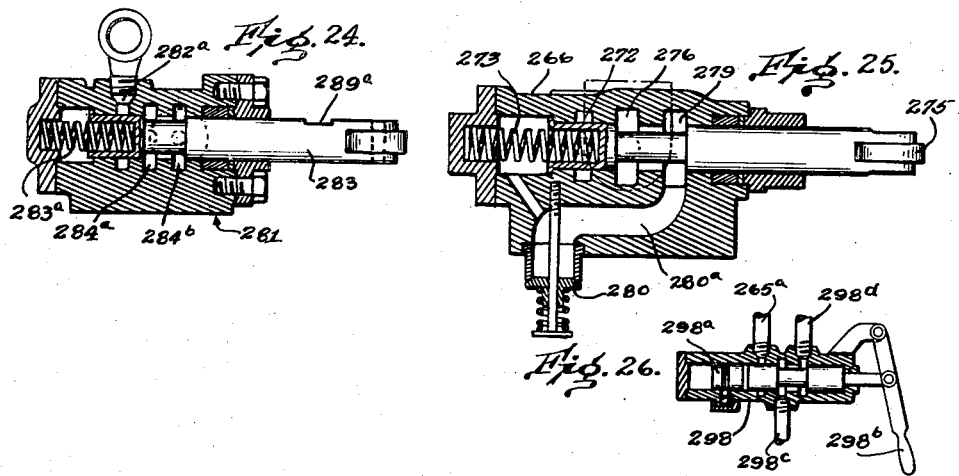

R. G. Allen
J. P. Benoit
C. C. Kniker
H. A. Rohrwick
C. W. Schreiber
INVENTORS

BY Rule & Hoge
ATTORNEYS.

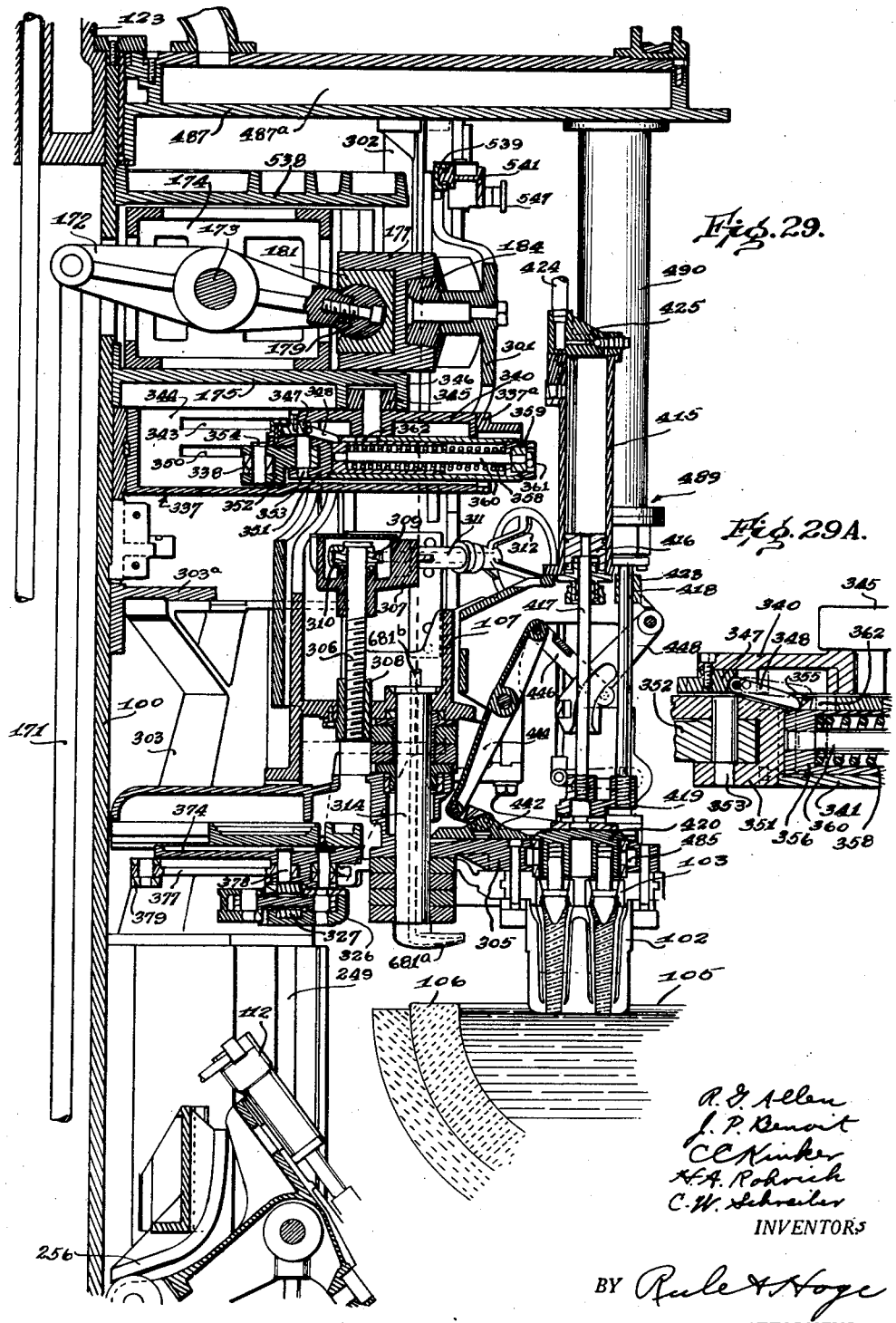

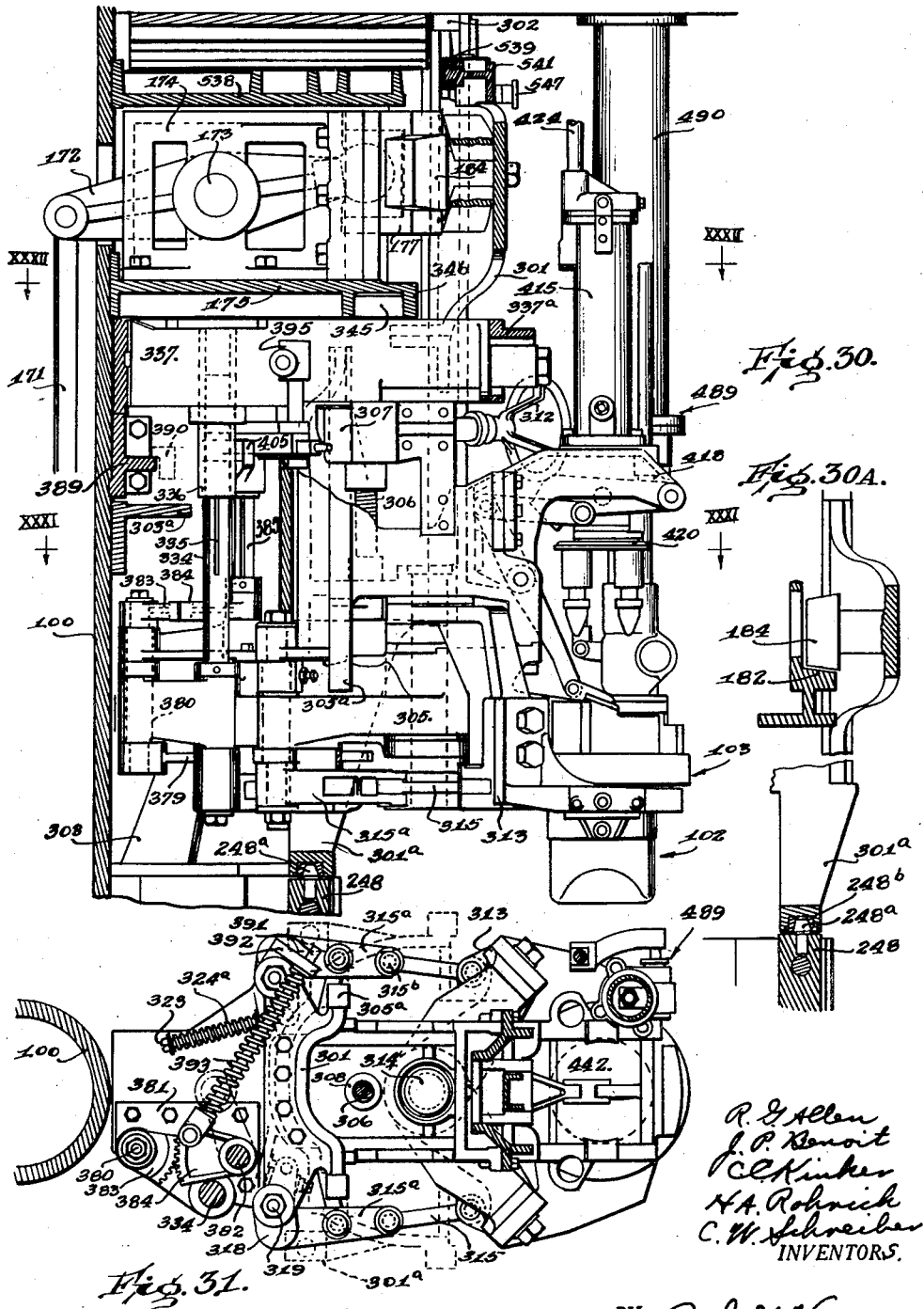

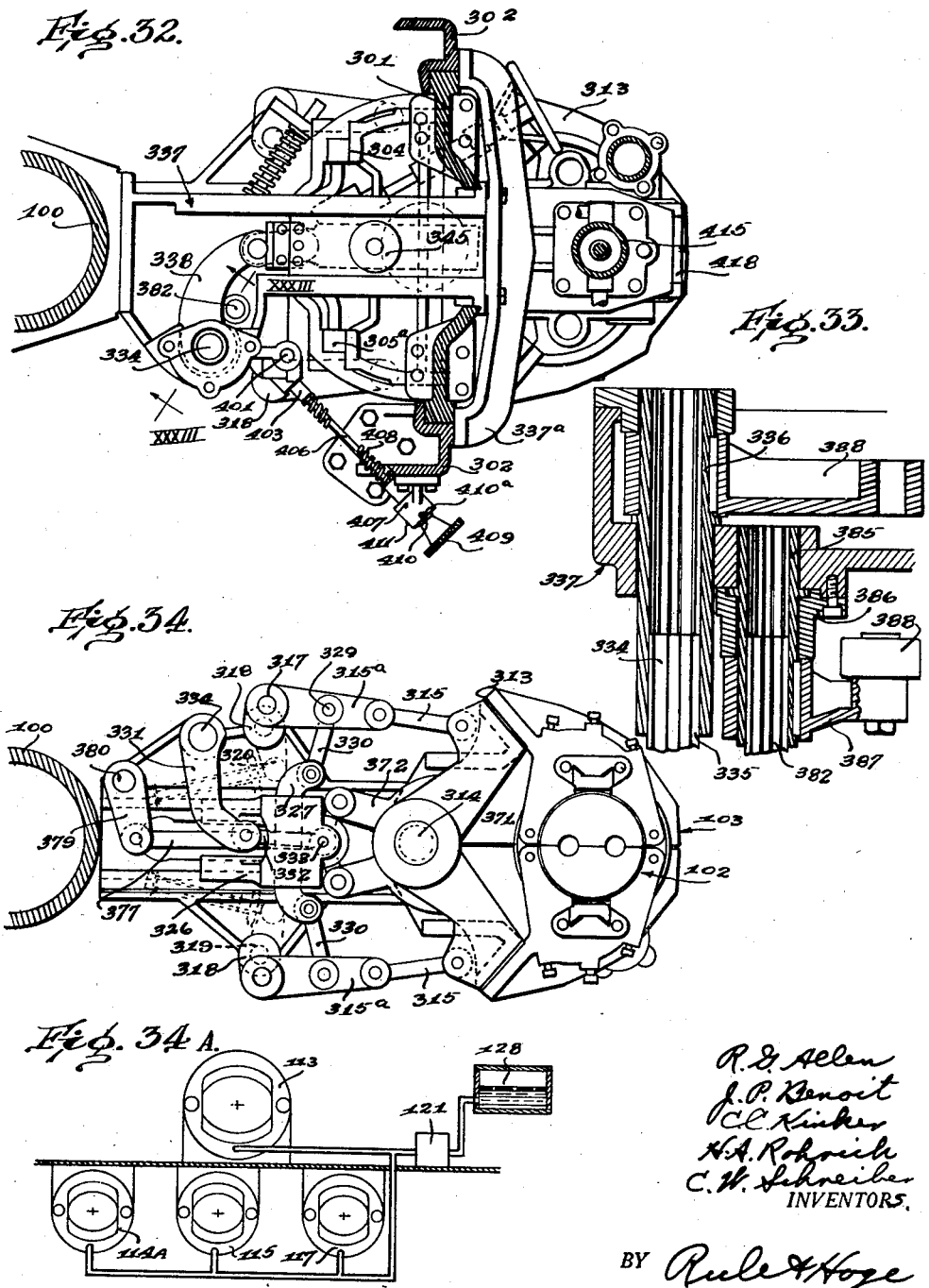

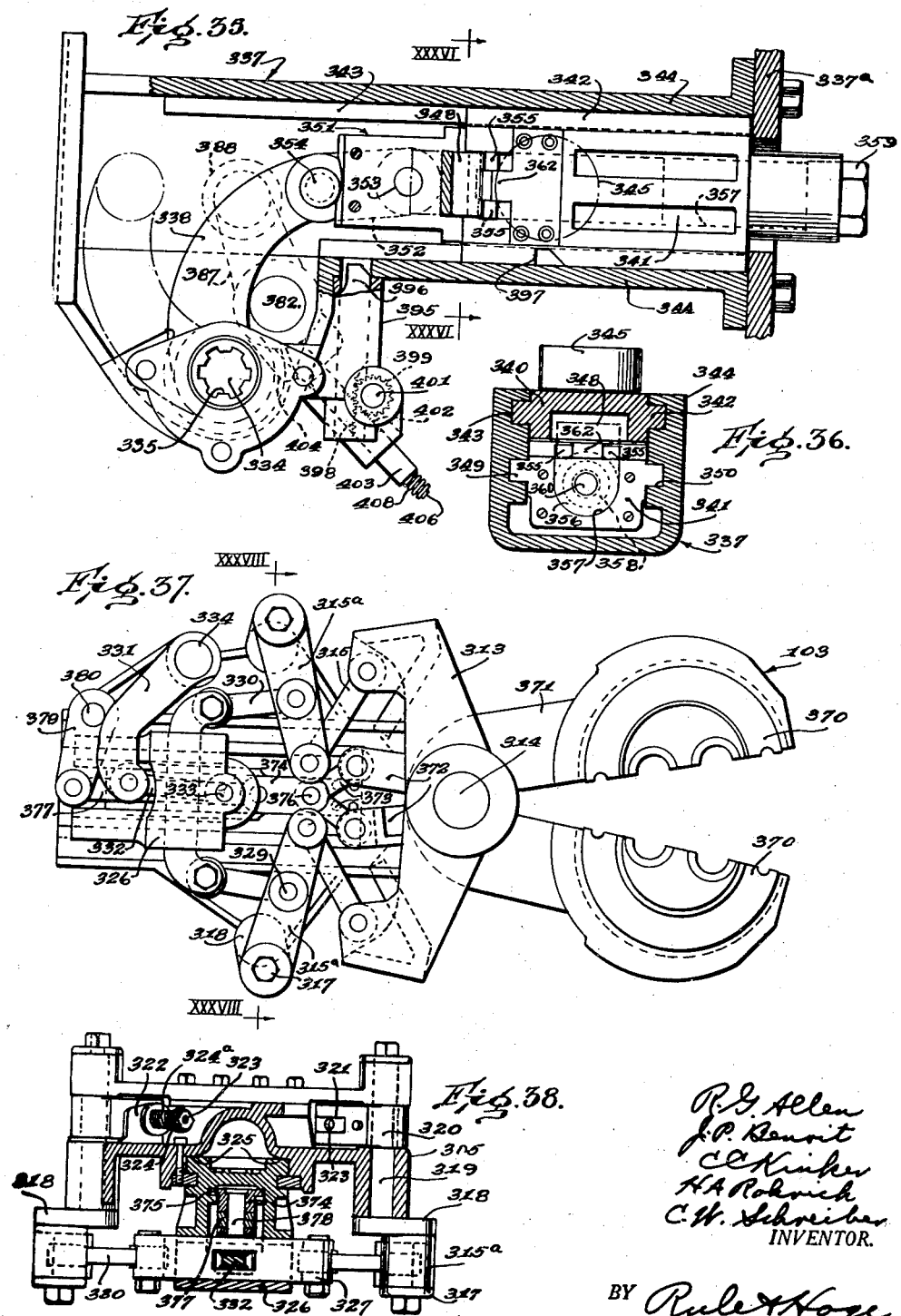

Dec. 24, 1940.  J. P. BENOIT ET AL  2,225,898
HYDRAULIC MACHINE FOR MOLDING GLASS ARTICLES
Filed Jan. 14, 1937   34 Sheets-Sheet 18
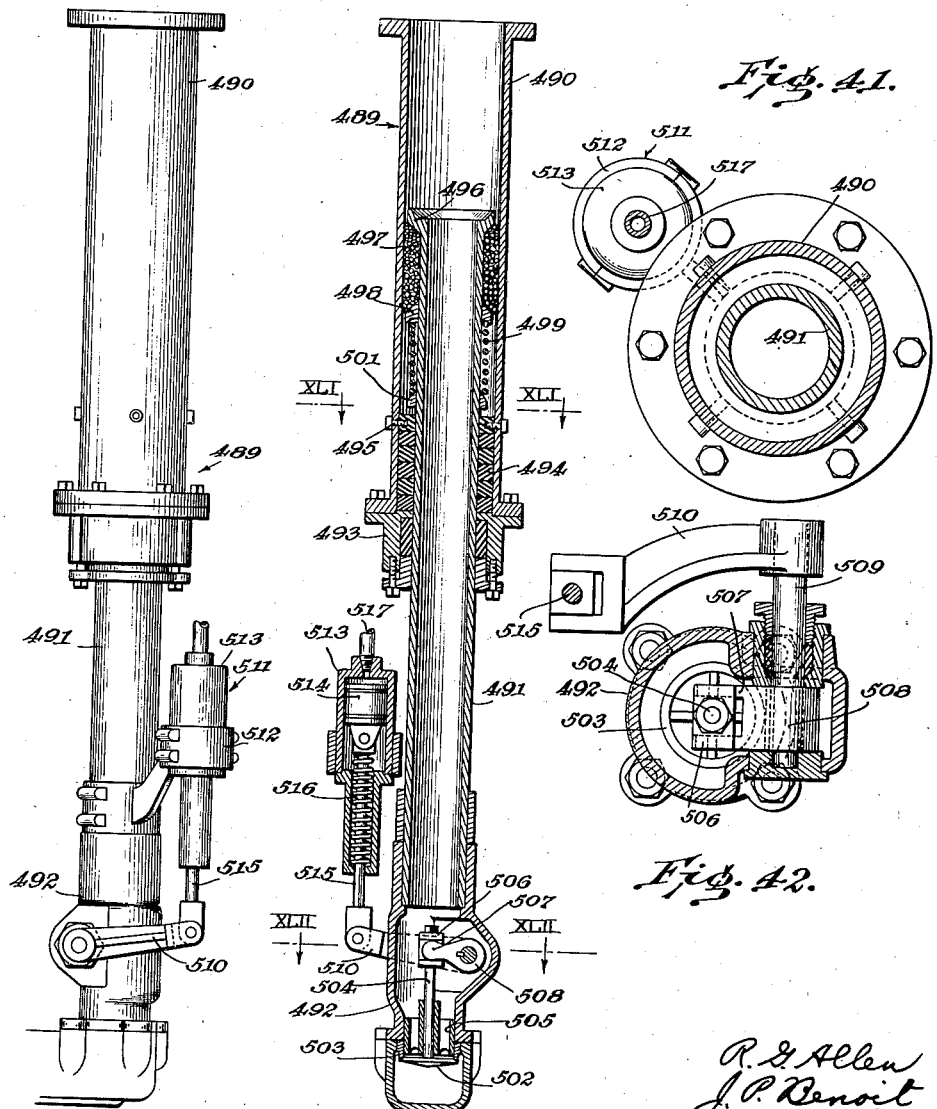
R. G. Allen
J. P. Benoit
C. C. Kinker
H. A. Rohrich
C. W. Schreiber
INVENTORS
BY Rule & Hoge
ATTORNEYS

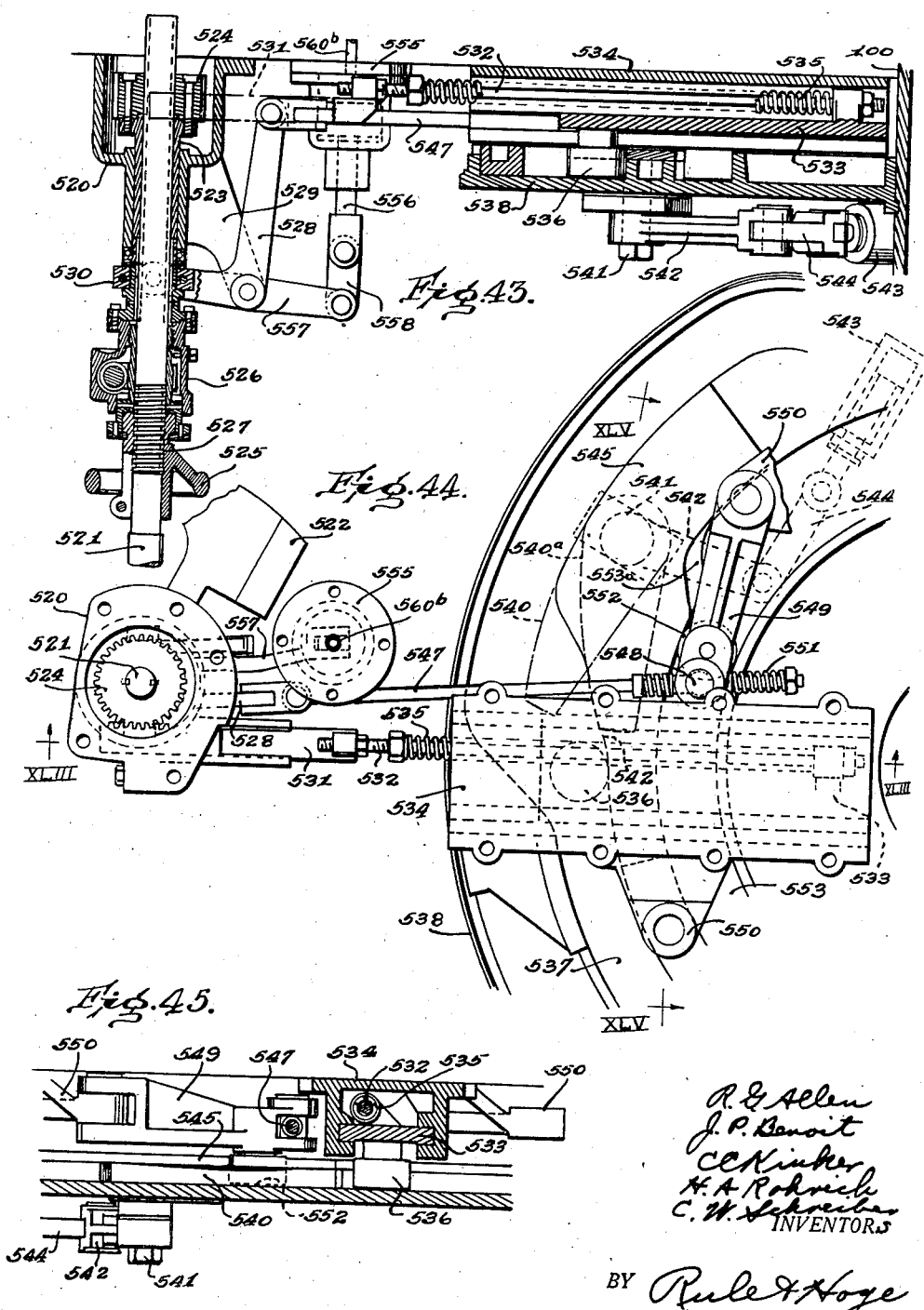

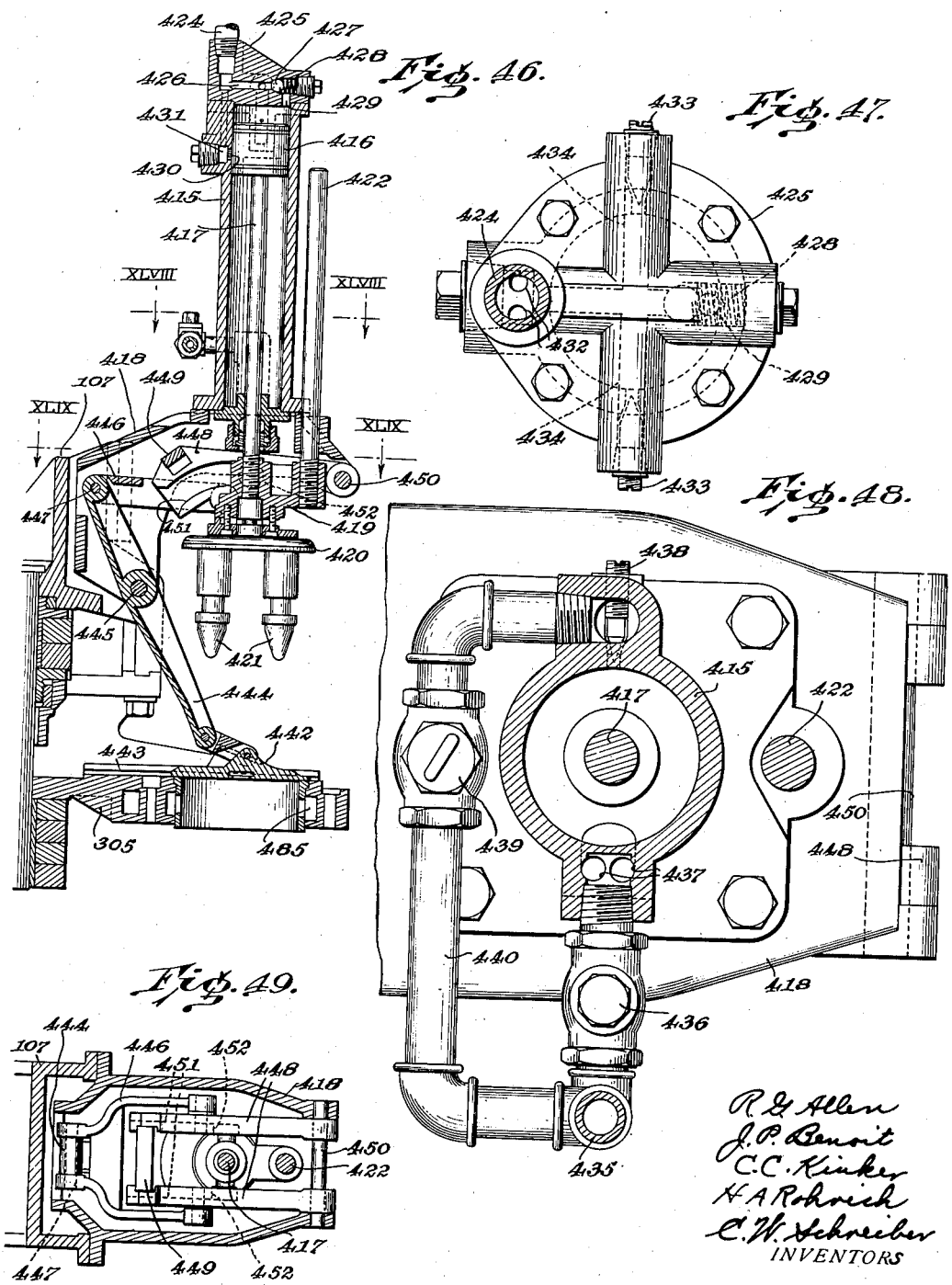

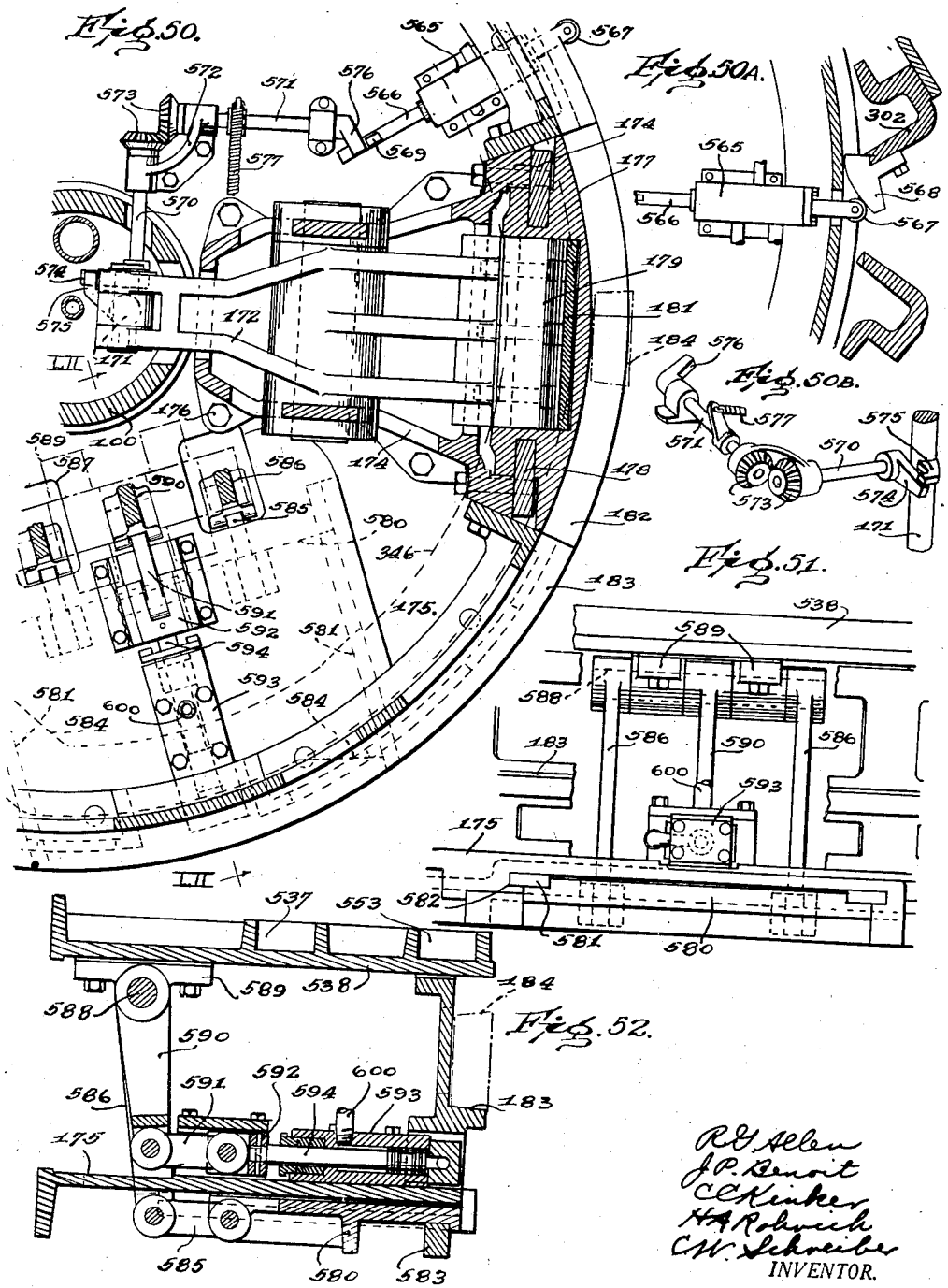

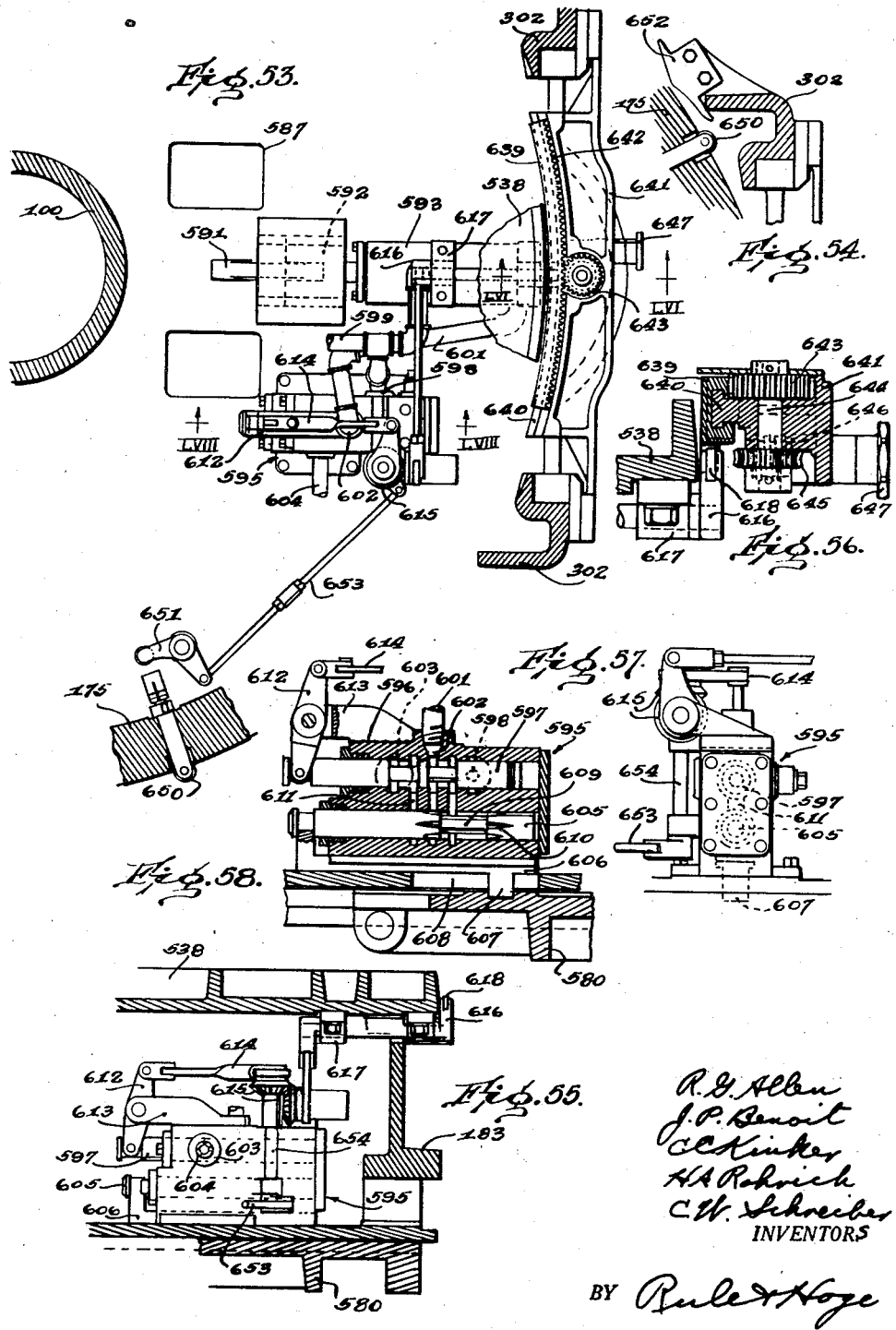

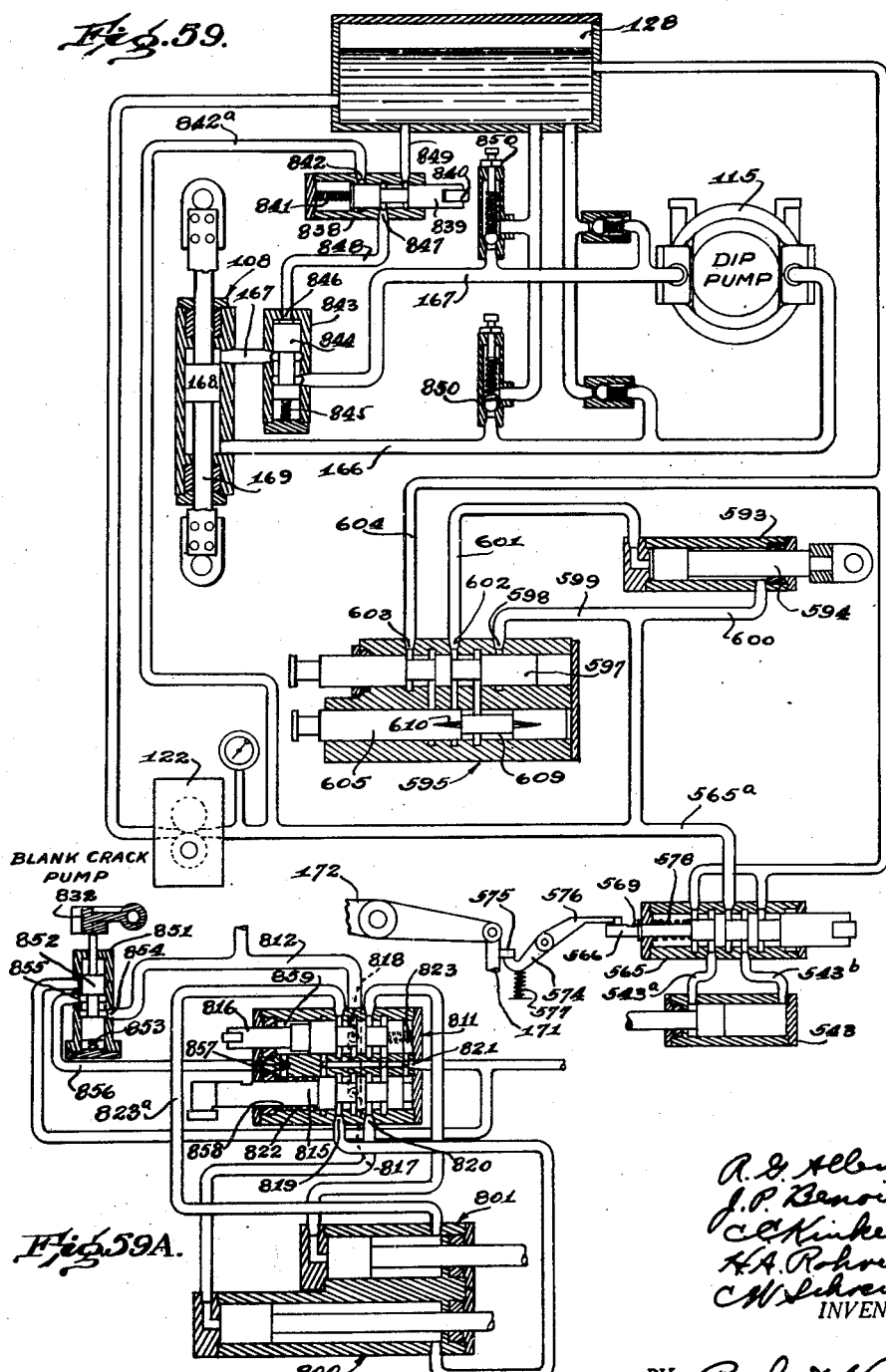

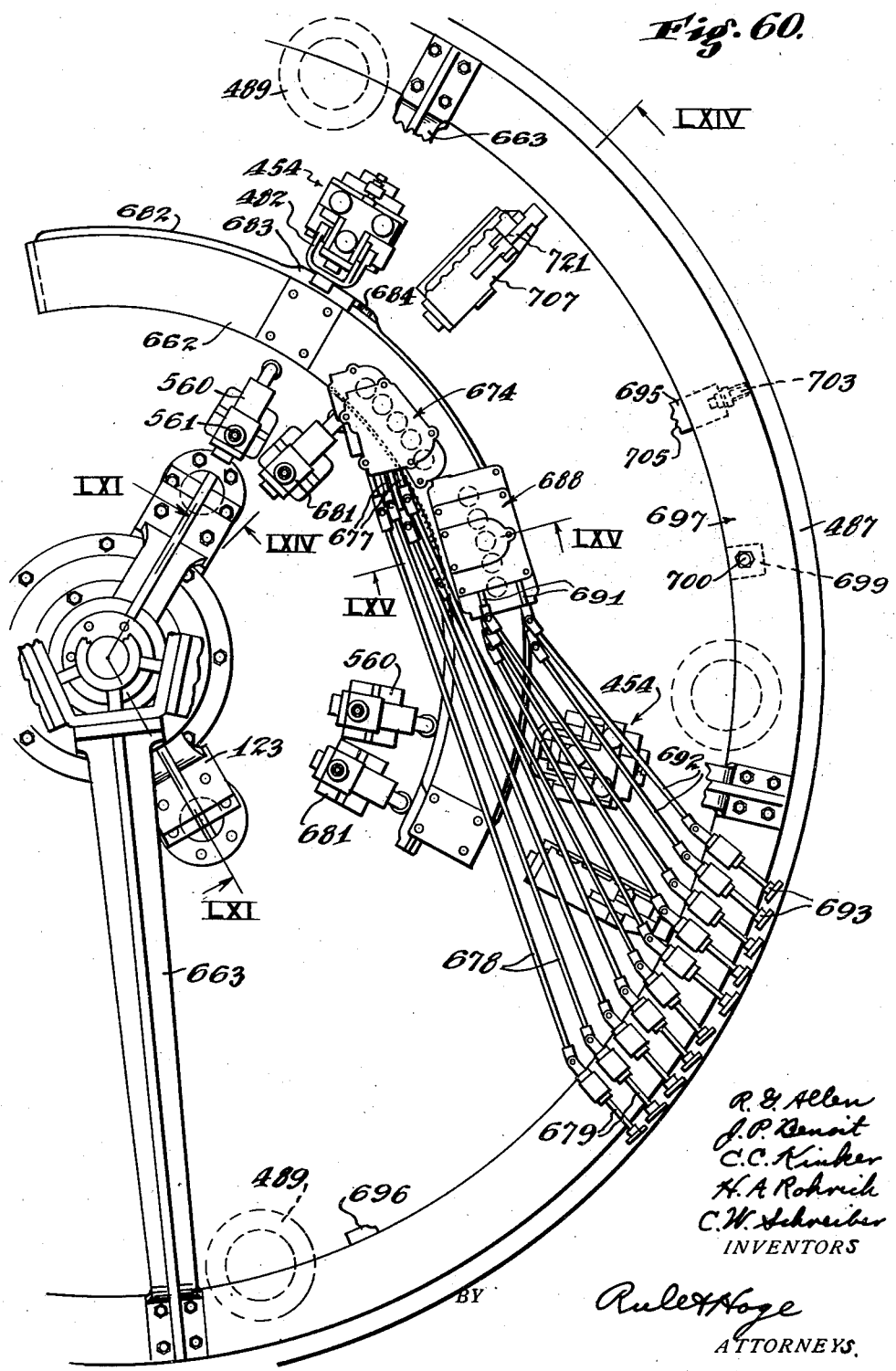

Dec. 24, 1940.　　　J. P. BENOIT ET AL　　　2,225,898
HYDRAULIC MACHINE FOR MOLDING GLASS ARTICLES
Filed Jan. 14, 1937　　　34 Sheets-Sheet 25
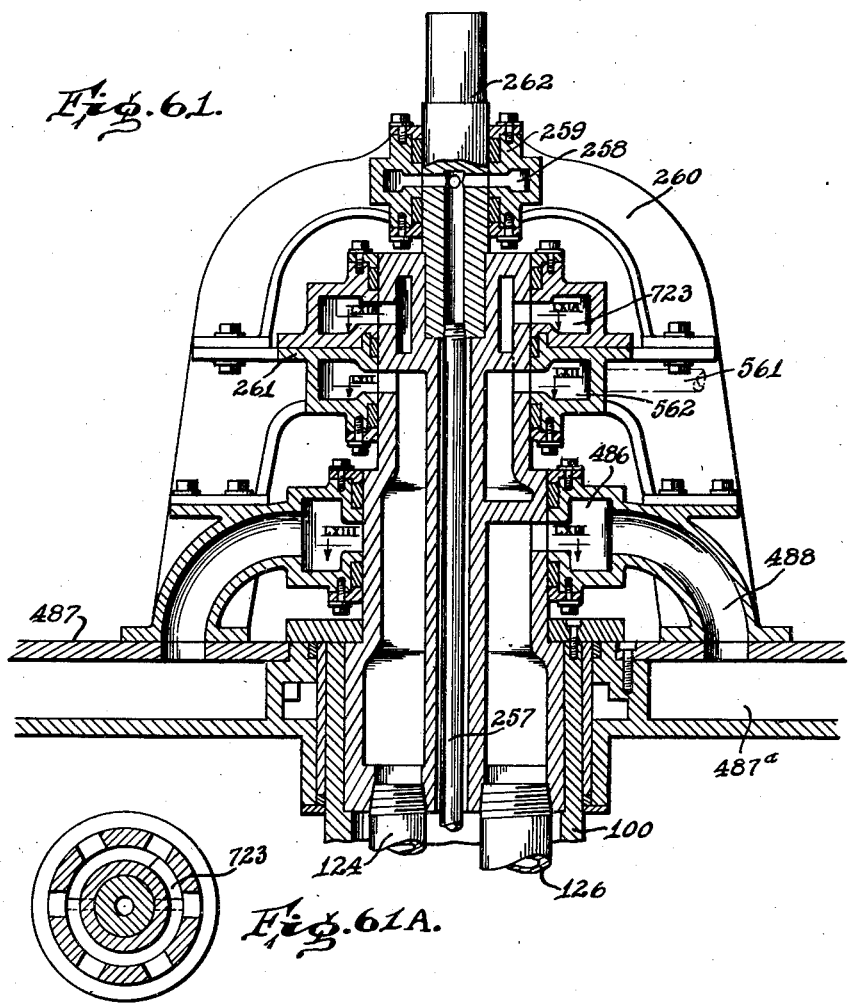

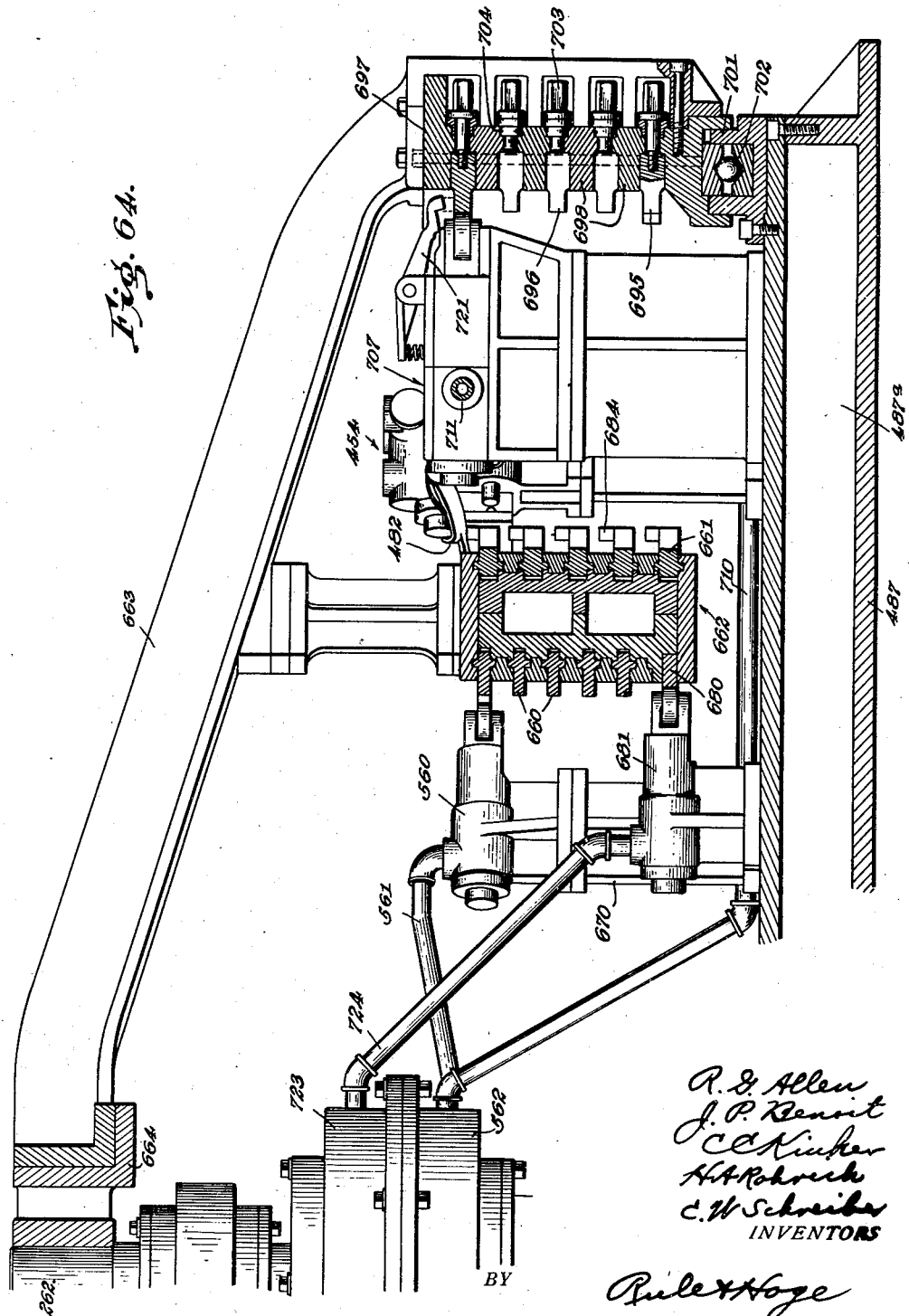

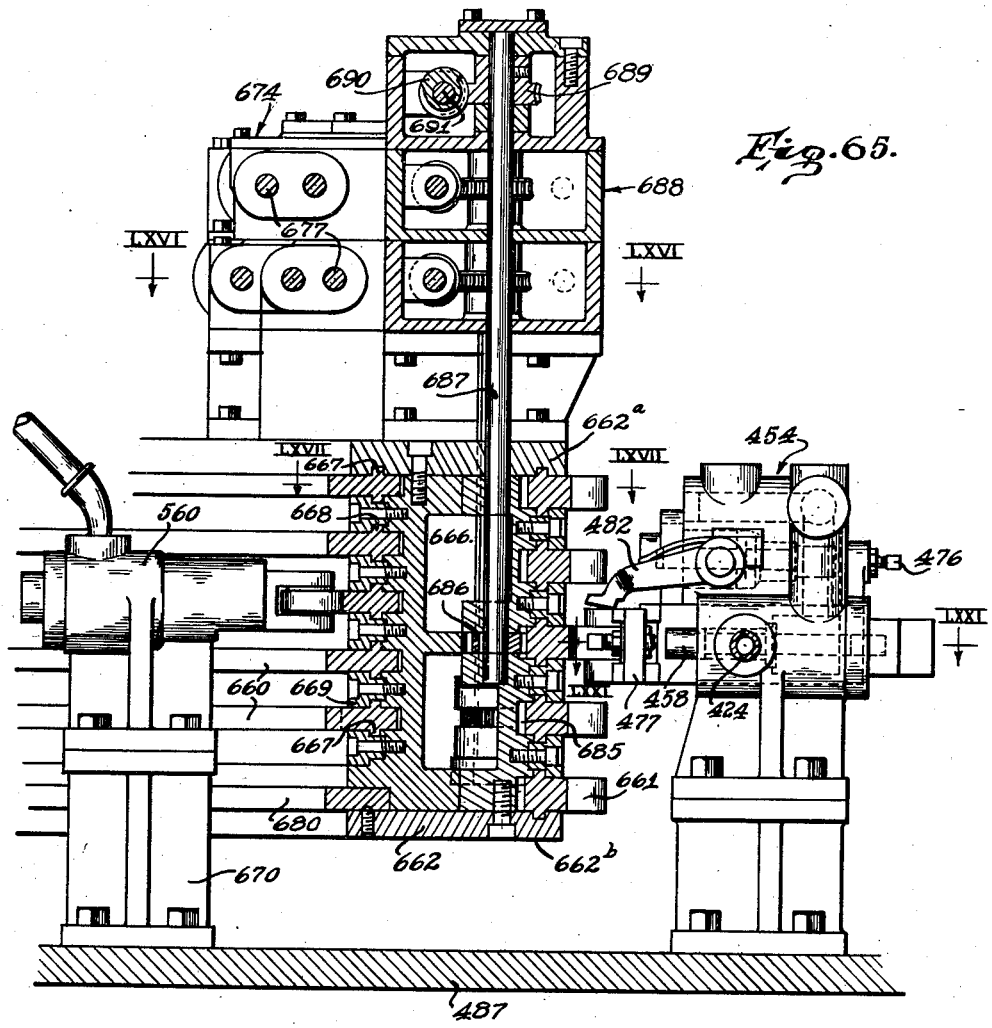

Dec. 24, 1940.  J. P. BENOIT ET AL  2,225,898
HYDRAULIC MACHINE FOR MOLDING GLASS ARTICLES
Filed Jan. 14, 1937      34 Sheets-Sheet 28
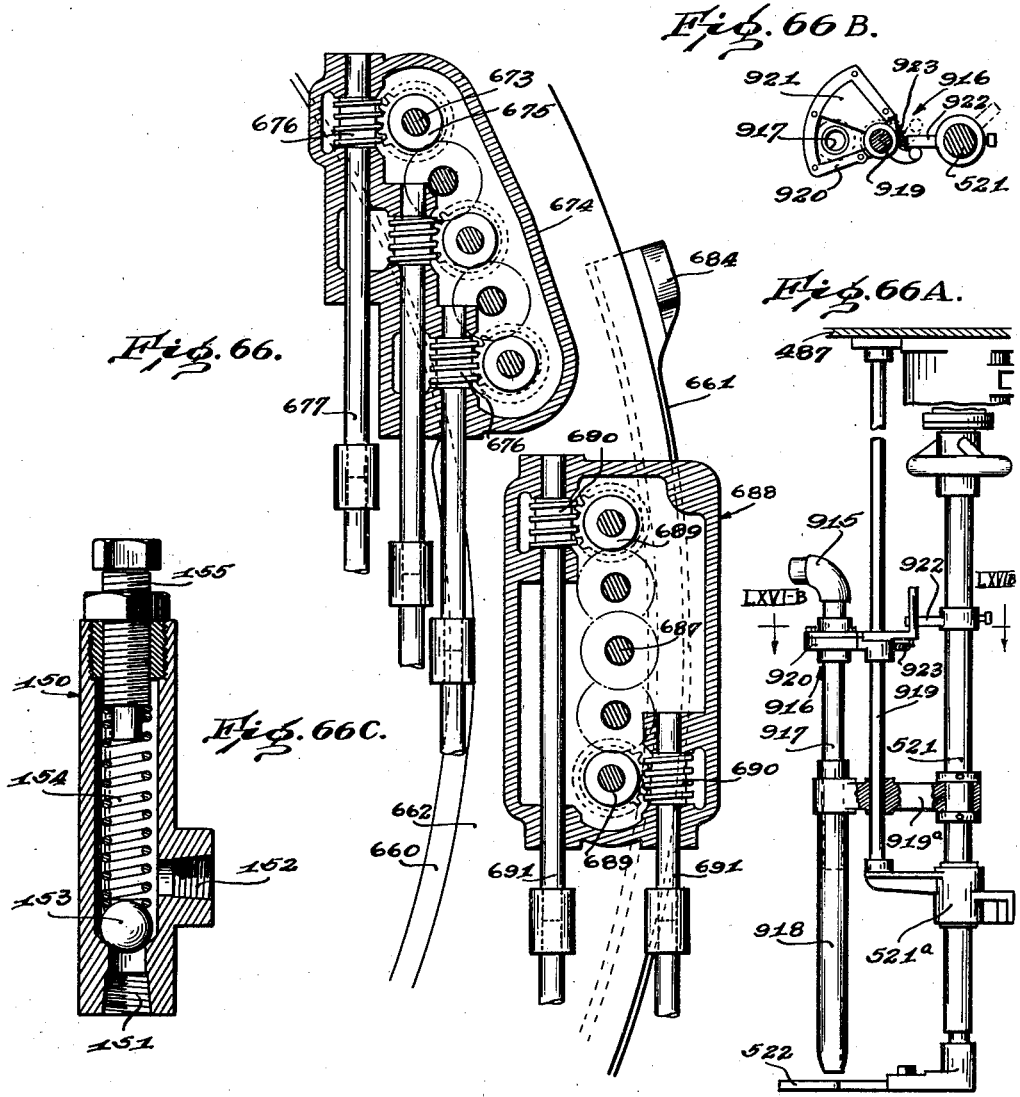
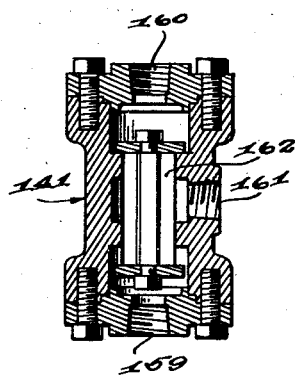

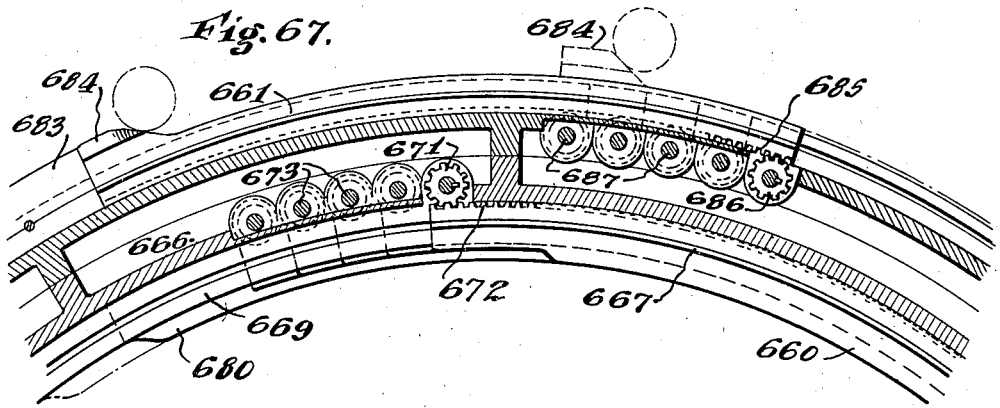
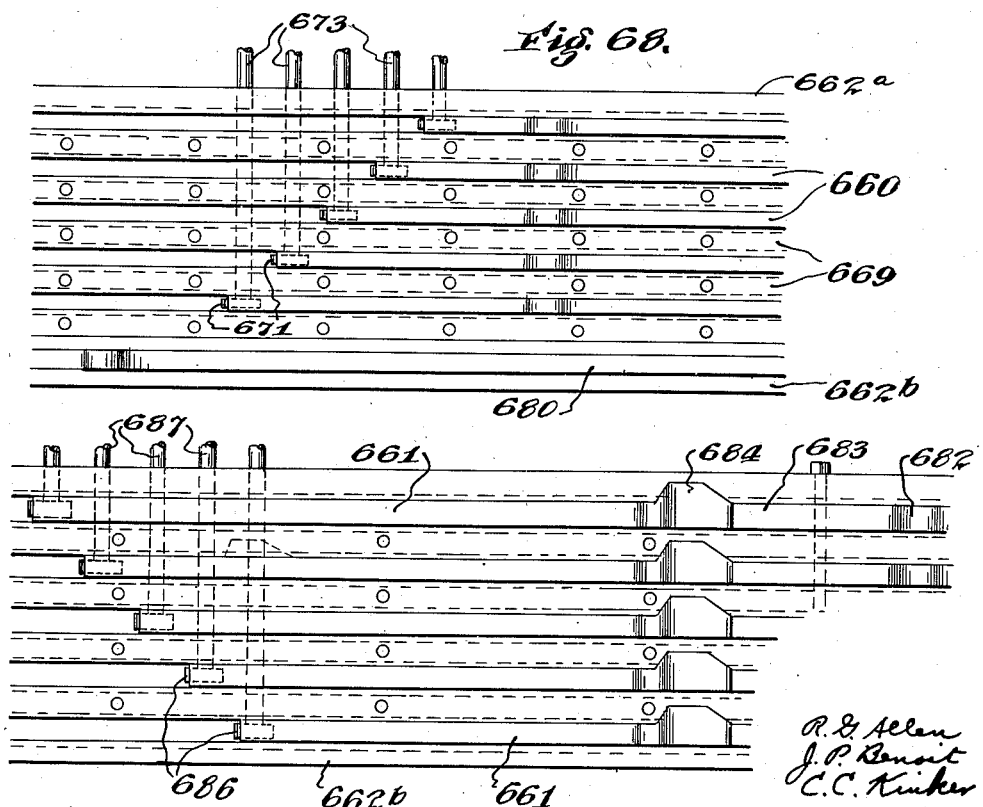

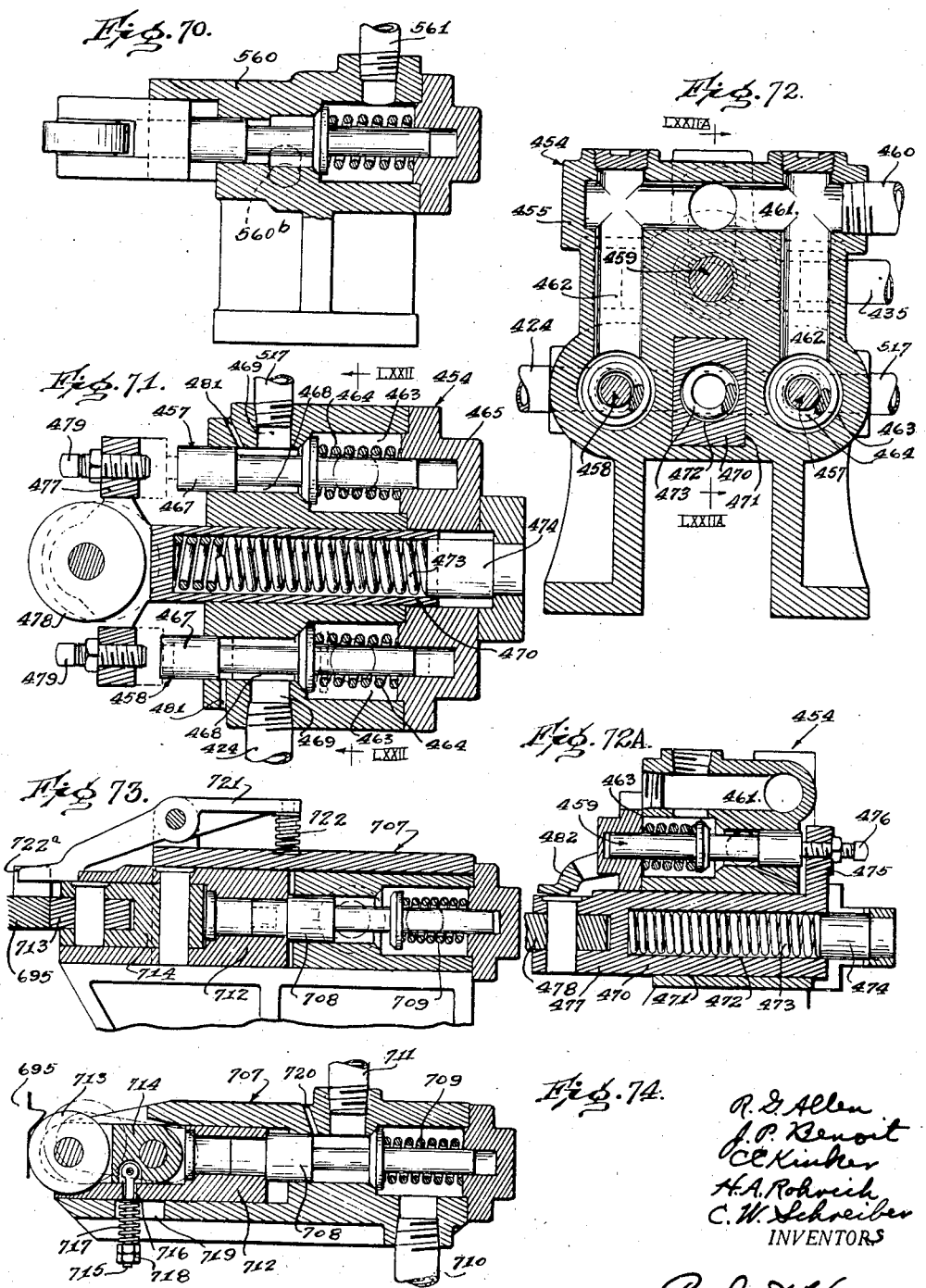

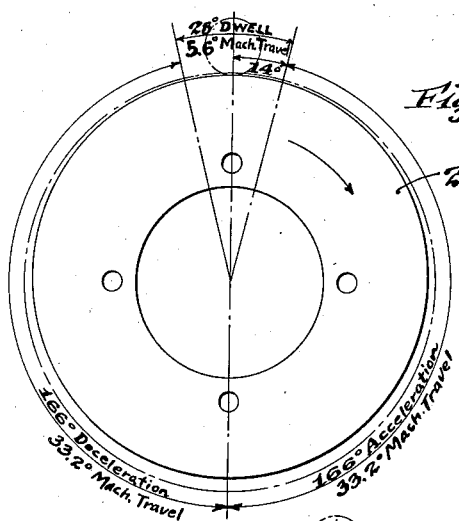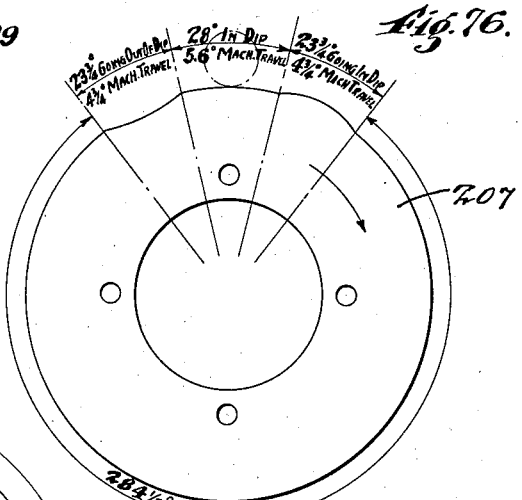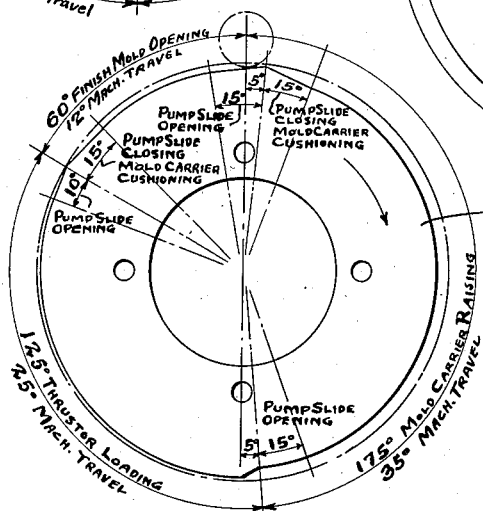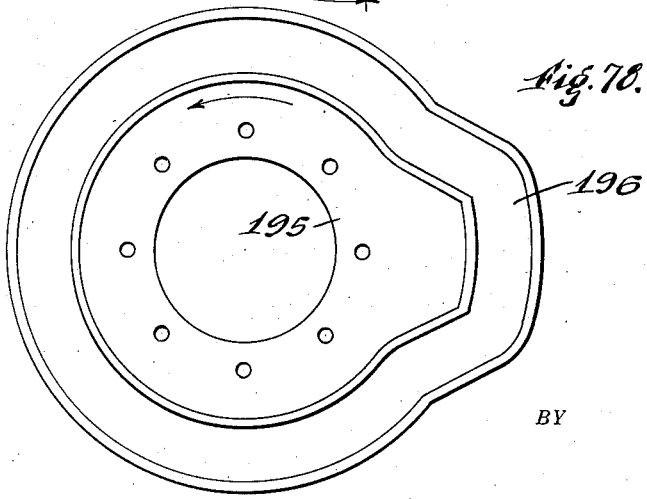

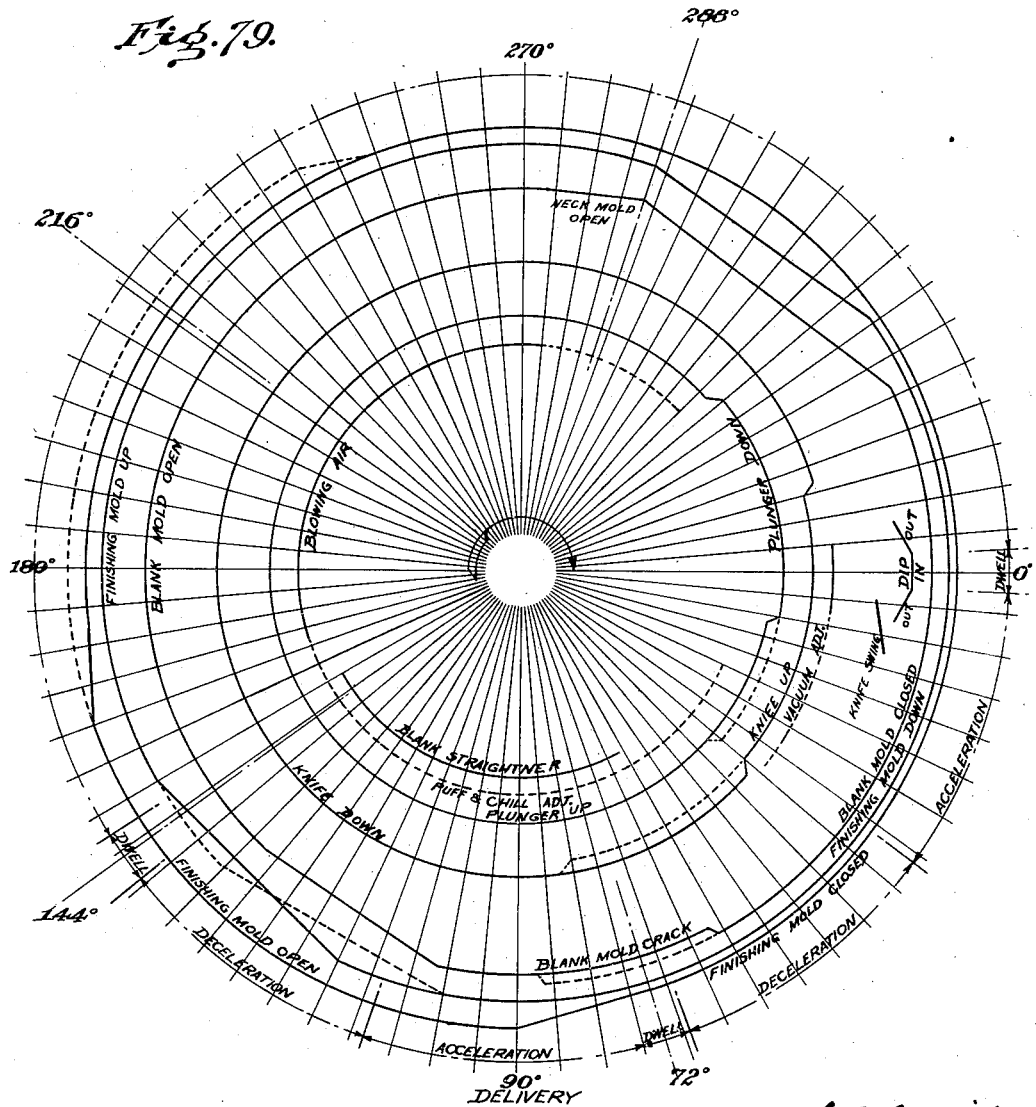

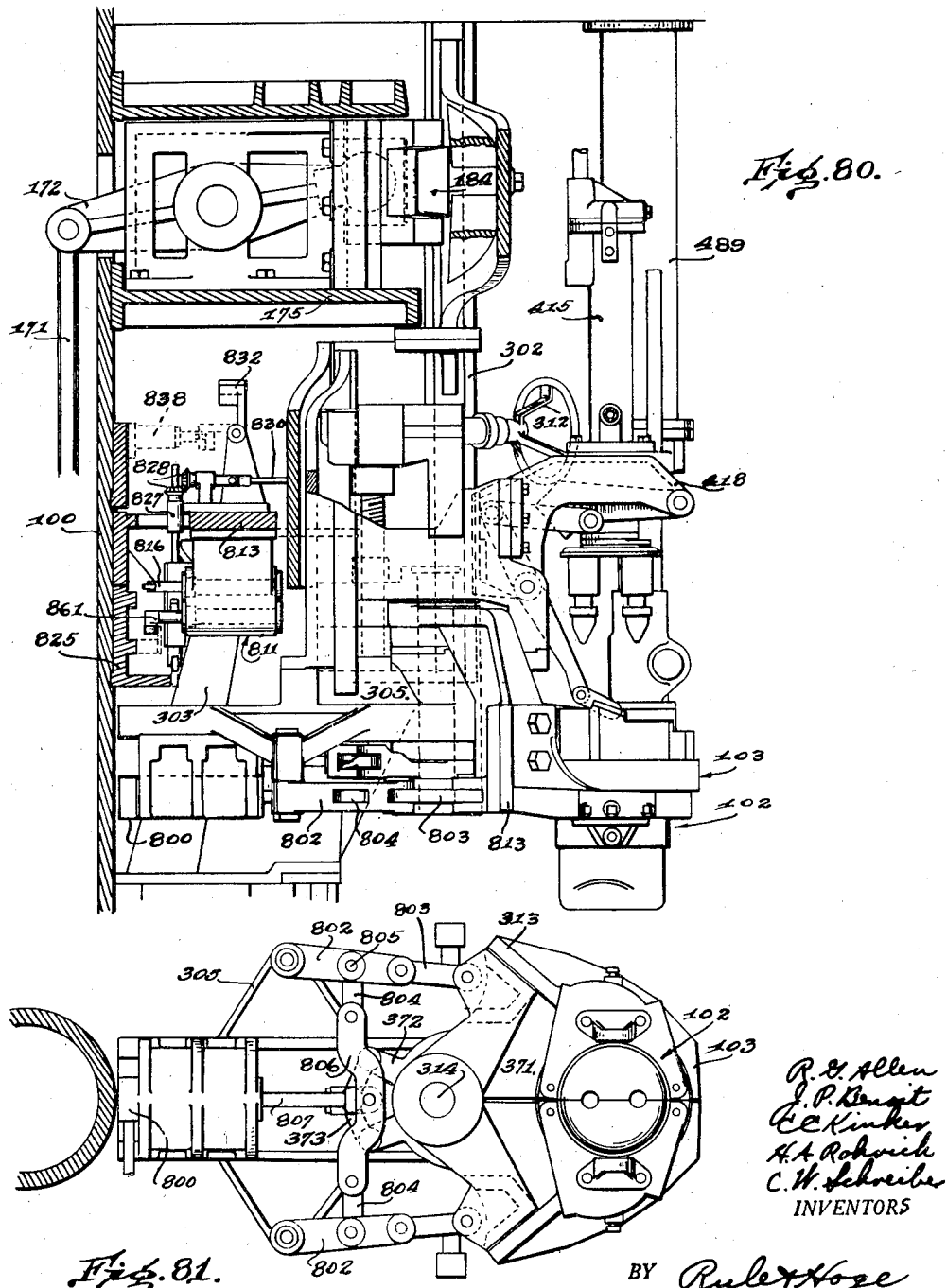

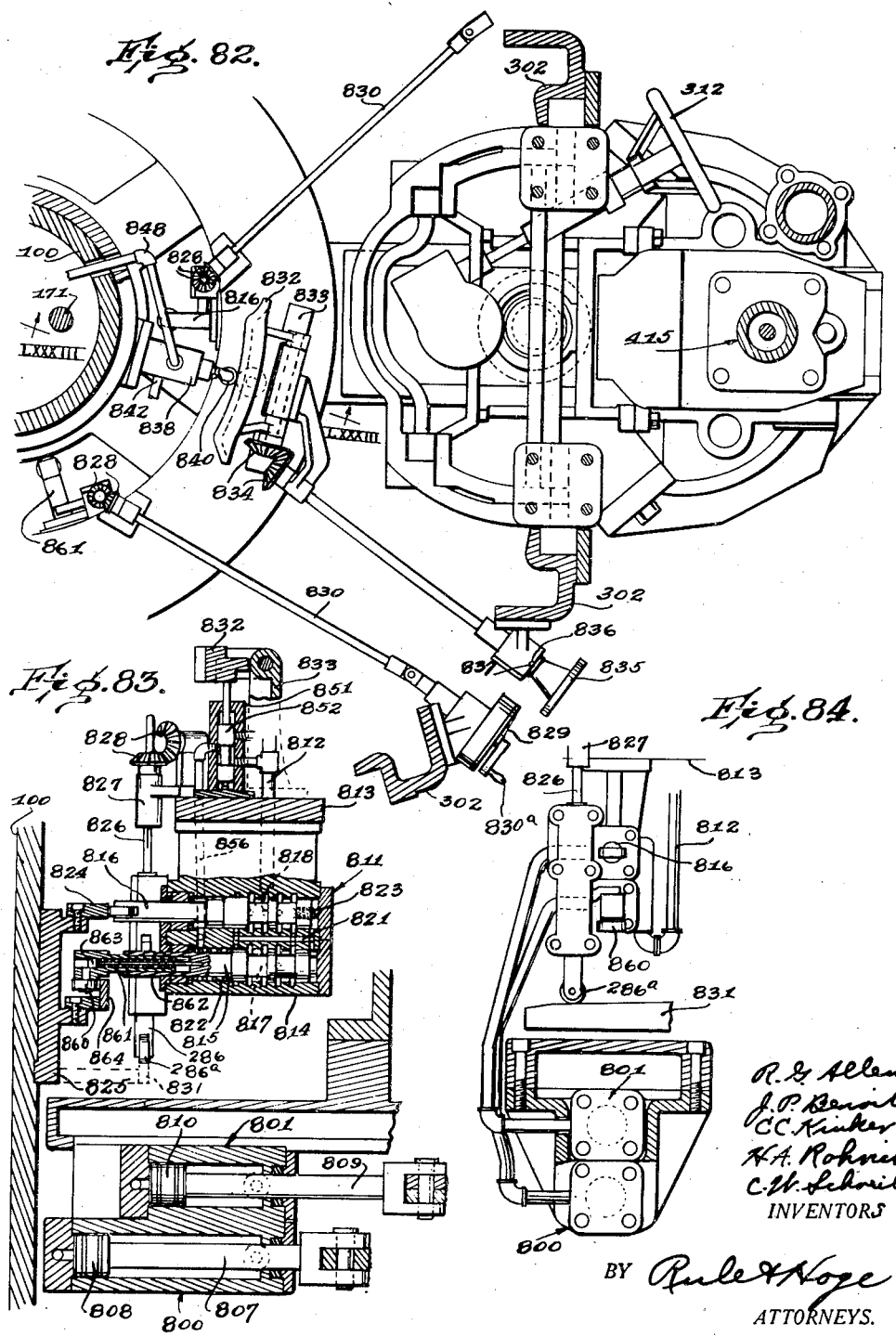

Patented Dec. 24, 1940

2,225,898

UNITED STATES PATENT OFFICE 2,225,898

HYDRAULIC MACHINE FOR MOLDING GLASS ARTICLES

Joseph P. Benoit, Clarence C. Kinker, Russell G. Allen, and Harold A. Rohrich, Alton, Ill., and Carl W. Schreiber, Toledo, Ohio, assignors to Owens-Illinois Glass Company, a corporation of Ohio Application January 14, 1937, Serial No. 120,612

101 Claims. (Cl. 49—5)

Our invention relates to machines for molding hollow glass articles including bottles, jars and various other kinds of hollow ware. The invention includes machines of the suction gathering type, as, for example, automatic machines of the Owens type. Such a machine includes a horizontally rotating mold carriage on which are mounted dip heads or units, each carrying a suction gathering mold or molds. The dip heads are brought periodically and in succession over a pool or supply body of molten glass. The head is then lowered and the mold thereby brought into dip to receive a charge of glass by suction and form a parison which is thereafter transferred to a finishing mold in which it is blown to the form of the finished article. The invention in its preferred form embodies a hydraulically operated machine in which the mold carriage is driven by hydraulic power and the major operations effected and controlled by hydraulic mechanism.

In automatic machines now in general use for the manufacture of bottles, jars, etc., many different individual movements or operations are involved in the process of forming a complete article, including the rotation of the mold carriage, the individual movements of the dip heads and gathering molds during the charge gathering operations, the opening and closing movements of the molds, the application of suction and air pressure for gathering and forming the blanks, the transfer movements by which the parisons are transferred to the finishing molds, and various other movements and operations. All of these movements must be coordinated and effected in the proper order of sequence.

In the production of high grade ware it is necessary to provide adjusting means for adjustably regulating the time of initiation and length of duration of different operations as required by changes in temperature and other variable conditions met with in practice. Adjustments must also be made to adapt the various operations to the size, shape, wall thickness and other characteristics of the particular ware which is being produced.

An object of our invention is to provide a practical machine embodying adjustment features to meet the above noted requirements, and which has great flexibility and ease of adjustment, adapting it for use in the manufacture of articles which vary widely in shape, size and other properties.

Another object of the invention is to provide an improved machine of the type comprising a rotary mold carriage on which is mounted a plurality of individual heads or units, which improved machine is compactly built and of smaller size and mold radius than machines of this type now in general use, and, moreover, to provide such a machine which is adapted to make bottles or other articles of various sizes, shapes and capacities, each head operating to make articles of a particular design independently of the size, shape or other characteristics of the articles being made at the same time on the other heads of the machine. In the attainment of this object, we provide a machine driven and controlled by hydraulic power mechanism which is particularly adapted to provide a wide range and flexibility of adjustment of the timing, extent and duration of the various movements or operations, and synchronization of the operations individual to each head or unit with those of the other units of the machine.

A further object of the invention is to provide a machine in which separate power devices or motors are provided for effecting the major operations, combined with means for synchronizing such operations, and hand operated mechanism for adjusting the speed of the machine as a whole while maintaining synchronization of the different operations. More specifically, the invention provides hydraulic means or motors for the major driving operations combined with adjustment devices by which is obtained the flexibility of adjustment and control permitted by the use of such hydraulic means.

A novel feature of our invention consists in the provision, in a machine of the suction gathering type including a rotating mold carriage and a series of mold carrying heads or units thereon, of novel means for periodically accelerating and decelerating the movement of the mold carriage to permit a slow movement of the carriage during each charge gathering operation and a relatively rapid movement between charge gathering operations. In this manner, the gathering molds while in dip or in contact with the supply body of glass from which they draw their charge by suction, are given a relatively slow movement during the gather. This results in a material reduction in the time required to fill the mold, and insures a good seal between the mouth of the slowly moving mold and the pool or supply body of glass. Our invention, by providing for a slow movement of the molds during the gathering operation, enables such operation to be effected while the mold travels through a comparatively short distance over the supply body and thereby permits a corresponding reduction in the exposed gathering area. This in turn reduces the amount of chilling at the gathering area and permits proper temperature conditions of the glass entering the molds.

Our invention, by providing hydraulic means for accelerating and decelerating the speed of the mold in the manner above noted, permits such changes in the speed to be made smoothly and rapidly with much less strain on the mechanism than occurs with other mechanisms used for changing the speed of the mold carriage and, moreover, permits the use of greatly simplified mechanism.

A further feature of our invention consists in providing in connection with the hydraulic means for changing the speed of the mold carriage, adjusting means by which the speed may be adjustably varied to any degree that may be desired.

A further object of our invention is to provide a hydraulically operated machine which is flexible to the extent that the timing of the various movements of any individual head may be changed without similarly affecting the others. The invention at the same time provides adjusting and controlling means by which the timing of all of the heads may be adjusted to operate in unison. The invention also provides a construction enabling any or all of the molds and equipment to be changed while the machine is normally operating and making glassware.

A further feature of the invention consists in providing a single hand control device for all of the hydraulically actuated units which are synchronized over the entire adjustable range. The invention further provides mechanism for driving the mold carriage in perfect synchronism with the operations of all of the hydraulically operated units on the machine.

A further feature of the invention consists in driving the machine by hydraulic mechanism which in turn is driven with constant speed electric motors. The electric motors can be controlled either selectively or as a group.

An object of the invention is to provide hydraulic motors or means for effecting certain movements such, for example, as the lifting and lowering of the gathering mold carriers, in combination with mechanical means, supplemental to the hydraulic mechanism for positively effecting such movements in the event of failure of the hydraulic means to function, so that synchronism with the movements of other units or parts of the machine is insured, and the possibility of interference of parts operating out of their order with consequent breakage or damage, is positively prevented.

In suction gathering machines now in general use, and particularly those of the Owens type, each finishing mold is carried at the outer end of a radially disposed arm by which the mold is swung upward to receive a parison from the gathering mold and then swung downward so that it clears the gathering pot and passes therebeneath during its travel with the mold carriage. An object of our invention is to provide an improved construction and arrangement by which the finishing mold is given a combined vertical and swinging movement which permits the length of the mold carrying arm to be reduced, and a corresponding reduction in the radius of the mold carriage.

Other objects of our invention and numerous features of novelty in addition to those above mentioned, will appear hereinafter in the following more detailed description of our invention.

Referring to the accompanying drawings:

Fig. 3A is a section at the line IIIA—IIIA on Fig. 3;

Fig. 6 is a sectional plan view of the machine, the section being taken at the line VI—VI on Fig. 16;

Figure 3:
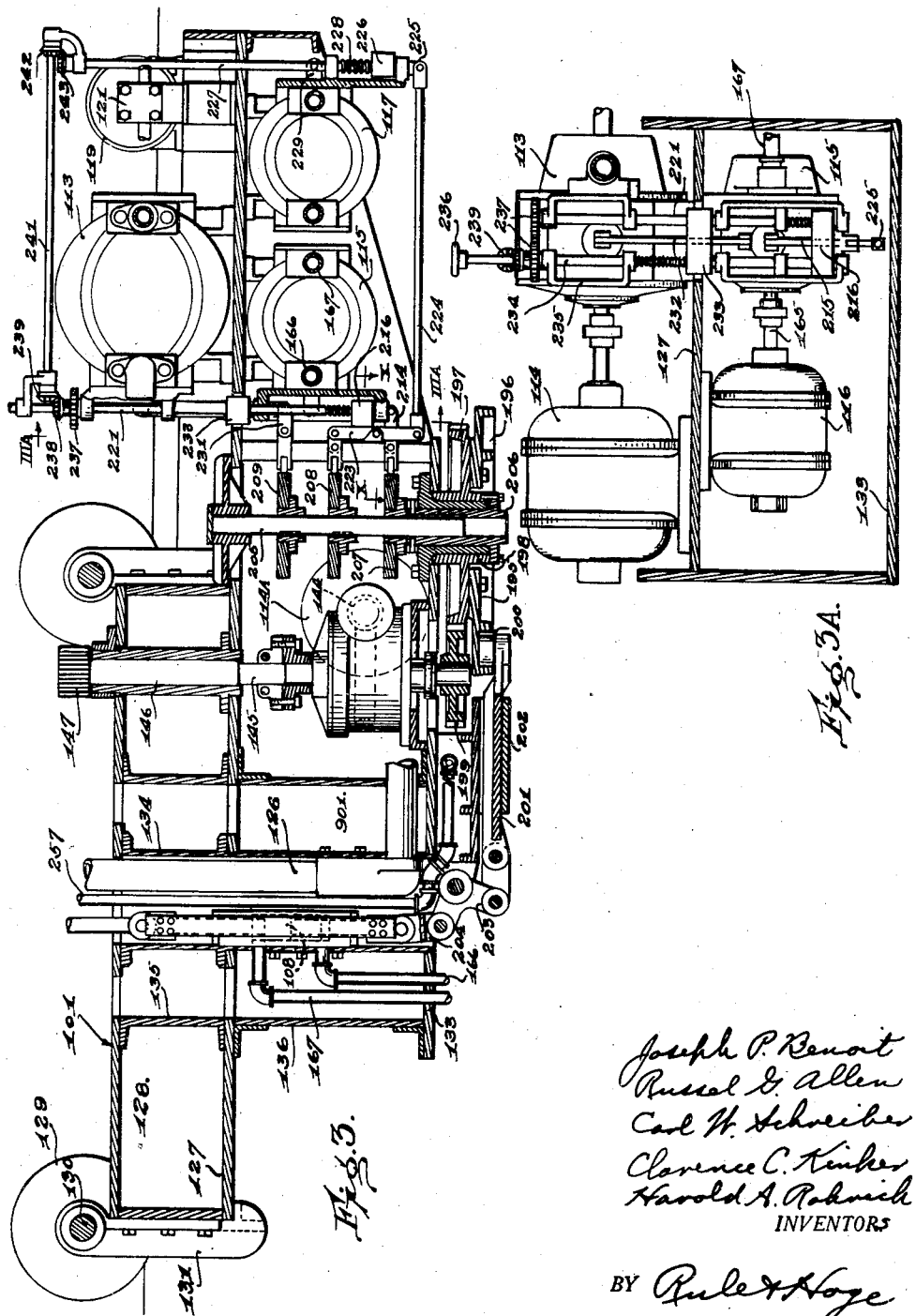
Fig. 3 is a longitudinal, part sectional elevation of the same.
Figures 14, 15:
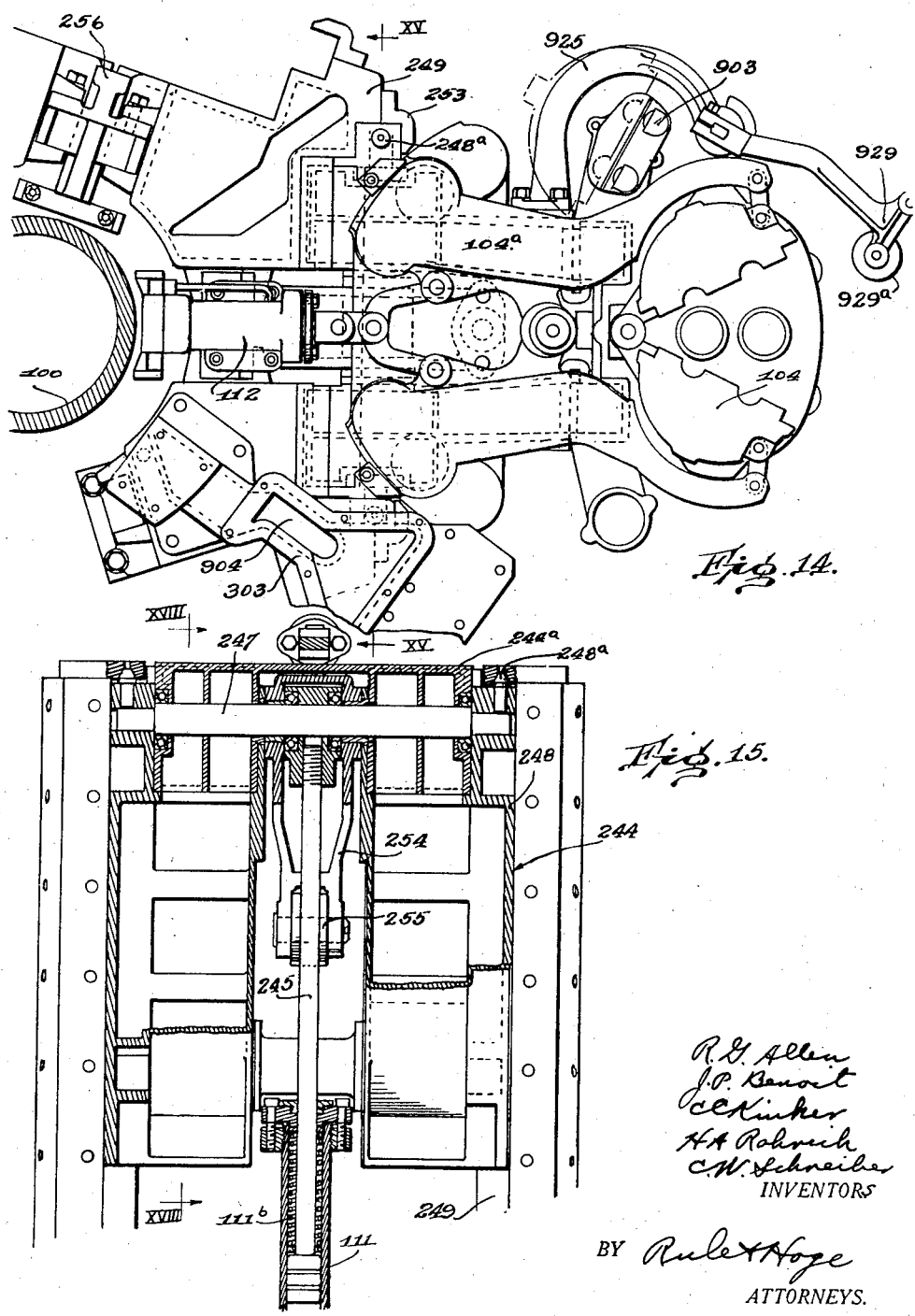
Figure 27:
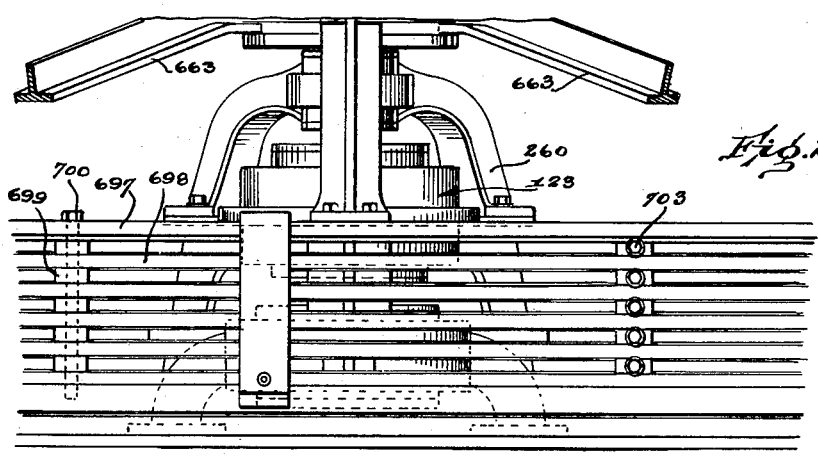
Figure 28:
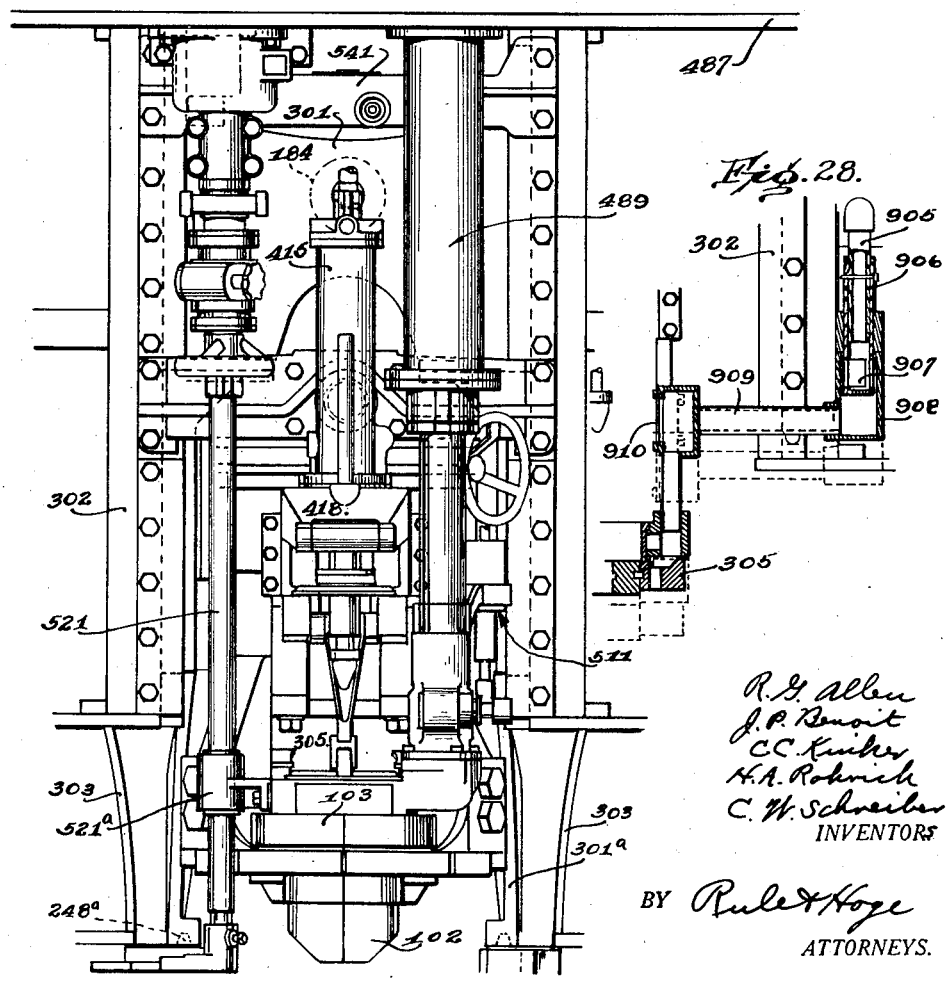

Figs. 7 to 13 relate particularly to mechanism for lifting and lowering the dip heads which carry the blank molds;

Fig. 7 is a detail view in sectional elevation showing one of the hydraulic piston motors (herein termed a dip head motor) for lifting and lowering a dip head and the blank mold carried thereby;

Fig. 8 is a central sectional elevation of the hydraulic pump (herein termed the dip head pump) which operates the dip head motors, said view being in a plane perpendicular to the axis of the pump;

Fig. 9 is a sectional elevation of the same in the vertical plane of the axis;

Fig. 10 is a horizontal section at the line X—X on Fig. 3, showing mechanism for controlling the dip head pump;

Fig. 11 is a bottom plan view of cam controlled mechanism for controlling the movements of the dip heads;

Fig. 12 is a section at the line XII—XII on Fig. 11;

Fig. 13 is a section at the line XIII—XIII on Fig. 7;

Figs. 14 to 26, inclusive, relate to a finishing mold unit;

Fig. 14 is a plan view of a finishing mold and its operating mechanism;

Fig. 15 is a section at the line XV—XV on Fig. 14;

Fig. 16 is a central vertical section of the finishing mold and its operating mechanism;

Fig. 16A is a sectional view of a spring buffer device for cushioning the finishing mold carrier as it completes its downward movement;

Fig. 17 is a part sectional elevation of a finishing mold unit showing the mold in its lowered position, the view being taken in the opposite direction from that of Fig. 16;

Fig. 18 is a section at the line XVIII—XVIII on Fig. 15;

Fig. 18A is a sectional elevation of a portion of a hydraulic motor for lifting a finishing mold;

Fig. 19 is a sectional view of a "thruster" for maintaining the finishing mold closed after it has been closed by its hydraulic motor;

Fig. 20 is a sectional view of a locking device for a trip valve;

Fig. 21 is a section at the line XXI—XXI on Fig. 20;

Fig. 22 is a section at the line XXII—XXII on Fig. 21;

Fig. 23 is a part sectional elevation of mechanism including the locking device shown in Figs. 20 to 22, and showing in section a safety interlocking valve mechanism;

Fig. 24 is a sectional view of a valve controlling a hydraulic motor for opening and closing the finishing mold;

Fig. 25 is a sectional view of a valve controlling a motor for lifting and lowering the finishing mold carriage;

Fig. 26 illustrates a manually operable controlling valve;

Fig. 27 is a front elevation showing a blank mold unit;

Fig. 28 is a sectional detail of a line for conducting cooling air to the neck mold and plungers;

Fig. 29 is a sectional side elevation of a blank mold unit, the mold being shown in its lowered position for gathering charges of glass;

Fig. 29A is an enlarged sectional view of a portion of the blank mold opening and closing mechanism;

Fig. 30 is a side elevation of the blank mold unit with the mold in its lifted position;

Fig. 30A is a fragmentary view showing means for supporting the dip head independently of its cam;

Fig. 31 is a section at the line XXXI—XXXI on Fig. 30;

Fig. 32 is a section at the line XXXII—XXXII on Fig. 30;

Fig. 33 is a section at the line XXXIII—XXXIII on Fig. 32, showing cam controlled mechanism for opening the neck mold;

Fig. 34 is a bottom plan view of the parison mold and its operating mechanism;

Fig. 34A is a diagrammatic view of the slippage pump circuit;

Fig. 35 is a sectional plan view showing a portion of the cam operated mechanism for opening and closing the blank molds;

Fig. 36 is a section at the line XXXVI—XXXVI on Fig. 35;

Fig. 37 is a bottom plan view of the open neck mold and mechanism for operating the blank mold and neck mold;

Fig. 38 is a section at the line XXXVIII—XXXVIII on Fig. 37, but showing the mechanism right-side up;

Fig. 39 is an elevation view of a telescoping vacuum pipe and valve mechanism;

Fig. 40 is a sectional elevation of the same, viewed in the opposite direction;

Fig. 41 is a section at the line XLI—XLI on Fig. 40;

Fig. 42 is a section at the line XLII—XLII on Fig. 40;

Fig. 43 is a vertical sectional elevation of mechanism for operating the knife shaft;

Fig. 44 is a plan view of the same;

Fig. 45 is a section at the line XLV—XLV on Fig. 44;

Fig. 46 is a fragmentary sectional elevation showing a pair of plungers, a slide valve, and their operating motor;

Fig. 47 is a top plan view of mechanism shown in Fig. 46;

Figs. 48 and 49 are sections, respectively, at the lines XLVIII—XLVIII and XLIX-XLIX on Fig. 46;

Fig. 50 is a sectional plan view showing mechanism for lifting and lowering the dip heads, the knife valve which controls the hydraulic motor for swinging the knife, trip mechanism for said valve, and the hydraulic motor to "crack" the blank molds;

Fig. 50A is a detail showing the knife valve and one of the cams for operating it;

Fig. 50B is a detail view of the trip mechanism shown in Fig. 50;

Fig. 51 is a fragmentary front elevation of the hydraulic motor and mechanism actuated thereby for cracking the blank mold;

Fig. 52 is a sectional elevation of the same, the section being taken at the line LII—LII on Fig. 50;

Fig. 53 is a fragmentary part sectional plan view of mechanism for effecting and controlling the blank cracking or initial opening of the blank mold, said mechanism including the hydraulic motor for cracking the blank mold, valve mechanism controlling said motor, cam means controlling the valve mechanism, and adjusting means for one of the cams;

Fig. 54 is a detail showing a cam for resetting the valve mechanism shown in Figs. 53 and 58;

Fig. 55 is a part sectional elevation showing said valve mechanism and operating means therefor;

Fig. 56 is a section at the line LVI—LVI on Fig. 53;

Fig. 57 is a front elevation of mechanism shown in Fig. 55;

Fig. 58 is a sectional elevation of the same, the section being taken at the line LVIII—LVIII on Fig. 53;

Fig. 59 is a part sectional diagrammatic view showing the dip pump, the dip head operating motor driven thereby, the blank mold cracking motor and its pump, the knife operating motor, and the hydraulic circuits and controlling devices for said pumps and motors;

Fig. 59A is a part sectional diagrammatic view of the hydraulic motors and their valve controlling mechanism for operating the blank and neck molds.

Fig. 60 is a plan view showing a portion of the upper spider of the machine and appurtenant mechanism, including the distributing head, a series of hand operated controls for adjusting the knife drop cams, a series of hand devices for adjusting the cams controlling the blank mold plungers or neck pins, said view also showing cams actuated by said adjusting devices and valves operated by the said cams;

Fig. 61 is a sectional elevation of the distributing head by which air pressure and vacuum are distributed, the section being taken at the line LXI—LXI on Fig. 60;

Figs. 61A, 62 and 63 are sectional views at the correspondingly designated section lines on Fig. 61;

Fig. 64 is a section at the line LXIV—LXIV on Fig. 60;

Fig. 65 is a section at the line LXV—LXV on Fig. 60;

Fig. 66 is a section at the line LXVI—LXVI on Fig. 65;

Fig. 66A is an elevation showing a knife mechanism and cooling means for the knife;

Fig. 66B is a section at the line 66B on Fig. 66A;

Fig. 66C is a sectional view of a relief valve;

Fig. 66D is a sectional view of a differential pressure valve;

Fig. 67 is a section at the line LXVII—LXVII on Fig. 65;

Fig. 68 is a fragmentary elevation view showing the knife drop cams and also showing the cam controlling the air supply to the air nozzles for straightening the blanks;

Fig. 69 is a fragmentary elevation of the cams for actuating the valves which control the operation of the blank mold plungers and the application of vacuum to the blank molds;

Fig. 70 is a sectional view of a valve which controls the knife drop mechanism;

Fig. 71 is a horizontal section of a plunger and vacuum control valve;

Fig. 72 is a vertical section of the same at the line LXXII—LXXII on Fig. 71;

Fig. 72A is a vertical section at the line LXXIIA—LXXIIA on Fig. 72;

Fig. 73 is a vertical section of the "blowing valve" which controls the application of air pressure for blowing the glass in the molds;

Fig. 74 is a horizontal section of the valve shown in Fig. 73;

Figs. 75, 76 and 77 are diagrammatic views of the cams shown in Fig. 3 for controlling the main hydraulic pumps;

Fig. 75 shows the cam for controlling the main drive pump by which the mold carriage is driven;

Fig. 76 shows the cam for controlling the up and down movements of the dip heads;

Fig. 77 shows the cam controlling the lifting and lowering of the finishing mold carriers;

Fig. 78 is a diagrammatic view of the cam which mechanically controls the movements of the dip heads;

Fig. 79 is a timing chart indicating the timing and sequence of the various operations;

Fig. 80 is a sectional side elevation of a parison mold unit including blank and neck molds and embodying mechanism for hydraulically operating the molds;

Fig. 81 is a bottom plan view of the parison mold and its operating mechanism;

Fig. 82 is a sectional plan view of a blank mold unit and associated mechanism;

Fig. 83 is a vertical sectional view taken on line LXXXIII—LXXXIII on Fig. 82; and Fig. 84 is a part sectional end elevation of the valve mechanism shown in Fig. 83.

General construction

A general statement of the construction and arrangement of parts will now be given, followed by a more detailed description of the machine and mode of operation. The machine comprises a mold carriage mounted to rotate about a tubular column 100 (see Figs. 6 and 16) bolted to and rising from a horizontal plate 101 which forms part of the base of the machine. The mold carriage includes five heads or units symmetrically arranged about the axis of the carriage. Each unit includes a mold group and their operating mechanisms.

Each mold group includes a blank mold 102 (see Fig. 29), a neck mold 103 above and in register with the blank mold, and a finishing mold 104 (Fig. 16). The blank and neck molds together form a parison mold which, during each rotation of the mold carriage, is brought over a pool 105 of molten glass within a pot or container 106, and lowered into contact with the glass. Suction is then applied for filling the mold cavities. To permit the lowering of the parison mold into contact with the pool, it is carried by a dip frame or head 107 which is lifted and lowered by a piston motor 108 (Fig. 7) hydraulically operated as hereinafter set forth. When the parison mold is lifted out of dip, the glass is sev-ered by a knife 522 (Fig. 44). The blank mold is then opened and the finishing mold (Fig. 16) lifted by a hydraulic piston motor 111, and closed around the suspended parisons by a hydraulic piston motor 112, the parisons being then blown to final form in the mold.

Figure 2:
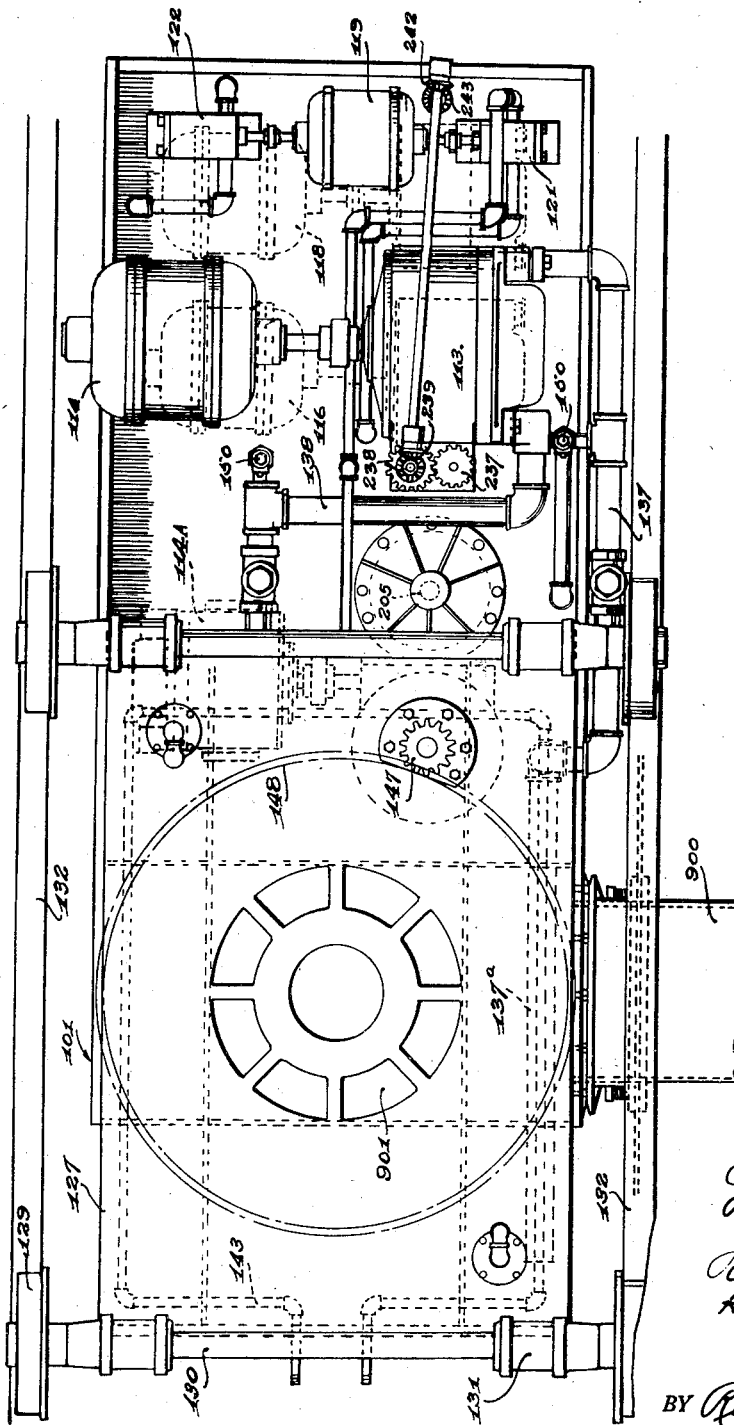
Fig. 2 is a plan view of the machine base and certain of the pumps and motors mounted thereon.

The major operations of the machine are effected by power supplied from three motor-driven hydraulic pumps mounted on the base of the machine, as shown in Figs. 2, 3 and 3A. These include a rotary pump 113 (hereinafter referred to as the drive pump) directly connected to and driven by an electric motor 114, a rotary pump 115 (hereinafter referred to as the dip pump) driven by an electric motor 116, and a rotary pump 117 (hereinafter referred to as the mold carrier pump) driven by an electric motor 118. The drive pump 113 operates through mechanism hereinafter described to continuously rotate the mold carriage at a periodically varying speed. The dip pump 115 operates a piston type hydraulic motor by which the dip heads carrying the blank molds are lifted and lowered. The mold carrier pump 117 drives the hydraulic motors 111 for lifting and lowering the finishing molds. An electric motor 119 (Figs. 2 and 3) also mounted on the machine base, operates a slippage pump 121 and a pump 122 which actuates the blank crack motors by which the blank molds are given an initial opening movement.

Air under pressure for blowing the glass in the molds and for cooling purposes is supplied to the several units through a distributing head 123 (Fig. 61) at the top of the machine, said head being supported on the column 100. The air under pressure is conducted to the distributing head through pipes 124 and 125 (Figs. 13 and 61) which extend upward to the distributing head through the column 100. The application of vacuum to the molds for gathering and shaping the glass therein is controlled through vacuum lines leading to the distributing head from which the main vacuum pipe 126 extends downward through the column 100 and through the base of the machine to a suction pump or other source of vacuum.

Machine base

The machine base (Figs. 2, 3 and 3A) includes a main base plate or platform 127 which provides a support for the entire machine. Above this base plate is an oil reservoir or tank 128 from which oil is supplied to the hydraulic pumps and motors. Wheels 129 which carry the machine are mounted on axles 130 having bearings in brackets 131 attached to the side walls of the tank 128. The wheels run on tracks 132, permitting the machine to be moved to and from the gathering tank 106. A sub-base plate 133 is spaced below the main base plate 127. Beneath the column 100 and in vertical alignment therewith (see Figs. 3 and 16) is a tubular section 134 extending from the cover plate of the oil reservoir downward to the sub-base plate 133. Surrounding the section 134 and concentric therewith are cylindrical walls 135 and 136 which, with the member 134, provide an annular passageway through which cooling air is conducted for application to various parts of the machine, as hereinafter set forth.

Carriage drive

Figure 4:
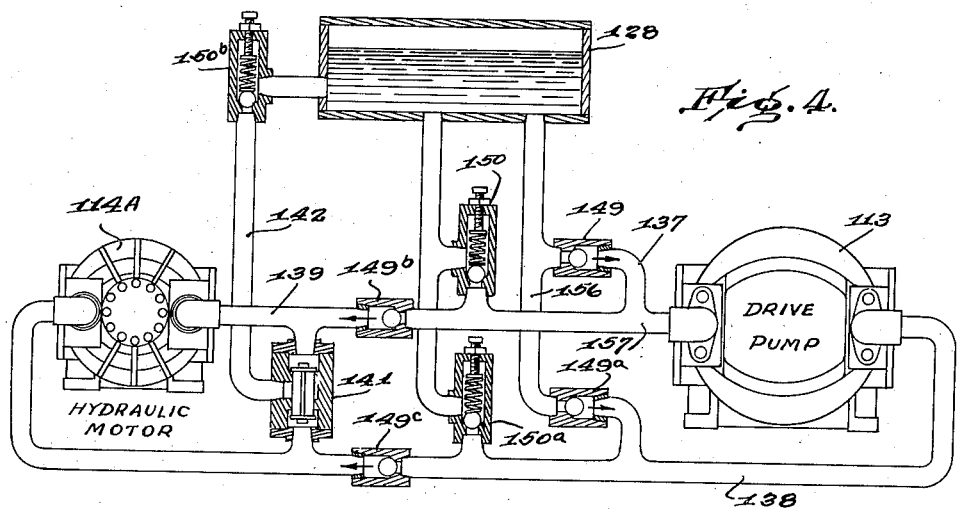
Fig. 4 is a diagrammatic view of the hydraulic pump and motor by which the mold carriage is driven, and the hydraulic circuits and controlling devices therefor.

Referring to Figs. 2 to 4, inclusive, the mechanism for rotating the mold carriage is as follows:

The rotary hydraulic pump 113, when driven by the electric motor 114, draws the oil or other operating fluid from the reservoir 128 through pipe line 137. The oil is driven by the pump through pipe line 138 to the rotary hydraulic motor 114A, thereby driving the latter. The oil after circulating through the motor is returned to the tank through pipe line 139 (Fig. 4), a differential valve 141 and pipe 142.

The oil in the reservoir is maintained at a working temperature by circulating a temperature regulating fluid through a pipe line 143 (Fig. 2) within the oil reservoir. During the normal operation, this fluid may consist of cold water for extracting heat from the oil. However, in starting the apparatus when cold, it is sometimes necessary to heat the oil to a working temperature and this is done by circulating steam through the pipe 143. The pipe line 137 includes a section 137ᵃ within the oil tank and extending lengthwise thereof, through which section the pipe 143 extends. With this arrangement, the oil supplied to the driving pump 113 is brought into close contact with the pipe 143 so that its temperature is effectively controlled.

The shaft of the motor 114A has a worm driving connection 144 with a vertical drive shaft 145 which extends upward through a bearing sleeve 146 in the oil reservoir. Secured to the upper end of the drive shaft is a pinion 147 which meshes with an annular drive gear 148 (Figs. 2, 17 and 23) on the lower end of the mold carriage.

Referring to Fig. 4 which shows diagrammatically the circuits for the drive pump and motor, check valves 149, 149ᵃ, 149ᵇ and 149ᶜ are placed in the circuits as indicated. These are one-way valves which permit a flow in the direction indicated by the arrows. Pressure relief valves 150, 150ᵃ and 150ᵇ are also provided, the construction of which is shown in Fig. 66C. Each said valve comprises an inlet port 151 and an outlet 152. A valve ball 153 prevents backward flow through the valve, the ball being held to its seat by a coil spring 154, the tension of which may be adjustably regulated by an adjusting screw 155 to adjust the pressure at which the valve will operate.

As above described, the circulation of oil is from the tank through pipe 137 to the pump 113 and from the pump to the motor 114A through pipe 138. However, the direction of flow through the pump and motor, and consequently their direction of rotation, may be reversed in a manner hereinafter explained. When thus reversed, the circulation is from the tank through pipe line 156 and check valve 149ᵃ to the pump and from the pump through line 157, check valve 149ᵇ, and line 139 to the motor 114A. From the motor the oil is returned to the tank by way of the differential valve 141, pipe 142 and pressure relief valve 150ᵇ.

The construction of the differential valve 141 is shown in Fig. 66D. It includes a valve casing having end ports 159 and 160 and an intermediate port 161. A valve member 162 is movable lengthwise in the casing. When in the position shown, it opens communication between the ports 159 and 161 and closes communication by way of port 160. When reversed, the port 159 is shut off and communication opened between ports 160 and 161. The valve 141 as shown in Fig. 4, is connected across the pipe lines 138 and 139 extending from the terminals of the hydraulic motor 114A so that the position of the valve piston is controlled by the pressure differential between said terminals. The construction of the valve as just described is such that it opens communication from the low pressure or exhaust port of the motor to the tank. The arrangement is such that the motor can be driven by the pump in either direction and without either the pump or motor being short circuited by the pipe lines leading to the tank.

The relief valves 150 and 150ᵃ are connected in circuit between the tank and the lines 157 and 138 leading, respectively, to the pump terminals or ports. Any excess pressure built up in the line 137 will operate relief valve 150, permitting a return flow to the tank independently of the pump. The relief valve 150ᵃ will operate in like manner to prevent any excess pressure being built up in the line 138. Such pressures may be caused by an overload on the motor 114A, the relief valves then providing a return circuit from the pump to the tank independently of the motor, thereby preventing an overload on the pump.

*Dip head mechanism*

A description will now be given of the mechanism by which the dip heads 107 which carry the gathering molds are lowered to bring the molds into dip and then lifted, while traveling over the gathering area. The lifting and lowering movements of all the dip heads are effected by the piston motor 108 (Figs. 3 and 7), which motor is driven by the rotary hydraulic pump 115, the latter in turn being continuously driven by the electric motor 116 (Fig. 3A), the drive shaft 165 of which is directly connected to the drive shaft of the pump 115. Pipes 166 and 167 extend from the motor 115 to the motor 108, opening, respectively, into the lower and upper ends of the motor cylinder.

The motor 108 comprises a piston 168 and piston rod 169. A vertical connecting rod 171 (Figs. 7 and 29) is pivoted at its lower end to the piston rod, and at its upper end is pivoted to the inner end of the dip head lever 172. Said lever is fulcrumed on a pivot pin 173 mounted in a frame 174 (Figs. 29 and 50) which in turn is mounted on a cam plate 175 and secured thereto by bolts 176. The cam plate is fixed to the center column 100. The outer end of the dip lever 172 has a pivotal connection with a block 177 which serves as a connector through which the dip heads are connected in succession to the dip lever 172. This connector 177 is mounted to reciprocate vertically and is guided in its movements by guide bars 178 bolted to the frame 174. The pivotal connection between the lever 172 and the connector 177 includes a cylindrical bearing head 179 bolted to the lever, and a bearing block 181 in which the head 179 is journaled. The block 181 is mounted in the connector 177, being free for limited movement radially of the machine to accommodate the arcuate movement of the bearing head 179. The connector 177 is formed in its outer face with a cam track or groove 182 extending lengthwise thereof. The cam track is periodically brought into alignment with a stationary cam track 183 which is concentric with the mold carriage. Each dip head carries a cam roll 184 which runs on the track 183 and controls the vertical position of the dip head.

As each dip head during its travel with the mold carriage, approaches a position over the gathering tank, its cam roll 184 runs off the track 183 onto the track 182 which at this time is in alignment therewith. The dip lever 172 is then operated by its motor 108 to lower the dip head to the Fig. 29 position so that the mold 102 is brought into dip for gathering its charge. The motor 108 is then reversed to lift the dip head, the track 182 being thereby brought in line again with the track 183, permitting the dip head to continue its travel with the mold carriage, with the cam roll 184 again running on the cam track 183.

The rotary hydraulic pump 115, as shown in Figs. 8 and 9, may be of standard construction and need not be described in detail. Briefly, it comprises a casing 185 in which is journaled a driving shaft 186. A rotor 187 is mounted for rotation in an adjusting frame 188, the latter slidably mounted in the casing 185 for reciprocating the rotor within the casing. The shaft 186 has keyed thereto a driving element 189 formed with radially disposed cylinders 191 in which reciprocate pistons 192 carried by said rotor. The frame 188 is provided with a stem 193 extending outward through an opening in the casing and having connections as hereinafter described for shifting the rotor.

When the drive shaft is rotated, the rotor being mechanically connected is rotated therewith. If the rotor is eccentric to the drive shaft, such rotation causes a reciprocation of the pistons and thereby forces a driving fluid to circulate through the pump, the fluid entering by way of one of the ports 194 and leaving through the other of said ports. When the drive shaft is shifted from one side to the other of a central position, the direction of fluid circulation is reversed, thereby reversing the piston motor 108.

The lifting and lowering movements of the dip head are positively controlled by mechanical means supplemental to the hydraulic piston motor 108. Such mechanical means (see Figs. 3, 7, 11, 12 and 78) includes a cam plate 195 formed on its under surface with an endless cam track 196, said cam plate being bolted to the under face of a gear wheel 197 mounted for rotation on a bearing sleeve 198, the latter bolted to the base plate 133. The gear wheel 197 is driven by a pinion 199 keyed to the lower end of the drive shaft 145. The gears are so proportioned that the cam plate 195 is given five complete rotations during each rotation of the mold carriage. A cam roll 200 which runs on the cam track 196 is carried by a slide bar 201 mounted to reciprocate in a guide 202, said bar having a link connection to one arm of a bell crank 203, the other arm of which is connected to a link 204 (Fig. 7) which may be slidably mounted on the motor piston rod 169. The lower, headed end of the piston rod forms a stop to limit the downward sliding movement of the link on the rod.

With this construction, the lifting or up movements of the dip heads are positively controlled by the cam 196. This control serves as a safety feature acting positively to synchronize the lifting movements of the dip heads with their rotary travel with the carriage. In this manner, failure of a dip head to lift the mold at the proper time, which might cause interference between the mold and the gathering tank, is positively prevented. It will be understood, however, that the up and down movements of the dip heads are normally effected and controlled by the hydraulic motor 108. The sliding connection between the link 204 and the piston rod 169, permits the linkage between the cam 196 and the piston rod to operate idly when any selected dip head is temporarily held up by means hereinafter described, and prevented from going through its normal dipping movements. That is to say, if a dip head is held in its up position, the piston rod 169 is held in its lowered position, so that the link 204 can slide idly up and down on the rod. But when a dip head is down, the piston rod is up and holds the link 204 in the up position, and when the link is drawn down by the cam 196, it draws the piston rod down and lifts the dip head.

*Speed control and synchronization of hydraulic pumps and motors*

The speeds of the three hydraulic pumps 113, 115 and 117 are controlled by cam mechanism which automatically effects the periodic variations in the speed of each pump as required for the operation of the various motors driven by the pumps. This cam mechanism will now be described, reference being had particularly to Figs. 2, 3, 3A and 10. A vertical cam shaft 205 (Fig. 3) is continuously rotated by the gear wheel 197. A driving connection between said shaft and gear is provided by a bearing sleeve 206 keyed to and forming an extension of the shaft 205, said sleeve rotating in the bearing sleeve 198. The sleeve 206 is formed with a flange bolted to the hub of the gear wheel 197. Keyed to the cam shaft are cams 207, 208 and 209 (shown in detail in Figs. 75 to 77) controlling, respectively, the dip pump 115, the pump 117 for lifting and lowering the finishing mold carriers, and the drive pump 113 which rotates the mold carriage. It will be noted that during each complete rotation of the mold carriage, the cam shaft 205 is given a number of rotations equal to the number of heads or units on the mold carriage—in this instance five. Each cam on said shaft, therefore, operates during a complete rotation of the mold carriage, to effect five complete cycles of operations of the pump controlled thereby, namely, one cycle for each head or unit.

The cam 207 operates through the following mechanism to control the speed of the dip pump 115. A cam roll 211 (see Fig. 10) runs on the cam 207, said roll being carried by a block 212 slidable in a guide frame 213. A link 214 connects the block 212 with the lower end of a vertically disposed lever 215. This lever has a pivotal mounting in a bearing block 216 which, as shown in Fig. 10, is made in sections secured together by bolts 217. The connection between the lever 215 and the block 216 includes a rectangular sleeve 218 through which the lever extends and which has a sliding connection with the lever. The sleeve 218 is formed with trunnions 219 journaled in the block 216 and providing a fulcrum for the lever. A vertical adjusting rod 221 extends through the block 216 and has a screw threaded connection therewith. The rod 221 is rotatable manually by means presently to be described, for adjusting the block 216, and with it the sleeve 218, up and down, and thereby shifting the fulcrum of the lever 215.

The upper end of the lever 215 (see Fig. 8) is connected to the stem 193 which, as before described, is connected for adjusting the pump shaft and thereby controlling the speed and direction of rotation of the pump. A coil spring 222 reacts through the lever 215 to maintain the cam roll 211 in contact with its cam. The dip cam 207 is so designed that during each rotation it operates through the connections just described to drive the dip pump, first, in the direction required to lift the piston 168 (Fig. 7) for lowering a dip head, then stop the pump while the mold is in dip and gathering its charge of glass, then rotate the drive pump in the reverse direction for lowering the piston 168 and lifting the mold out of dip, and finally arresting the pump.

The cam 208 which controls the mold carrier pump 117 for effecting the lifting and lowering of the finishing mold carrier, operates through connections including a lever 223, the upper end of which is connected to the cam roll and the lower end of which is connected through a link 224 to the lower end of a lever 225. The latter extends through a bearing block 226, the construction of which may be substantially identical with that of the block 216 (Fig. 10). A vertical rod 227 has a screw-threaded section 228 extending through the block 226 for adjusting the latter up and down. The upper end of the lever 225 has a connection 229 with the pump 117.

The cam 209 which controls the speed of the drive pump 113, operates through a link 231 and lever 232, the latter having a connection at its upper end with the pump. The lever 232 extends through a bearing block 233 which may also be of the same construction as the block 216. An adjusting shaft 234 extends through the block 233 and has a threaded connection therewith. The adjusting rods or shafts 221 and 234 are journaled in bearing brackets 235 and both said shafts extend through both the bearing blocks 233 and 216.

A hand wheel 236 is attached to the rod 234. Intermeshing gears 237 are keyed to the shafts 221 and 234, respectively. Intermeshing bevel gears 238 and 239 are mounted, respectively, on the shaft 234 and a horizontal shaft 241, the latter having a driving connection through bevel gears 242 and 243 with the shaft 227.

It will be seen that the three adjusting shafts 221, 234 and 227 are interconnected through the gearing just described, so that rotation of the hand wheel 236 will rotate all of said shafts, thereby effecting a simultaneous and synchronized adjustment of the three rotary driving pumps. Thus, when the speed of the mold carriage is manually adjusted, the speed and timing of the dip head movements and the movements of the finishing mold carriage will be correspondingly adjusted and maintained in synchronism.

*Finishing mold carriers and mechanism for lifting and lowering them*

The pump 117, as heretofore noted, operates the hydraulic piston motors 111 (Figs. 5 and 16) individual to the finishing mold units for controlling the up and down movements of the finishing molds and their carriers.

Referring to Figs. 14 to 18, each finishing mold 104 is supported on a carrier unit 244 which is reciprocated vertically, the mold also being given a swinging movement under the control of a cam 256. The piston rod 245 of the motor 111 has connected to its upper end a head 246 through which a pivot rod 247 extends transversely, the ends of the pivot rod having bearings in a frame 248 which forms part of the mold carrier unit. Each frame 248 is mounted for vertical sliding movement in a supporting and guiding frame 249. The frame 249 (see Figs. 6 and 17) comprises sections secured by bolts 251 to the lower plate 252 of the mold carriage. Guide strips 253 (Fig. 14) overhang the front faces of the vertically sliding frames 248 and hold them in position within the guiding frame 249.

Each carrier unit 244 includes a swinging frame 244ª journaled on the pivot rod 247 and carrying the mold 104. The swinging section 244ª includes a depending arm 254 carrying a cam roll 255 which runs on the cam 256 which controls the swinging movements. Fig. 16 shows the finishing mold in its lifted or parison transfer position. As the mold carrier is lowered, it has an initial vertical movement and then the frame section 244ª swings inward to the dotted line position (Fig. 16).

This combined vertical and swinging movement permits a very compact arrangement of the parts so that the mold radius of the machine, or radial distance of the mold from the axis of the carriage, can be made much shorter than with the usual arrangement found in Owens type machines wherein the lifting and lowering of the finishing mold is entirely a swinging movement about a horizontal axis. The present construction also permits the mold to be lowered sufficiently to clear the gathering pot 106 while maintaining a relatively short radius of swing.

Hydraulic pressure is transmitted from the pump 117 by way of a pipe line 257 (see Figs. 3 and 61) including a pipe which extends from the bottom of the machine upward through the center of the column 100. This pipe at its upper end opens into an oil chamber 258 (Fig. 61) formed in a casting 259 mounted for rotation with the mold carriage. The casting 259 is carried by arms 260 bolted to a casting 261 which forms part of the rotating distributor head. A center post 262 screw threaded on the upper end of the pipe 257, provides a bearing for the rotating member 259. The pressure line is extended from the chamber 258 at the top of the machine, downward through a conduit 263 (see Fig. 6) formed in the frame 249, said conduit at its lower end communicating through a pipe section 264 with a distributing pipe 265 which extends entirely around the mold carriage.

Referring to Figs. 5, 6, 16, 23 and 25, valves 266 individual to the piston motors 111 are operative, each to connect the pressure distributor pipe 265 with its motor. Each of the connecting lines from the pipe 265 to the corresponding piston motor is as follows: Extending from pipe 265 is a vertical pipe section 267 (Fig. 23) which opens into a port 268 in a safety interlocking valve 269 (hereinafter described). The line continues through a port 270 in said valve 269, thence through pipe 271 (Figs. 5 and 6) to an intake port 272 (Figs. 5 and 25) of valve 266. The intake or pressure port 272, as shown in Fig. 25, is closed by the valve piston under the influence of a coil spring 273. This is the normal position while the finishing mold is in its lowered position. The valve piston is actuated by a stationary cam 274 (Fig. 6) which, as the mold carriage rotates, is engaged by a cam roll 275 on the valve piston and moves the latter to the left (Fig. 25), thereby opening the pressure port 272 to a port 276 from which a pipe 277 leads to a channel 278 (Fig. 16) opening into the lower end of the motor cylinder. This supplies pressure for lifting the motor piston and with it the mold carrier.

The valve 266 is provided with an exhaust chamber 279 which communicates with the port 276 when the valve piston is released from its cam and moves to the Fig. 25 position. This allows the mold carriage to lower, the escaping oil from the motor 111 being returned to the supply tank as the carriage descends. A check valve 280 (Fig. 25) held closed under spring pressure, is provided in a drain passage 280ª connecting with the chamber 279 to prevent the pipe 277 and the valve 266 from draining completely, thus limiting the possibility of air entering the system, which would result in non-uniform motion of the mold carriage during the succeeding raising operation.

Finishing mold opening and closing mechanism

The finishing mold opening and closing mechanism is illustrated in Figs. 5, 6, 14 to 16, and 19 to 24, and is operated by means of hydraulic pressure controlled by a valve mounted at the base of the mold carriage on the plate 252.

Figure 5:
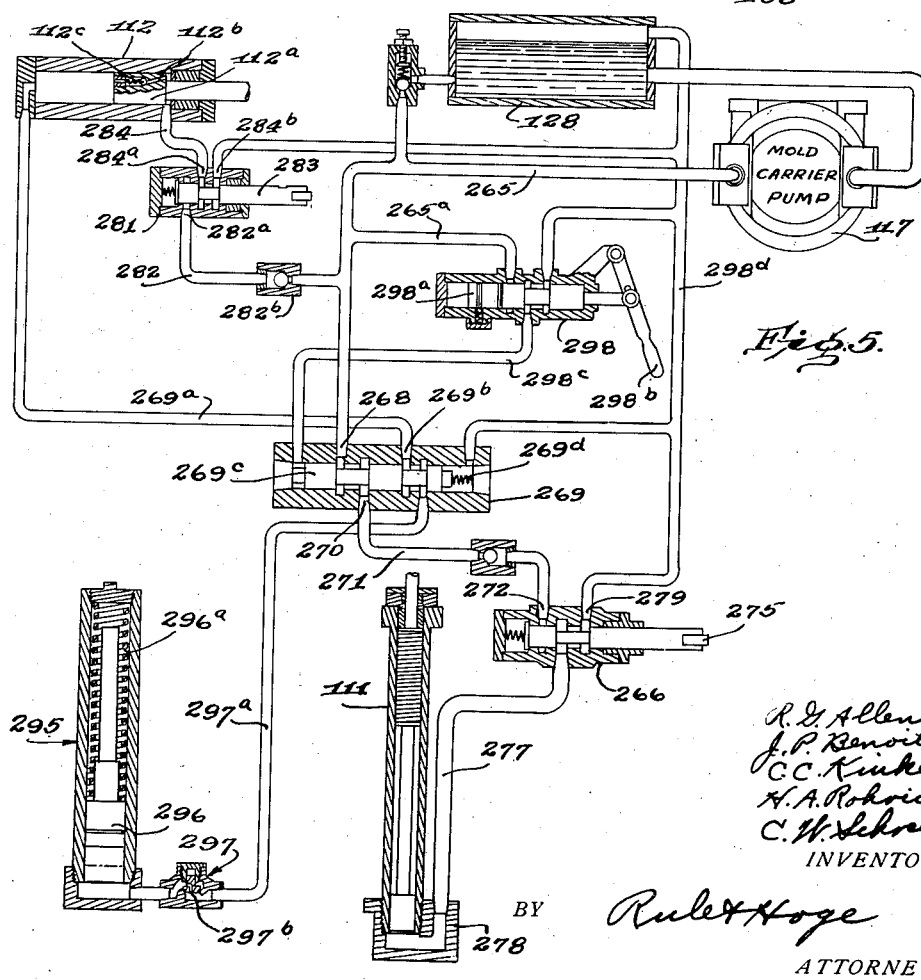
Fig. 5 is a diagram showing a hydraulic motor for opening and closing the blank molds, a hydraulic motor for lifting and lowering the finishing mold carrier, and valve mechanism and hydraulic circuits for said motors.

Referring to Figs. 5, 6 and 24, valves 281, individual to the mold opening and closing motors 112, serve to connect the pressure distributor pipe 265 with each of the motors. A pipe 282 extends from the pipe 265 to connect with an intake port 282ª (Figs. 5 and 24) in the valve 281. A check valve 282ᵇ in the line 282 operates as hereinafter described to prevent any decrease in pressure during the mold closing operation. The valve 281 includes a piston 283 which is shown moved to the right or in its outward position required for holding the molds closed. A coil spring 283ª maintains constant pressure to force the piston 283 toward the right, thus sealing the intake port 282ª. A port 284ª is connected by a pipe 284 to the front end of the piston motor 112, the ports 282ª and 284ª being brought into communication when the valve piston 283 is moved inward or to the left to cause opening of the mold at the point of delivery. An exhaust port 284ᵇ is in communication with the port 284ª when the valve piston is in the position shown (Fig. 24).

The valve piston 283 is moved inward against the tension of the spring 283ª by means of a cam 283ᵇ (Fig. 6) for effecting the opening of the finishing molds, and is held in its inward position by a latch mechanism 285 (Figs. 5, 6, and 20 to 23) bolted to the front of the valve 281 adjacent the valve stem 283. The mechanism comprises a vertical slideway 285ª having mounted therein a hollow slide 286 provided at its lower end with a cam roll 286ª for engagement with an inclined cam 287 mounted on the base plate 127. A latch member 288 slidably mounted within the hollow slide, is provided with a finger 289 for engagement with a notch 289ª in the valve stem 283. A stop member 290 bolted to the slideway 285ª projects into the slide 286 to limit the downward movement of the latch 288. A coil spring 291 disposed between the stop 290 and the bottom of the slide exerts a constant downward pressure on the slide.

An adjusting screw 292 having threaded connection with the latch 288 is provided with shoulders 293 adapted to bear against the slotted upper end 294 of the slide 286 for raising and lowering it. It will be noted that rotation of the adjusting screw 292 will cause a vertical movement of the slide 286, thereby changing the elevation of the point of contact between the cam roll 286ª and the cam 287.

The cam 283ᵇ (Fig. 6) is arranged to shift the valve piston 283 inward, as above described, to cause opening of the mold at the delivery station. When this inward movement of the valve piston occurs, the latch finger 289 drops into the notch 289ª to hold the valve piston until the latch is released by the cam 287.

Finishing mold closing mechanism (accumulator)

Each finishing mold unit includes an accumulator 295 (Figs. 5, 6, 16 and 19) for closing the molds, the said accumulator being under the control of the valve 281. The accumulator comprises a cylinder 295ª and a piston 296 mounted within the cylinder and which carries a coil spring 296ª to force the piston toward the bottom of the cylinder. A check valve 297, which is opened by fluid pressure in the direction of the cylinder, is located in the feed pipe 297ª and permits oil to flow into the cylinder. A metering port 297ᵇ in the valve allows pressure to escape for closing the molds.

The oil for charging the accumulator is supplied thereto through the motor 112 when oil under pressure is supplied to the front end of the motor for causing it to open the molds. The motor piston 112ª is provided with a bypass 112ᵇ in which is a ball check valve 112ᶜ for retaining the mold closing pressure. After the molds are open, the oil from the valve 281 flows through the bypass 112ᵇ and into a pipe 269ª leading to a port 269ᵇ in the safety interlocking valve 269. The port 269ᵇ connects with the pipe 297ª leading to the cylinder 295 to complete the circuit. Pressure entering the cylinder overcomes the pressure of the spring 296ª and raises the piston 296 to the position shown in Fig. 19. When the valve 281 is shifted to close the molds, thereby releasing the pressure on the front end of the piston 112ª, the piston 296 descends to the dotted line position, the distance indicated at A (Fig. 19) being determined by the displacement of the piston 112ª.

Associated with the safety interlocking valve 269 of each mold carriage unit is a manually operable valve 298 (Figs. 5 and 26) which provides a safety feature. Should a part of the mechanism break or become damaged to the extent of placing the unit out of service, the valve 298 may be operated and functions as hereinafter explained, to prevent lifting of the mold carrier or closing of the mold. The valve 298, which may be mounted at any suitable place on the machine, includes a plunger 298ª shiftable by means of a hand lever 298ᵇ. The valve is shown in the position assumed when the mold carriage is in normal operation. A pipe 298ᶜ connects the valve 298 with one end of the safety interlocking valve 269, and a pipe 265ª connects the valve with the pressure line 265. With the valve piston 298 in the position shown, the line 265ª is closed and the line 298ᶜ open through the valve to a return line 298ᵈ leading to the supply tank 128. This permits a coil spring 269ᵈ in the safety interlocking valve to hold the plunger 269ᶜ in the position shown. When the hand lever 298ᵇ is operated to shift the plunger 298ª to the left, a pressure line is established including pipes 265, 265ª, valve 298 and pipe 298ᶜ leading to the valve 269. The valve plunger 269ᶜ is, therefore, moved to the right and closes the circuits through pipes 269ª, 270 and 297ª. This prevents lifting of the mold carrier and closing of the mold.

The mold raising motor 111 (Figs. 5, 16 and 18A) is provided with means for cushioning the upward stroke of the mold carriage. The cushioning means includes a flanged sleeve 111ª surrounding the piston rod 245 and supporting a coil spring 111ᵇ. The lower end of the coil spring bears against a collar 245ª pinned to the piston rod 245. The sleeve is provided with longitudinal slots 245ᵇ to receive a pin 245ᶜ carried by the piston rod. The spring 111ᵇ is normally extended when the mold carrier is in lowered position and forces the flanged sleeve upwardly until the lower ends of the slots 245ᵇ engage the pin. As the mold carrier rises, the flange will strike the cylinder cap, causing compression of the spring during the continued upward movement of the mold carrier until it reaches the limit of the stroke.

The cushioning means for the down stroke is in the form of a bumper 249ᵃ (Fig. 16A) mounted beneath the slide frames 249 and comprises a coil spring enclosed within sleeves 249ᵇ, the outer sleeve having a hardened steel cap for engagement with the slide frames.

Parison mold and head group

Figs. 27 to 38 inclusive illustrate the mechanism comprising a parison mold unit, the description of which follows:

The dip head 107 includes a dip frame 301 mounted for vertical sliding movement in slide rails 302. The slide rails are bolted to brackets 303 (Figs. 30 and 29) secured to the upper end of the finishing mold guide 249, and rotate as a unit therewith. The brackets 303 are braced against centrifugal strains by means of a flanged ring 303ᵃ surrounding the central column 100.

As heretofore described, the dip frame 301 is provided near its upper end with a cam roll 184 for periodically connecting the dip frame with means for lowering and lifting it and thereby bringing the blank mold into and out of contact with the supply body of molten glass. The mold 102 is supported on a supporting head 305 (Fig. 29) carried by and vertically adjustable on the dip frame 301. The supporting head 305 is mounted on the lower portion of the frame 301 which extends inwardly in substantially semi-circular form and is provided with vertical slideways 304 (Fig. 32) in which are mounted for vertical movement, ribs 305ᵃ on the mold supporting head 305.

Mechanism is provided for adjusting the mold and its supporting head 305 up and down relative to the dip frame. Such mechanism includes a threaded rod 306 (Fig. 29), the upper end of which is journalled for rotation in a housing 307, secured to the dip frame. The lower end of the rod 306 is threaded into a sleeve 308 connected to the head 305. Rotation is imparted to the rod 306 by means of a worm gear 309 secured to the upper end thereof within the housing 307. The worm gear is engaged by a worm 310 on a shaft 311 which extends radially outward and is provided with a hand wheel 312. Rotation of the hand wheel effects a vertical adjustment of the blank mold group in relation to the finishing mold unit, as is at times necessary to insure proper registration of the molds during the operation of the machine.

Each blank mold 102 comprises a pair of mold halves, supported by arms 313 journaled on a hinge pin 314 carried by the head 305. The opening and closing movements of the blank mold are effected by a stationary cam 346 (Figs. 29, 30) on which runs a cam roll 345 having operating connections with the mold through mechanism which will now be described.

Such mechanism includes pairs of links 315 and 315ᵃ pivotally connected at 315ᵇ (Fig. 31). The links 315 are pivoted to the mold arms 313 and the links 315ᵃ are pivoted at their outer ends 317 to crank arms 318 (Fig. 34). The cranks 318 are mounted on shafts 319 (Figs. 34 and 38) journaled in the head casting 305 and extend upwardly therethrough. Secured to the shafts 319, near their upper ends, are arms 320 formed with clevises 321 at their outer ends. Rods 323 pivoted at their inner ends within said clevises, extend through upstanding ears 322 on the head casting 305. The rods 323 at their free ends are screw threaded to receive nuts 324. Springs 324ᵃ are carried on the rods 323 and are held under compression between the nuts 324 and the ears 322, the purpose of which will be described hereinafter.

The inner end of the head casting 305 is provided on its underside with slideways 325 adapted to receive a slide block 326 (Figs. 29, 34, 37, 38). An equalizing bar 327 extending transversely through the slide block 326 is connected to the arms 315ᵃ as at 329 by a pair of links 330. By reference to Fig. 34, it will be seen that when the molds are in closed position, the links 315 and 315ᵃ have been pushed outwardly by the equalizing bar 327 and the links 330 slightly beyond the straight line position. The springs 324ᵃ operating through the cranks 318 also exert an outward pressure on the links 315ᵃ, thus securing a positive locking of the molds in closed position. The blank mold slide 326 is connected to a crank arm 331 by means of a draw link 332 pivoted to the slide block 326 as at 333. The crank arm 331 is secured to a vertical shaft 334 journaled in the head casting 305. The upper end of the shaft 334 has a splined connection 335 with a bearing sleeve 336, mounted for rotation in a frame 337 secured by a tie bar 337ᵃ to the slide rails 302 for rotation with the mold carriage. An arm 338 is keyed to the sleeve 336 within the frame 337 and is adapted to impart motion to the shaft 334 for opening and closing the blank molds.

A pair of slide blocks 340 and 341 (see Figs. 35, 36) are mounted for horizontal reciprocating movement within the frame 337. The upper slide block 340 is provided with longitudinal ribs 342 adapted to slide in grooves 343 in the vertical side walls 344 of the frame 337. The block 340 is provided on its top with the cam roll 345 which, as above mentioned, runs on the cam 346 formed on the cam plate 175. Secured to the lower side of the block 340 at its inner end and extending rearwardly thereof, is a stop block 347 (Figs. 29 and 29A) having pivoted thereto a latch 348 normally extending forwardly and downwardly.

The lower slide block 341 is provided with ribs 349 adapted to slide in grooves 350 in the side walls 344. The block 341 is formed at its inner end 351 (see Figs. 29, 29A and 35) to receive a link 352 pivoted thereto at 353. The said link 352 is pivotally connected to the arm 338 by a pin 354.

The molds are closed by means including the downwardly extending latch 348 which bears against shoulders 355 (see Figs. 35, 36) slightly inclined from the vertical, formed on a sleeve 356 mounted in a cylindrical opening 357 in the slide block 341. The said sleeve 356 is capable of limited horizontal movement against the pressure of a coil spring 358 mounted within the sleeve. The forward end of the spring 358 bears against a collar 359 threaded into the block 341. A rod 360 secured at one end within the sleeve 356 forms a support for the spring 358 and maintains the said sleeve in normal operating relation within the block 341 by means of a head 361 bolted to the outer end of the rod 360 and normally positioned within the collar 359. A latch releasing bar 362, having an upwardly and outwardly inclined face, is secured to the block 341 and extends between the inclined shoulders 355 on the sleeve 356.

It will be noted that outward pressure of the cam 346 against the cam roll 345 will cause the latch 348 to bear against the inclined shoulders 355. The spring 358 is of sufficient strength to withstand pressure normally necessary for closing the molds. Thus, it will be seen that the relative positions of the latch 348 and shoulders 355 will remain unchanged during the mold closing movement. Should some obstruction or breakage occur which prevents the closing of the mold, the latch 348 bearing against the shoulders 355, moves the sleeve 356 forward against the pressure of the spring 358 until the latch overrides the sloping face of the releasing bar 362 and is thereby disengaged from the shoulders 355. This breaks the driving connection between the upper and lower slide blocks 340 and 341. Fig. 29A shows the latch 348 (in dot and dash lines) about to become disengaged from the shoulders 355.

Neck mold mechanism

The neck mold 103 comprises a pair of standard neck mold halves 370 (Fig. 37) supported in a pair of arms 371 pivoted on the hinge pin 314. The arms 371 are provided rearwardly of the journal with lugs 372 to which are pivoted links 373. The links 373 are pivoted at 376 to a drawbar 374 slidably mounted in grooves 375 (Fig. 38) in the slide block 326. A draw link 377 (Figs. 29, 34) pivoted to the bar 374 at 378, provides operating connection with a rock arm 379 mounted on a vertical shaft 380 carried at the inner end of the head casting 305. A plate 381 (Fig. 31) bolted on the casting 305 provides the lower bearing for a vertical splined shaft 382.

A pair of meshing gear segments 383 and 384 respectively are secured on the shafts 380 and 382 so that the rotation of the shaft 382 imparts movement to the neck mold through the mechanism just described. The upper end of the splined shaft 382 is disposed within a splined sleeve 385 (see Fig. 33) rotatably mounted in the frame 337 and held against vertical movement by a collar 386. An arm 387 carrying a cam roll 388 is keyed to the sleeve 385 beneath the frame 337. A stationary cam plate 389 supports a cam 390 (shown in dotted lines in Fig. 30), which cam periodically engages the cam roll 388 and operates through the mechanism just described to open the neck molds.

Means for closing the neck molds comprises a spring 393 (Fig. 31) mounted on a rod 391 pivoted at one end to the gear segment 384 and having its opposite end extending freely through an opening in an upright flange 392 mounted on the casting 305. A tension spring 393 carried by the rod 391 exerts pressure against the gear segment 384, thereby operating through the above described mechanism to close the neck mold and tending to hold it in closed position.

Blank and neck mold lock

Figs. 30, 32 and 35 further illustrate means whereby the blank and neck molds may be locked in open position should occasion arise which makes it desirable to maintain a particular head out of service during the operation of the machine.

The mechanism comprising the lock includes a housing 395 secured to one side of the frame 337 adjacent the shaft 382. A latch member 396 (Fig. 35) is slidably mounted in the housing and consists of a rectangularly shaped bar formed at its inner end to fit a notch 397 cut in one of the ribs 342 carried by the slide block 341. The outer end of the bar 396 is provided on one side with gear teeth 398 adapted to mesh with a gear 399 for moving the bar into and out of locking engagement with the slide block 341. A shaft 401 secured to the gear 399 extends downwardly within the housing 395 and carries a second gear meshing with teeth 402 on a second latch bar 403. The bar 403 extends in the direction of the neck mold shaft 382 and has locking engagement with an outwardly and upwardly extending ear 404 attached to the cam roll arm 387. A lug 405 (Fig. 30) formed on the sleeve 385 forms a stop for the latch bar 403 when the said bar is in locking position.

A rod 406 formed as a part of the bar 403 extends radially outward of the machine and is supported at its outer end in a bracket 407 (Fig. 32) bolted to one of the rails 302. A pressure spring 408 disposed on the rod 406 exerts pressure between the bar 403 and the bracket 407, thereby maintaining a constant locking pressure on the lock mechanism. A hand wheel 409 journaled in the bracket 407 has swivel connection with the rod 406 and is provided with a pin 410 registering with a notch 410ᵃ in the bracket to maintain the lock in open position. A slot 411, 90° removed from the notch 410ᵃ is provided in the journal of the bracket 407 permitting the hand wheel 409 and rod 406 to move forward under pressure of the spring 408 when it is desired to lock the molds in open position.

The simultaneous locking of both the blank and neck molds occurs with the molds wide open when the hand wheel 409 is revolved 90° until the pin 410 registers with the slot 411 and is released. The latch bars 396 and 403 are forced by pressure of the spring 408 into their respective notches, thus holding the molds open until the hand wheel 409 is returned to its former position.

Dip head support

As before pointed out, each finishing mold is periodically lifted to a position at which it can be closed around the parison supported in the corresponding neck mold. It is important that the molds while thus in register be held against any relative movement. As a certain amount of vibration is imparted to the dip heads while they are supported by and travel along the stationary cam, means are provided for supporting each dip head directly on the corresponding finishing mold carrying frame 248 (Figs. 30 and 30A) during such registration of the molds. For this purpose, each dip frame 301 is provided with legs 301A in alignment with the finishing mold frame 248 therebeneath so that when the latter is lifted to bring the finishing mold into line with the neck mold, the frame 248 lifts the dip frame 301 a short distance. This raises the cam roll 184 out of contact with the cam 182 as shown in Fig. 30A, thus preventing vibration of movement of the dip head relative to the finishing mold frame.

Levelling pins 248A mounted on the frame 248, are adapted to register with bushings 248B in the legs 301A. As the finishing molds rise, the pins 248A enter the bushings 248B so that the dip frame is securely held against lateral movement relative to the frame 248 while supported by the latter, and the finishing mold registers accurately with the neck mold.

Plunger operating cylinder

Each dip head 107 is provided with mechanism individual thereto for raising and lowering the plungers carried thereby and for operation of the associated blow slide, such mechanism being shown in Figs. 27, 29, 30 and 46 to 49 inclusive.

The said mechanism comprises a vertical air cylinder motor 415 having therein a reciprocating piston 416 and a piston rod 417 extending through the lower end of the cylinder. The cylinder is mounted on a bracket 418 which is bolted to the lower part of the dip frame 301 and extends radially outward of the machine, thereby placing the cylinder in vertical alignment with the dip head.

Secured to the lower end of the piston rod 417 is a cross head 419 adapted to receive a plunger holder 420 which carries plungers 421 and holds them properly spaced for causing the plunger tips to enter the neck mold 103 when the plungers are lowered. A guide rod 422 secured to the head 419, extends vertically through an opening 423 in the bracket 418, thus maintaining proper alignment of the parts during raising and lowering.

The plunger is lowered by air under pressure, regulated by a combined plunger and vacuum control valve (see Figs. 71, 72 and 72A) to be described later. The air enters the cylinder 415 through a pipe 424 (see Figs. 46, 47 and 72) connected to the cylinder head 425. An intake passage 426 leads from the pipe 424 through a ball check valve 427 under pressure of a coil spring 428, and thence through an opening 429 into the top of the cylinder.

During the upstroke of the piston 416, air escapes from the cylinder through a series of ports 430 in the side wall near the top of the cylinder communicating with a chamber 431 connected with the inlet 426 by passageways 432. A series of needle valves 433 placed in the side wall at right angles to the ports 430 regulate the flow of exhausting air after the piston has covered the ports 430, thereby allowing the pressure built up in the end of the cylinder to escape slowly until the piston has reached the end of the stroke. Passageways 434 connect the needle valves 433 with the inlet passage 426 and all exhausting air is caused to flow through the pipe 424 and escape through a valve 458 (Fig. 71) hereinafter described.

The valve 458 further controls the raising of the piston 416 by admitting air to a pipe 435 (Figs. 72, 48) from whence it flows through check valve 436 and passageways 437 to enter the cylinder 415 at the bottom. The air exhausting from the cylinder as the piston descends, is regulated by needle valves 438 (Fig. 48) and a shut-off valve 439 to form a cushion for the downward stroke of the piston. A pipe 440 leads from the valve 439 to the pipe 435, thus causing the air to exhaust through the valve 458.

Blow slides 442 individual to the heads are arranged for horizontal sliding movement in slideways 443 on the heads 305, each slide being operated by means of a link 444 pivoted midway of its length at 445 to the bracket 418. A yoke 446 pivoted to the upper end of the link 444 at 447 is pivotally connected to a pair of cam members 448 (see Fig. 49). The said cam members are connected at their inner ends by a spacing bar 449 and their outer ends are journaled on a shaft 450 mounted at the outer edge of the bracket 418. The cams 448 are provided on their inner surfaces with cam grooves 451 adapted to receive rollers 452 carried on either side of the head 419.

It will be noted by referring to Fig. 46 that as the plunger starts down the rollers 452 will draw the cam members 448 downwardly, causing the blow slide 442 by means of link 444 and the yoke 446 to move inwardly toward the center of the machine, out of the way of the descending plunger tips. As the plungers continue their downward movement, the rollers 452 run out of the grooves 451, leaving the entrance of the grooves facing downwardly (see Fig. 29) to be re-engaged by the rollers on the return stroke.

Plunger and vacuum control valves

The plunger and vacuum control valve units 454, shown in detail in Figs. 71, 72 and 72A, are located on the top of the machine (see Figs. 60, 65) and are individual to the several heads, thus permitting separate control of the operation as indicated by conditions pertaining to individual heads.

Each valve unit 454 comprises a valve body 455 having a base 456 adapted to be mounted on the machine. The valve body provides a housing for three separate valves namely, a vacuum control valve 457, a plunger lowering valve 458 and a plunger raising valve 459 (Fig. 72A). The valves are fed from a common source of air supplied under pressure from the distributing head located on top of the machine. The air enters the valve unit on one side through a pipe 460 opening into horizontal passageways 461. Vertical passages 462 extend from the passageways 461 to valve chambers 463 in which the valves 457 and 458 are located. Coil springs 464 within the chambers 463 hold the valves seated. The head 465 of the valve casing provides a bearing surface for the springs 464 and further serves as a guide for the valve stems. The stems of the valves 457 and 458 have cylindrical head portions 467 which form closures for the outer ends of valve chambers 468. The heads 467 extend beyond the valve casing and are adapted to be engaged by valve operating mechanism. The chambers 468 are provided with ports 469 to which are connected pipes leading to their respective motors. Thus the port 469 of the plunger lowering valve 458 opens to pipe 424 which connects with the top of the plunger cylinder 415 (Fig. 46). The plunger raising valve 459 is in like manner connected through pipe 435 (Figs. 72 and 48) with the bottom of the plunger cylinder.

The mechanism for operating the valves 457 and 458 (see Figs. 71, 72, 72A) comprises a horizontally disposed bar 470 parallel with the valves and mounted for reciprocation in a slideway 471 in the valve body 455. The bar 470 is provided with a cylindrical opening 472 longitudinally thereof in which is disposed a coil spring 473 adapted to hold the bar in a forward position. A stop block 474 secured rearwardly of the valve body projects into the opening 472 and bears against the spring 473. A lug 475 (Fig. 72A) projecting upwardly from the bar 470 carries a set screw 476 in line with and forming a stop for the valve 459. When the bar 470 is in its normal forward position as shown in Fig. 72A, the valve 459 is held open by the stop. It will be noted that while the valve 459 is held open, the air pressure supply pipe 460 is open through the valve to the pipe 435 leading to the lower end of the plunger cylinder 415, so that the plunger piston 416 will remain in raised position.

A crosshead 477 formed as a part of the bar 470 carries a cam roll 478 adapted to be periodically engaged by cam sections 682 and 683, Fig. 69, as described hereinafter. The crosshead 477 is further provided with set screws 479 in line with the valves 457 and 458 for actuating the said valves. As shown in Fig. 71, the valve 458 protrudes beyond the valve body a greater distance than the valve 457. The inward movement of the crosshead, as indicated by the dotted line position, opens the valve 458 slightly in advance of the opening of valve 457. Lowering the plungers into the mold head is thus effected before the vacuum or suction, controlled by valve 457, is applied to the mold cavities. The initial inward movement of the bar 470 allows the valves 459 (Fig. 72A) to close an instant before the valve 458 is opened. Exhaust ports 481 provide communication between the chambers 468 and the outside of the valve body, allowing the air from the open end of the piston motor to escape to the atmosphere when the valves are in closed position.

A latch 482 (Figs. 60 and 72A) pivoted to the valve body is adapted to engage and hold the slide 470 in its inward position and thereby maintain the valves 457 and 458 in open position, thus holding the vacuum on in the molds without the aid of a continuous cam.

*Vacuum pipe lines and valves*

Each dip head 107 is provided with a vacuum chamber 485 (Figs. 29 and 46) arranged in the head casting 305 adjacent the gathering molds 102 and 103 in a manner to permit the application of suction to the mold cavities for filling the molds at the proper predetermined time.

A constant source of vacuum supply is maintained within a vacuum chamber 486 (Fig. 61) in the distributing head 123 on top of the machine. The chamber 486 communicates through downwardly curved pipes 488, with a vacuum chamber 487ª formed by a hollow upper spider or table 487. The table 487 is rotatably supported on the upper end of the central column 100 and is secured for rotation with the mold carriage by the dip head slide rails 302 (Fig. 29).

Communication between the vacuum chamber 485 and the upper vacuum chamber 487ª is provided by means of a telescoping vacuum pipe 489 (Figs. 39 to 42 incl.) including a stationary or outer tube 490 bolted to the underside of the spider 487. An inner reciprocating tube 491 is secured at its lower end within a valve housing 492 bolted to a lateral extension on the head casting 305. A packing gland 493 bolted to the lower end of the tube 489 serves as a retainer for a series of packing rings 494 arranged to prevent the possibility of leakage due to excessive wear. The packing rings 494 are held in place by a ring 495 bolted to the tube 490.

The upper end of the tube 491 is formed with an upwardly and outwardly tapered flange 496, said flange being of slightly smaller diameter than the tube 490. An aggregate of steel balls 497 are held in place around the inner tube 491 by a tapered ring 498 slidably mounted on said inner tube. The ring 498 is tapered in a direction opposite that of the flange 496, thus tending to force the balls outwardly against the wall of the tube 490. A coil spring 499 surrounding the tube 491 bears against a stationary flange 501 bolted to the tube and exerts an upward pressure against the tapered ring 498, causing the steel balls to wipe along the inner surface of the outer tube 490 when the inner tube 491 is reciprocated by the dipping action of the head.

Sediment in the form of crystallized sulphur, due to the use of sulphur for lubricating the molds, and also the residue from vapors or gases, has a tendency to collect on the interior surfaces of the vacuum system, necessitating periodic cleaning thereof. The action of the closely packed balls on the tube 490 tends to scrape the tube clean with each dip of the head, the balls also acting as a seal between the telescoping tubes.

Within the valve housing 492 is a vertically movable vacuum valve 502 which, in its lifted or closed position, seats on a valve seat 503. The stem 504 of the valve extends through a guide ring 505 pressed into the valve housing 492. The upper end of the valve stem is provided with a head 506 formed to receive a yoke 507 carried on a rock-arm 508. The arm 508 is keyed to a rockshaft 509 which is mounted in the valve housing 492 and projects through one side thereof. A valve actuating arm 510 secured to the rock-shaft 509, is operatively connected to a valve operating piston motor 511 supported by a bracket 512 secured to the tube 491.

The piston motor 511 comprises a cylinder 513 having mounted therein a piston 514. A piston rod 515 pivotally connects the piston with the rock-arm 510. A coil spring 516 mounted on the piston rod holds the piston at the upper end of its stroke and at the same time holds the valve 502 closed.

Air for operating the motor 511 is admitted through a pipe 517 at the top of the motor cylinder, which pipe connects with the previously described vacuum control valve 457 (Fig. 71).

*Cut-off knife (hydraulic)*

Means for severing the glass from the mold after the charging operation comprises a standard cut-off knife and its operating mechanism, such as shown, for example, in Patent No. 1,879,712, to Schwenzfeier et al., to which mechanism have been added features designed to more readily adapt it to the present machine (see Figs. 43 to 45, 50, 50A and 50B).

The knife mechanism includes a housing 520 bolted to the under side of the upper table 487, a knife supporting rock shaft 521, and a knife or shear blade 522 fixed to the rock shaft. During the operation of the machine the rock shaft and shear blade are periodically moved up and down and also rocked about the axis of said shaft as more fully set forth hereinafter. A sleeve bushing 523 rotatably mounted within the housing 520, surrounds the shaft 521 and carries a gear 524. The said shaft 521 is slidably keyed to the bushing 523 to permit periodic up and down movement of the shaft and knife, and also to permit vertical adjustment of the knife during operation of the machine.

Vertical adjustment of the knife is accomplished by means of a hand wheel 525 mounted for rotation about the shaft 521 within a housing 526. Screw threads 527 on the shaft 521 engage corresponding threads in the hand wheel. The knife shaft 521 is moved up and down periodically by mechanism including a bell crank 528 supported by a bracket 529 carried by the housing 520. The mechanism for actuating the bell crank 528 and thereby lifting and lowering the knife, will be described hereinafter. The crank 528 is pivotally connected to a loosely mounted collar 530, thus allowing the knife shaft to be rocked while in either its lower or upper position.

Means for swinging the knife includes a rack bar 531 meshing with the gear 524. A rod 532 having one end threaded into the rack bar 531, is connected at its opposite end to a cam slide 533 mounted for reciprocation in a slide frame 534 bolted to the table 487. Movement of the cam slide 533 is transmitted to the rod 532 through a coil spring 535 carried by the rod. This provides a safety means which, in the event of any of the parts becoming jammed or any obstruction to the normal swing of the knife, allows the slide to move forward against the pressure of the spring without operating the knife. A cam roll 536 carried on the underside of the slide 533 is arranged to follow a cam path 537 in a stationary cam plate 538 mounted on the central column 100.

The retarded speed of the machine as the heads pass over the gathering area and the short span of time allotted for the cut-off operation, (namely, during the rotation of the mold carriage through approximately 7½° with the particular construction illustrated,) make desirable the addition of means whereby the speed of the knife swing may be accelerated beyond the practical limit obtainable by the throw of a fixed cam. To accomplish this, a cam arm 540 (Figs. 44, 45) is mounted on a rock shaft 541 for swinging movement to and from the dotted line position 540ᵃ in which its cam surface or outer edge is in alignment with the inner face 542 of the extended portion of the cam path 537. The shaft 541 is journaled in the cam plate 538 and carries a crank arm 542 connected to a hydraulic piston motor 543 by a link 544. A cam plate 545 provides a cam surface for guiding the roll 536 outwardly if the cam arm 540 fails to function and so forms a positive means to insure the cutting stroke of the knife.

As the dip head approaches the position at which the cut-off or knife stroke takes place, the cam roll 536 enters the gradual incline as shown in dotted lines in Fig. 44. The shear blade is thereby caused to swing slowly inward until the roll 536 is brought alongside the arm 540, at which time the motor 543 is operated, causing the arm 540 to swing outwardly, thus rapidly accelerating the swing of the knife and completing the cut-off stroke. The motor 543 then returns the arm 540 to its original position in readiness for the cut-off roll on the following head. The mechanism controlling the operation of the motor 543 is described hereinafter.

The mechanism for lifting and lowering the knife 522 includes the bell crank 528 (Figs. 43, 44) as heretofore described. Pivotally connected to the upper end of the bell crank is a rod 547 extending inwardly alongside the frame 534 and having a swivel connection 548 with the outer end of an arm 549. The arm 549 is pivoted at its inner end to a projecting bearing 550 carried by the frame 534 of the preceding head. Coil springs 551 carried by the rod 547 on either side of the swivel 548 form a yielding connection between the arm 549 and said rod, and thereby provide a safety means whereby the knife is yieldingly supported.

A cam roll 552 mounted on the arm 549 near the outer end thereof, follows a cam path 553 formed on the cam plate 538. The said path 553 holds the knife in its upper position and ready to be swung under the mold. Following the swing of the knife, the cam roll 552 enters a widened section 553ᵃ of the path 553. Thereafter the knife is permitted to drop away from the mold under the control of an air operated motor comprising a cylinder 555, a piston and a rod 556. An arm 557 formed as an extension on the bell crank 528, is pivotally connected to the piston rod by a link 558.

Air under pressure is admitted to the cylinder 555 by a valve 560 (Figs. 64 and 70) and pipe 560ᵇ, thereby causing the knife to be held in its upward position during and after the entry of the cam roll 552 into widened portion 553ᵃ of the cam path. At a predetermined point governed by a series of cams hereinafter described, which cams are individual to the dip heads and located on top of the machine, the air is released from the cylinder 555, allowing the knife to drop by its own weight. The air is supplied to the valve 560 through a pipe 561 connecting with the high pressure chamber 562 of the distributing head 123.

Mechanism for controlling the operation of the hydraulic cut-off cylinder 543 (Fig. 44) is shown in Figs. 50, 50A, 50B and 59 and comprises a valve 565 bolted to the plate 175 at one side of the dip mechanism frame 174. A valve stem 566 extends through and projects beyond both ends of the valve and is provided at its outer end with a roller 567 adapted to be engaged by a cam 568 (Fig. 50A) carried by one of the dip slide rails 302. The inner end of the valve stem is provided with a notch 569 for engagement with a latch for holding the valve in readiness for the cut-off stroke.

The latch mechanism comprises a pair of shafts 570 and 571 supported in a bracket 572 bolted to the cam plate 175. Meshing bevel gears 573 connect the shafts for rotation together. The shaft 570 extends into the central column 100 and carries a rock arm 574 (Figs. 50, 50B) in the path of a lug 575 on the dip rod 171. A latch arm 576 secured to the outer end of the shaft 571 is positioned to engage the notch 569 in the valve stem 566. A coil spring 577 provides tension for holding the latch arm 576 in contact with the valve stem.

The operation of the valve 565 and the latch mechanism may be described as follows: When a dip head moves upward after a dipping operation, the rod 171 moves downward. This causes the lug 575 (Fig. 50B) to rock the arm 574 downward, thereby rotating the shafts 570, 571 and disengaging the latch 576 from the valve stem 566. The valve spring 578 (Fig. 59) now moves the valve stem to the right. This opens a pressure line from the pump 122 (which also serves the blank cracking mechanism) through a pipe 565ᵃ, the valve 565 and the pipe 543ᵇ, extending from the valve to the motor 543. The motor, therefore, operates as heretofore described, through the cam arm 540 to impart a cutting stroke to the knife 522. The reverse movement of the knife is effected by means of the stationary cam 537.

When the next succeeding dip head is lowered, the rod 171 is lifted (see Fig. 29) and the arm 574 (Fig. 50B) is thereby released, permitting the coil spring 577 to pull the latch arm 576 downward into contact with the valve stem 566. While the dip head is in its lowered position, a cam 568 (Fig. 50A) engages a roller 567 on the valve stem and moves the latter inwardly so that the latch arm 576 snaps into the notch 569. This movement of the valve stem cuts off the pressure supply through the pipe 543ᵇ and opens communication through a pipe 543ᵃ to the inner end of the motor 543 so that the latter is reversed and withdraws the cam arm 540.

*Blank crack mechanism (hydraulic)*

In the operation of machines of the general type herein shown, it is desirable, for the purpose of slightly chilling the newly formed parison, to open the blank mold a short distance and hold it so during a predetermined time interval before the mold is opened wide for transferring the blank therefrom. Mechanism for "cracking," that is, imparting an initial opening movement to the blank molds, hereinafter referred to as the blank crack mechanism, is shown in Figs. 50 to 55 inclusive. This mechanism includes a cam plate or slide 580 (Figs. 51, 52) mounted beneath the cam plate 175 for sliding movement radially of the machine. This cam slide 580 is supported and guided by means of slide bars 581 thereon, running in grooves 582 in the cam plate 175. The slide 580 is formed with a cam path 583 which registers at times with, and may be considered as a part of, the cam path 346 which, as hereinbefore described, controls the opening and closing movements of the blank molds. The ends of the cam path 583 are flared at 584 as shown in broken lines (Fig. 50) as a measure of safety. This provides an unobstructed path for the cam roll 345 in the event the slide 580 fails to perform its normal reciprocating movements.

The cam slide 580 is actuated by a hydraulic piston motor 593 which includes a reciprocating piston 594. The piston is operatively connected to the cam slide through mechanism including a link 591 connecting the piston rod with a rock arm 590 on a rock shaft 588 journaled in a bracket 589 bolted on the underside of the cam plate 538. Rock arms 586 on the rock shaft extend downward through openings in the cam plate 175 and are connected through links 585 to the cam slide 580.

The operation of the motor piston 594 is controlled by a valve 595 (Figs. 53, 55, 57, 58 and 59). The valve comprises a casing 596 and a valve plunger 597 mounted to reciprocate therein. A cushioning plunger 605 is also mounted to reciprocate within the valve casing.

As shown in Fig. 59, the casing is provided with a pressure port 598 opening into a pressure pipe 599 in communication with the blank crack pump 122. The pipe 599 is also connected through an extension 600 to the inner end of the motor cylinder 593 so that constant pressure is maintained on the piston, tending to hold the slide in its outward position as shown in Fig. 52. A pipe 601 connects a port 602 in the valve casing with the outer end of the piston motor 593. An exhaust port 603 communicates through a pipe 604 with the supply tank 128.

With the valve plungers in the positions shown in Figs. 58 and 59, the pressure port 598 is closed and the outer end of the motor cylinder is connected to the exhaust by way of the pipe 601 and the port 602, the latter being in communication with the port 603 through a passageway extending through the cushioning valve chamber. The cushioning plunger 605 is formed with a reduced portion 609 and sets of shallow, tapered, V-shaped grooves 610 extending outwardly beyond the ends of said reduced portion. These grooves are of such length that with the cushioning plunger in the Fig. 58 position, they provide communication through slots 611 with the valve chamber. There is thus provided a restricted passageway between the port 602 and the exhaust port 603.

When the valve piston is moved to the right by means presently to be described, the exhaust port 603 is cut off and a pressure line established through the valve to the motor 593. This line is through the pipe 599 and pressure port 598, the latter being in communication, by way of the cushioning plunger chamber and grooves 610, with the port 602 so that fluid under pressure is supplied through the pipe 601 to the outer end piston motor 593. The motor piston is therefore moved inward, thereby moving the cam plate 580 radially inward.

The cushioning plunger 605 is operatively connected to the cam slide 580 by means of a bar 606 connected to said plunger and having a lug 607 projecting through a slot 608 in the cam plate 175 into a notch formed in the slide 580.

When the valve plunger 597 has been moved to the right (Figs. 58 and 59) and the motor piston 594 operates as just described to move the cam slide inwardly, the cushioning plunger is moved to the left. During the final movement of the cam slide and the cushioning plunger, the grooves 610 gradually restrict the flow of fluid, thereby cushioning said movement. The cushioning plunger serves as a means to cushion the cam slide 580 at each end of its stroke and also the parts moved by the cam. The grooves 610 also permit a slight leakage or seepage of the pressure fluid while the valve mechanism is at rest and thereby lessen or obviate the danger of a back pressure being created within the valve casing, which might have a tendency to cause the slide 580 to creep. For this purpose one of the grooves 610 of each set is preferably slightly longer than the rest.

The mechanism for shifting the valve plunger 597 includes adjustable cams 639 (Figs. 53, 56) individual to the blank molds. Operating connections between the valve and cam include a lever 612 (Figs. 55, 58) fulcrumed in a bracket 613 on the valve casing 596. Motion is transmitted to the lever 612 through a rod 614 and bevel gears 615. A crank shaft 616, secured by brackets 617 to the cam plate 538, has an operating connection at its inner end with said gears and at its outer end carries a cam roll 618 in the path of the adjustable cams 639, there being one such cam carried by each head frame.

Each cam 639 comprises an arcuate slide member grooved to receive a tongue 640 formed on a frame 641 bolted to the head slide rails 302. The cam 639 is provided with gear teeth 642 meshing with a gear pinion 643 mounted on a stub shaft 644 journaled in the frame 641. The shaft 644 also carries a worm gear 645 which meshes with a worm 646, to which is secured a hand wheel 647 for manually adjusting the slidable cam 639.

As the mold carriage rotates, the cams 639 operate in succession through the mechanism just described to move the valve plunger 597 inwardly, or to the right, (Fig. 58), thereby causing the motor 593 to move the slide valve 580 inward and partially open or "crack" the blank mold.

The valve plunger 597 and the slide 580 are reset in readiness to repeat the operation by mechanism including a plunger 650 (Figs. 53 and 54). This plunger is mounted in and projects outwardly beyond the circular frame 175. A bell crank 651 is mounted in position to be actuated by the plunger 650 when the latter is moved inwardly. This movement of the plunger is caused by a cam 652 (Fig. 54) attached to a slide rail 302 of the head preceding the one carrying the mold on which the blank crack mechanism is operating. A rod 653 connects the bell crank 651 with an arm on the rock shaft 654 (Fig. 57) to which is attached one of the bevel gears 615. The cam 652 operates through the connections just described to reset the valve 597.

It will be noted that the adjustable cams 639 being individual to the mold units, provide for adjusting the time at which each corresponding blank mold is cracked. This individual control is important in a machine of the character herein disclosed which is capable of producing a bottle or other article of different size and weight on each head. Provision for such individual adjustment aids in producing a uniformly fine grade of ware under varying conditions of operation.

Upper spider

Referring to Figs. 60 to 69 inclusive, the upper rotating table or spider 487 provides a support for the valves controlling the various operations of the machine. The valves are arranged in groups individual to the mold carrying heads, each group adjacent the corresponding head and comprising (see Fig. 60) a plunger and vacuum control valve unit 454 (shown in detail in Figs. 71, 72, 72A), the knife drop valve 560 (Fig. 70), the blank straightening valve 681 identical in construction with the knife drop valve, and blowing air valve 707 which, as hereinafter described, controls the air supply for blowing the parison.

A plurality of series of individually adjustable cams control the operations of the valves. These include a group of knife drop cams 660 and a group of plunger and vacuum cams 661, both said groups being supported in an arc-shaped frame 662 suspended from arms 663 radiating from a flanged collar 664 mounted on the center post 262. The frame 662 as shown is curved to an arc concentric with the axis of the machine and extends approximately 130°. The frame is formed in two sections secured together by top and bottom plates 662ª and 662ᵇ (Fig. 65) bolted thereto. Channels 666 formed by the joining of the frame sections provide space in which the cam operating gears are located.

The knife drop cams 660 disposed on the inner section of the frame, are arcuately shaped bars provided with longitudinal ribs 667 adapted to slide in grooves 668 formed in part by retaining strips 669 bolted to the frame 662. The cam members 660 are arranged one above the other in vertical alignment and the corresponding valves 560 are likewise at different elevations to align with the cams, being supported at the several elevations on standards 670.

The cam members 660 are individually adjustable lengthwise by mechanism including a series of spur gears 671 (Fig. 67) mounted within the channel 666 and engaging rack teeth 672 on the cam members. The gears 671 are keyed to shafts 673 which extend vertically through the frame and into a gear casing 674 (Figs. 60, 65, 66). Each shaft 673 is provided with a worm gear 675 which is engaged by a worm 676 mounted on a horizontally disposed shaft 677. The shafts 677 (see Fig. 60) extend outwardly of the casing and are connected through rods 678 to hand wheels 679 mounted on the blowing cam support which will be described later. The cam members 660 are simple lift cams controlling only the opening and closing of the knife drop valves 560. A stationary cam 680 (Fig. 64) mounted at the bottom of the frame 662, operates the blank straightening valves 681 which are of identical construction with the knife drop valves 560 (Fig. 70).

The blank straightening mechanism comprises a nozzle 681ª (Fig. 29) secured to the lower end of the hinge pin 314 arranged to direct a flow of air under relatively low pressure toward the parison suspended from the neck mold after the blank mold opens. This causes a localized surface chilling of the parison on the side facing the center of the machine, thereby contracting the glass and counteracting the tendency of the soft parison to swing outwardly due to the centrifugal force created by the rotation of the machine.

Air is conducted from the valves 681 to the nozzles 681ª through air lines, each including a passage 681ᵇ (Fig. 29) in the hinge pin 314. A chamber 723 (Figs. 61, 64) in the distributor head 123 supplies air under low pressure to the valves 681 through pipes 724.

The series of cams 661 are mounted in the outer section of the frame 662 and are formed similarly to the previously described cams 660. As heretofore stated, these cams 661 serve to control the operation of the plunger and vacuum control valves. As brought out in the preceding description of the plunger and vacuum valve unit 454 (Figs. 71, 72 and 72A), the first lift 682 (Fig. 60) of the stationary cam 661 serves to open the valve 458 (Fig. 71) and cause the plunger to be lowered before the mold carrying head reaches the dipping position. The second lift 683 serves to open the vacuum valve 457, at which time the latch 482 drops into position to hold the valve open. A raised portion 684 (Figs. 60, 69) formed on the adjustable cam section 661 lifts the latch 482 and releases the valve at a predetermined time. Each of the cam members 661 is provided with gear teeth 685 (Fig. 67) meshing with gears 686 keyed to shafts 687 projecting vertically into a gear casing 688 (Figs. 65, 66). Worm gears 689 on the shafts 687, are engaged by worms 690 mounted on horizontal shafts 691 connected through rods 692 to hand wheels 693.

The blowing air valves 707 which control the supply of air to the parison molds, are actuated by puff cams 695 (Figs. 60, 64) and blowing air cams 696, there being a puff cam and a blowing air cam for each said mold. These cams are supported in a stationary frame 697 comprising a series of rings 698 spaced apart by blocks 699 (Figs. 27 and 60) through which is passed a bolt 700 for securing the rings together. The said frame 697 is bolted to the arms 663 and remains stationary throughout the movement of the machine. The frame 697 is supported on a bearing 701 composed of an enclosed channel provided with a plurality of steel bearing balls 702 mounted on the rotating table 487. The cams 695 and 696 in the form of blocks are held in place by bolts 703 bearing against annular shoulders 704 formed on the rings 698. Each puff cam 695 is formed with a pointed lift 705 (Fig. 60) in order that the corresponding blowing valve 707 when actuated thereby, will be held open for a brief interval, only sufficient to allow a momentary puff of air to enter the parison.

Each of the valves 707 (Figs. 60, 73 and 74) which control the supply of air under pressure to the parison molds, comprises a casing in which is mounted a valve plunger 708. A coil spring 709 carried by the plunger, normally holds the valve in closed position. Air is supplied to the valve through a pipe 710 connected to the chamber 562 (Fig. 61) in the distributing head 123. A pipe 711 (Fig. 74) communicates directly with the mold carrying head 305.

The valve plunger 708 is actuated by the puff cam 695 operating through means including a slide block 712 mounted in the valve casing. A cam roll 713 is mounted in a link 714 pivoted within the block 712 in such a manner that it is substantially free to move in the direction of machine travel. The link 714 is held in alignment with the block 712 by means of a coil spring 717 on a rod 715 pivotally connected to the link and projecting through an opening 716 in the slide block. The spring 717 is held under compression by lock nuts 718. The rod and coil spring extend through a slot 719 in the casing wall, the slot being elongated to allow for the reciprocation of the slide block.

The purpose of the swinging link 714 is to permit a quick closing of the valve. During the operation of the machine, there are intervals during which the valves travel at a reduced speed and there is a possibility of the travel of the blowing valve being slowed down while it passes one of the puff cams 695. By referring to Fig. 74, it will be seen that as the cam roll 713 rides up the cam lobe 695, the valve is opened, and as the roll passes the peak of the cam, the valve is snapped shut by the spring 709, the link being cammed upward about its pivot, thereby allowing the valve to close immediately without prolonging the puffing interval.

The valve casing is provided with an exhaust port 720 (Fig. 74) which is open to the atmosphere when the valve is in closed position. A latch 721 mounted on top of the valve casing and actuated by a coil spring 722, is adapted to hold the valve in open position after the plunger has been forced inwardly by one of the cams 696. The point 705 on the cam 695 opens the valve only a sufficient distance to permit a puff of air to escape, the movement not being such as to allow the engagement of the latch 721. The latch 721 eliminates the necessity of a continuous cam for controlling the final blowing operation. The latch 721 is released by means of a cam 722ª, which is provided with a raised portion for engaging the projecting end of the latch member.

*Cooling wind passages*

Figure 1:
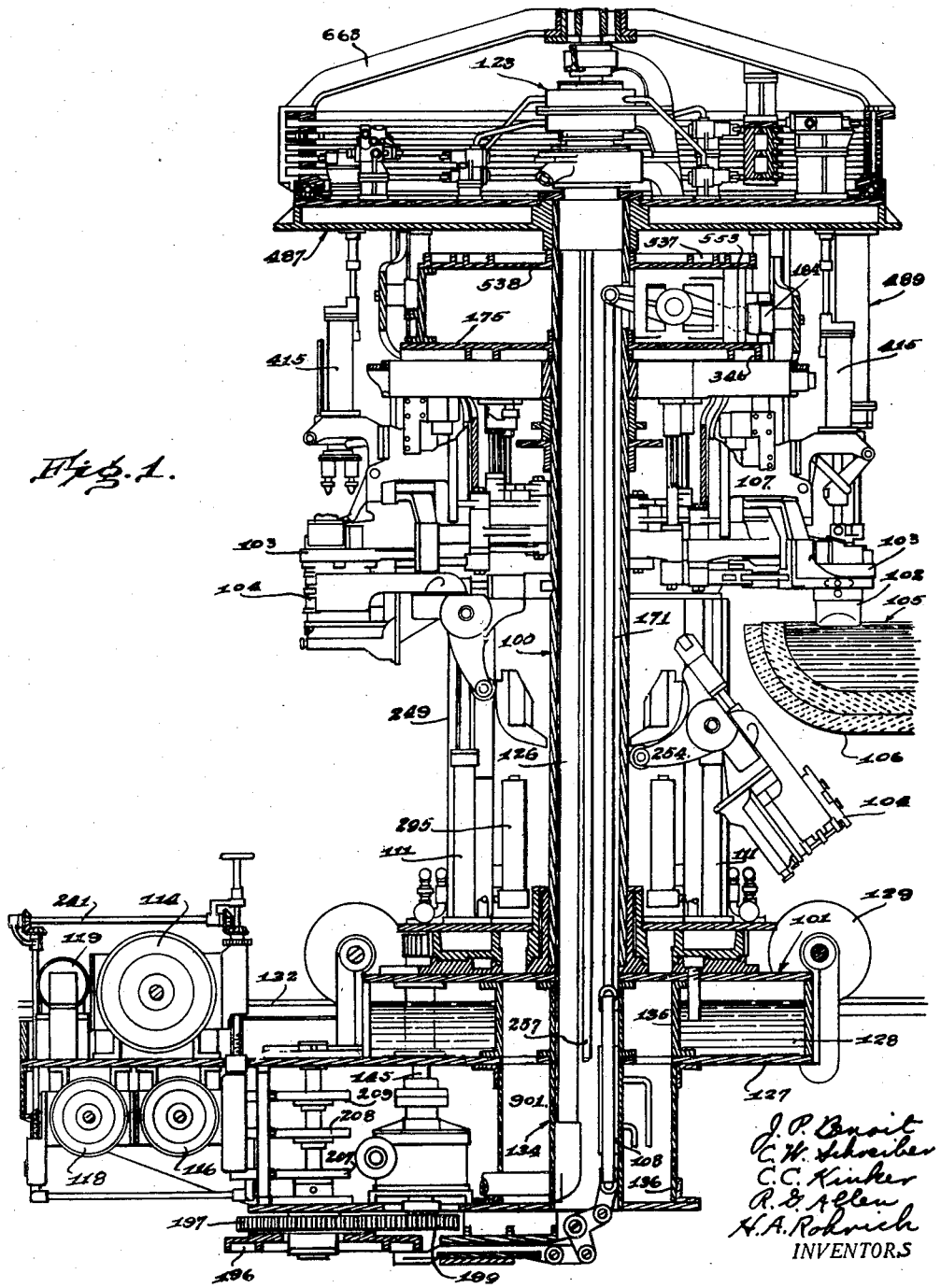
Fig. 1 is a part sectional elevation view of a machine constructed in accordance with our invention.

Air for cooling the various parts of the machine enters the base (Fig. 2) from any suitable source through a conduit 900 built into the machine support which carries the rails 132. The conduit is arranged to align with an opening in the base of the machine when it is in operating position at the forebay 106. A chamber 901 (Figs. 1, 2 and 3) communicates with the hollow finishing mold guide frame 249 (Figs. 6 and 17) from which cooling air is conducted to the mold carriers, the dip heads and for cooling the cut-off knives. The carrier guide frame 249 is formed to provide vertical passageways 902 (Figs. 6 and 18) provided with ports 902ª to allow the air to enter the carrier frames 248 and circulate through the finishing mold arms 104ª (Figs. 18 and 14) and also through the blank mold cooling nozzles, one of which is shown in Fig. 14 at 903.

The brackets 303 (Fig. 14) are provided with passages 904 which lead to the dip head cooling mechanism (Fig. 28) and the knife cooling mechanism shown in Figs. 66A and 66B. The dip head cooling mechanism comprises a pipe 905 connected to the passageway 904. On said pipe 905 is mounted a vertically adjustable sleeve 906. This sleeve is closed at its lower end and is provided with ports 907 which are adapted to be closed by a sleeve 908, mounted on a horizontal pipe 909 which is connected to and moves up and down with the dip head 305. When the head is lowered to dip the mold into the glass, the air is automatically shut off at the ports 907 to prevent chilling the glass in the gathering area. Slots 910 in the pipe 909 direct air against the plungers when the latter are in the raised position.

Referring to Figs. 66A and 66B, the mechanism for cooling the cut-off knife includes a pipe 915 connected to the passageway 904 and to valve mechanism 916. A pipe 917 projects downwardly from the valve 916 into a nozzle 918 supported by means of an arm 919ª, journaled on the rock shaft 521 and movable up and down therewith. A guide rod 919 extends downward from the upper spider 487 and is attached at its lower end to the knife bracket 521ª mounted on the head 305 (see Fig. 27). The guide rod extends through an opening in the arm 919ª and prevents horizontal movement of the nozzle 918, and further provides support for the valve 916. The valve comprises a housing 920 enclosing a sliding valve plate 921 journaled on the guide rod 819. An upwardly extending arm on the bearing of the plate 921 is adapted to be engaged by a finger 922 secured to the rock shaft 521 by a set screw for actuating the valve against the pressure of a spring 923.

It will be noted that as the knife starts its swing preceding the cut-off, the valve will close, shutting off the air from the nozzle 918 while the head is moving over the forebay.

*Knock-out mechanism*

Referring to Figs. 6, 14, 17 and 23, the means shown for directing and controlling the discharge of bottles from the molds, comprises mechanism which is in many respects similar in construction and operation to that disclosed in the patent to La France, No. 1,319,098. Our invention, however, embodies features of novelty particularly adapting such mechanism to the present machine.

The mechanism includes generally a supporting frame 925 mounted on the finishing mold carrier. A sleeve 926 slidably mounted within the frame carries a roll 927 at the lower end thereof for engagement with the operating mechanism to be described later. A rock shaft or rod 928 mounted within the sleeve 926 is provided at its upper end with a knock-out head 929 carrying disks 929ª to engage the bottles or molded articles and hold them during the opening of the mold. The rod is operable within the sleeve by means of a cam roll 930 engaging slots in the sleeve and frame.

The operating mechanism includes a slide supporting frame 931 bolted to the plate 252 and adapted to receive a slide 932 provided at its outer end with a cam roll 933 for engagement with a cam 934 (Fig. 6) supported on brackets bolted to the base of the machine, the cam being adjustable in the direction of its length. The slide 932 is provided with a slot 935 extending lengthwise thereof and having a roller 936 mounted therein for operatively engaging a lever arm 937 pivoted to the frame 931 and extending upwardly through the slot 935. A coil spring 938 is supported on a rod 939 pivoted at one end to the frame 931 and having the other end projecting through the arm 937. The spring normally holds the arm in the forward or dotted line position shown in Fig. 17 so that when the mold carrier unit descends to the Fig. 17 position, the cam roll 927 engages behind said arm, preparatory to the operation of the knock-out mechanism.

While the parts are in such relative position, the cam 934 contacts with the roll 933 and forces the arm 937 rearwardly, said arm serving as a motion transmitting device so that the cam operates through said arm and through the roll 927 to pull the rod 928 downward and swing the knock-out head over the mold. As the roll 933 runs off the cam 934, the arm 937 is released, permitting the knock-out head to be lifted and release the bottles from the open finishing mold at the delivery point.

*Hydraulic mechanism for operating blank and neck molds*

Figs. 80 to 84 illustrate a modified form of mechanism for operating the parison mold units by means of oil under pressure. In this form the mechanism comprises dip heads similar in construction to the heads 107 shown in the form of the invention heretofore described. Each blank mold 102 comprises a pair of mold halves, supported on arms 313 journaled on a hinge pin 314 carried by the mold supporting head 305. The opening and closing movements of the blank mold are effected by hydraulic piston motors 800 individual to the mold units. Independently operable mechanisms for operating the neck molds are controlled by hydraulic piston motors 801. Associated with each blank mold is a pair of links 802 pivoted to the head 305 and pivotally connected to the arms 313 by links 803. Links 804 connected by pivots 805 to the arms 802, are connected to a draw-bar 806 for swinging the arms 313 about the hinge pin 314. The draw-bar 806 is actuated by the piston motor 800 which comprises a piston 808 and piston rod 807 connected to the draw-bar.

The neck mold 103 comprises a pair of mold halves supported in a pair of arms 371 pivoted on the hinge pin 314. The arms 371 are provided rearwardly of said pin with lugs 372 to which are pivoted links 373. The links 373 are connected to the piston rod 809 and piston 810 of the motor 801.

Oil under pressure from the pump 122 which operates the blank crack motors, or from some other pump, supplies pressure through pipes 812 (Fig. 59A) and double valves 811 for operating the piston motors 800 and 801. Each blank mold unit is provided with corresponding valve mechanism mounted on a flange or ring 813 surrounding the central column 100 of the machine and connected to the brackets 303 for rotation with the mold carriage.

Each valve 811 is suspended beneath the flange 813 and comprises a housing 814 formed with lower and upper valve chambers arranged respectively to receive a valve piston 815 which controls the blank mold and a piston 816 controlling the neck mold. Pressure from the pipe 812 enters the lower and upper valve chambers through ports 817 and 818 respectively. A port 819 in the lower valve chamber and shown in communication with the port 817 (Figs. 59 and 83), has a pipe connection to the outer end of the blank mold piston motor 800. Thus, with the valve 815 in the position shown (Fig. 59A), pressure is admitted to the outer or right-hand end of the motor 800 so that the blank mold is opened. A port 820, also in the lower valve chamber, communicates with the inner end of the motor 800 and admits pressure for closing the mold when the valve 815 is shifted to the left. This movement of the valve which places ports 817 and 820 in communication, also opens the port 819 to a drain passage 821 for relieving the pressure on the outer end of the motor 800. A coil spring 822 surrounding the stem of the valve 815 tends to normally hold the valve in the position shown. The valve is shifted against the tension of the spring and held in the shifted position for holding the molds closed by mechanism to be described later.

The neck mold valve 816 is shown in Figs. 59A, 83 moved to the right against the pressure of a coil spring 823, being moved to such position by a stationary cam 824 which engages it as the mold carriage rotates. With the valve in this position, pressure is supplied through a pipe 823a to the motor 801 for opening the neck mold and holding it in open position. The cam 824 is bolted to a collar 825 surrounding the central column 100.

The mechanism for holding the valve 815 to the left against the tension of the spring 822, with the blank mold closed, comprises a latch device which is structurally substantially like that above described and illustrated in Figs. 20 to 23. This latch device includes the vertical slide 286 carrying a latch to engage a notch in the valve 815 when the latter is moved to the left by means of a cam 864, as more fully set forth hereinafter. The adjusting screw 292 of Fig. 20 is provided in the Fig. 83 construction with a vertical rod 826 which is journaled in a bearing bracket 827 mounted on the flange 813. Intermeshing bevel gears 828, one of which is slidably keyed to the rod 826, are mounted on the bearing bracket 827 and are operatively connected by a rod 830 to a hand crank 830a. An indicator 829 is also provided. The rod 826 is lifted by means of a stationary cam 831 for releasing the latch and allowing the valve 815 to be moved to the right and effect the opening of the molds in the manner above described. Vertical adjustment of the rod 826 by rotation of the hand crank 830a, serves to adjustably vary the time at which the inclined cam 831 (Figs. 83, 84) operates to release the valve and effect the opening of the molds.

*Mechanism for selectively preventing operation of the dip heads*

It is sometimes found desirable during the operation of the machine, to prevent one or more of the dip heads from going through the usual dipping movements while traversing the dipping and gathering zone. For this purpose, we have provided manually controlled mechanisms individual to the dip heads by which said heads may be selectively controlled and prevented from going into dip and the parison mold or molds thereon maintained in open position.

Each such mechanism includes a cam 832 (Figs. 80, 82, 83) pivotally mounted on a bracket 833 and adapted to be swung downward from an inoperative to an operative position, said positions being shown in Fig. 80 in full lines and dotted lines, respectively. The mechanism for swinging the cam 832 comprises bevel gears 834 and a hand wheel 835, the latter supported in a bracket bolted to one of the side rails 302. The cam 832 swings through an arc of substantially 90° determined by a pin 836 engaging a notch 837 in the bracket which supports the hand wheel. When a cam 832 is swing down to its operative position, it serves to prevent operation of the corresponding dip head, as will presently appear.

A stationary valve 838 mounted on the column 100 comprises a valve piston or plunger 839 (see Fig. 59) carrying a cam roll 840 which engages the cam 832 as the corresponding dip head approaches the dipping and gathering zone. The valve piston 839 is thereby moved to the left from the Fig. 59 position, against the pressure of a coil spring 841. The valve is provided with an intake port 842 communicating through a pipe 842ª with the pressure line of the blank crack pump 122. A valve 843 is provided in the pressure line 167 which supplies pressure for actuating the dip head motor 108, said valve being provided with a piston 844 normally held in its up position by a spring 845 to permit an unrestricted flow of oil through the pipe 167 for operating and controlling the dip head motor. A port 846 at one end of the valve 843 communicates through a pipe 848 with a port 847 in the valve 838, the port 847 being normally open to the drain line 849.

When a dip head approaches the gathering area and the cam 832 operates the valve piston 839, as above described, communication is established between the ports 842 and 847 so that pressure is transmitted through the line 842ª, 848 to the valve 843 and shifts the piston 844 downward to close the line 167. It will be understood that at this time the piston 168 of the dip motor is in its lowered position and the head out of dip. When the line 167 is closed by the valve piston 844, the fluid above the piston 168 in the motor 108 is locked and operates positively to hold the head out of dip. Pressure built up in the lines 166 and 167 while the latter is closed by the valve 844, is released through the relief valves 850 into the supply tank. Each dip head remains out of dip so long as the corresponding cam 832 remains in operative position. Each cam 832 may be moved into or out of operative position as desired at any time without interrupting the normal operation of the machine.

When a cam 832 is swung downward to operative position for preventing the operation of a dip head, the blank and neck molds on said head are automatically maintained in their open position by means of a valve 851 (Figs. 59A, 83) mounted vertically on the flange 813 directly beneath the cam 832. The valve comprises a plunger 852 which is lowered against the tension of a spring 853 when the cam 832 is swung down to operative position. With the valve plunger thus lowered, an intake port 854 in the valve is opened to the pressure line 812 so that pressure is transmitted through ports 854, 855 and a pipe 856 to a port 857 in the valve 811. The port 857 is in communication with the valve chambers 858 and 859 so that the valve pistons 815 and 816 are moved to the position shown in Figs. 59A and 83, and are so held by the fluid pressure, thereby holding the molds open, as long as the cam 832 is in operative position for holding the dip head out of service.

In order to prevent operation of the valve plunger 815 by its cam 864 while under the control of the valve 851, a yielding connection is provided between the cam roll 860 and the valve plunger 815. This comprises a coil spring 862 (Fig. 83) within a sleeve 861 which has a telescoping connection with the plunger 815. A bolt 863 extends through the sleeve and is anchored in the valve plunger. The cam roll 860 is carried by said sleeve and normally operates through the spring for shifting the valve plunger to the left against the tension of the spring 822 so that the cam 864 is normally operative to shift the valve plunger to effect a closing movement of the mold. While the valve plunger 852 is in position to admit fluid pressure to the valve chambers 858, 859, as above pointed out, the cam 864 operates the sleeve 861 idly, compressing the spring 862 which is of insufficient strength to overcome said fluid pressure. As a result, the molds remain open. When there is no such fluid pressure to overcome, and the cam 864 operates the sleeve 861, the movement is transmitted through the spring and operates the valve, because the valve does not offer sufficient resistance to cause a compression of the spring.

Modifications may be resorted to within the spirit and scope of our invention as defined in the appended claims.

We claim:

1. A machine for forming glass articles comprising a mold carriage rotatable about a vertical axis, dip heads on the mold carriage, molds carried by said dip heads, means for driving the mold carriage, and hydraulic mechanism for lifting and lowering the dip heads periodically and in succession, said mechanism comprising a hydraulic motor and means for effecting an operating connection between the motor and each of the dip heads singly and in succession.

2. A machine for forming hollow glass articles comprising a hollow vertical center column, a mold carriage mounted to rotate about the axis of said column, dip heads movable up and down on the carriage, suction gathering molds on said dip heads, a piston motor mounted within said column, automatic means for operatively connecting the dip heads in succession with the motor, and means for operating said motor and thereby lowering and lifting each dip head during its said connection therewith.

3. A machine for forming glass articles, comprising a mold carriage, a mold thereon, means for rotating the carriage, a hydraulic motor, a cam, mechanism including a movable element of the hydraulic motor for operatively connecting the cam to the mold and actuated by the cam for effecting movements of the mold at intervals during said rotation of the carriage, and means for operating the hydraulic motor to effect like movements of the mold, the operating connections being maintained between the mold and the cam and also between the mold and the hydraulic motor during the said movements of the mold.

4. A machine for molding glass articles, comprising a rotating mold carriage, a blank mold thereon, a hydraulic motor having operating connections with the blank mold for opening and closing the latter, a plunger valve controlling the supply of fluid pressure to said motor, a spring for moving the valve plunger in one direction, a cam operable to move the plunger in the opposite direction, a latch for automatically engaging and holding the plunger, a cam operable at a predetermined point during the rotation of the carriage to operate the latch and release said plunger, and manually operable adjusting means for adjusting the cam and thereby adjustably varying the point at which said latch releases the plunger during the rotation of the mold carriage.

5. A machine for molding glass articles, comprising a rotating mold carriage, a parison mold thereon including a body blank mold and a neck mold, hydraulic motors mounted on the mold carriage, said motors being individual to said molds and operatively connected thereto, valve mechanism mounted to rotate with the mold carriage and including valve plungers individual to said motors and controlling the supply of fluid under pressure to the motors, a spring for moving and holding one of said plungers in position to supply fluid pressure to the blank mold motor for opening the blank mold, a stationary cam operable at a predetermined point in the rotation of the mold carriage to move said plunger against the pressure of the spring into position to effect a closing of the blank mold, a latch to hold the plunger at said mold closing position, a cam operable to actuate the latch and release the plunger and thereby effect an opening of the blank mold, and means for adjusting said last mentioned cam and thereby adjustably varying the point at which, during the rotation of the carriage, the blank mold is opened.

6. A machine for molding glass articles, comprising a mold carriage, means for rotating it, a series of units on the carriage, each comprising a dip head mounted for up and down movement on the carriage, molds carried by said heads, automatic means for lowering and lifting each head at predetermined points during the rotation of the carriage, devices individual to the dip heads and selectively movable each to an operative position in which it prevents the lowering and lifting of the associated dip head without interfering with the rotation of the mold carriage and without interfering with the lifting and lowering of the other dip heads by said automatic means while the selected device is in its said operative position, and hand operated mechanisms individual to said devices and each including means for setting a said device alternatively either in said operative position or an inoperative position and automatically holding the device in each said position until manually released.

7. A machine for molding glass articles, comprising a mold carriage, means for rotating it, a series of units on the carriage, each comprising a head mounted for up and down movement on the carriage, molds carried by said heads, automatic means for lowering and lifting each head at predetermined points during the rotation of the carriage, devices individual to said heads for preventing the lowering and lifting movements of any selected head during the rotation of the carriage, and hand operated mechanisms individual to said devices and each including means for setting a said device alternatively either in said operative position or an inoperative position and automatically holding the device in each said position until manually released.

8. A machine for molding glass articles, comprising a mold carriage, means for rotating it, a series of units on the carriage, each comprising a head mounted for up and down movement on the carriage, molds carried by said heads, automatic means for lowering and lifting each head at predetermined points during the rotation of the carriage, mechanisms individual to said heads for preventing the lowering and lifting movements of any selected head or heads, each said mechanism comprising a cam, means actuated thereby to render said lowering and lifting means inoperative, and manual devices for moving the cams into and out of operative position.

9. A machine for molding glass articles, comprising a mold carriage, means for rotating it, a series of units on the carriage, each comprising a head mounted for up and down movement on the carriage, molds carried by said heads, a hydraulic motor, mechanism actuated thereby for lowering and lifting each of said heads in succession as they traverse a predetermined zone, and means for locking said motor against operation and thereby preventing lowering and lifting of any mold head traversing said zone while the motor is locked.

10. A machine for molding glass articles, comprising a mold carriage, means for rotating it, a series of units on the carriage, each comprising a head mounted for up and down movement on the carriage, molds carried by said heads, a hydraulic motor, mechanism actuated thereby for lowering and lifting each of said heads in succession as they traverse a predetermined zone, and selective means individual to the said heads for locking the motor while a selected head is traversing said zone, and thereby preventing said lowering and lifting movements of the selected head.

11. A machine for forming glass articles comprising a mold carriage rotatable about a vertical axis, dip heads on the mold carriage, molds carried by said dip heads, means for driving the mold carriage, and hydraulic mechanism for lifting and lowering the dip heads periodically and in succession, said hydraulic mechanism including a piston motor, means for effecting an operating connection between the motor and the dip heads in succession, and means for actuating the motor and thereby lowering and lifting each dip head while said operating connection is maintained.

12. A machine for forming glass articles comprising a mold carriage rotatable about a vertical axis, dip heads on the mold carriage, molds carried by said dip heads, means for driving the mold carriage, a piston motor having a stationary mounting, a stationary track, rolls individual to the dip heads and running on said track, said rolls being connected to said heads and supporting them during the major portion of their travel with the carriage, means for effecting a connection between each roll and the piston motor as the corresponding dip head approaches a dipping position, and means for operating the piston motor while said connection is maintained and thereby lowering and lifting the dip head.

13. A machine for molding glass articles, comprising a rotating mold carriage, a series of units thereon, each unit including a dip head and a suction gathering mold on the head, a fluid operated motor, means actuated by said motor for lowering each dip head at a predetermined point during the rotation of the mold carriage for bringing the mold thereon into a charge gathering position and thereafter lifting the dip head, and automatic means for locking said motor and holding it locked while any selected head is traversing the dipping area and then releasing the motor, whereby the selected head is held out of dip without interference with the dip movements of the other heads.

14. A machine for molding glass articles, comprising a rotating mold carriage, a series of units thereon, each unit including a dip head and a suction gathering mold on the head, a fluid operated motor, means actuated by said motor for lowering each dip head at a predetermined point during the rotation of the mold carriage for bringing the mold thereon into a charge gathering position and thereafter lifting the dip head, and automatic means for locking said motor and holding it locked while any selected head is traversing the dipping area and then releasing the motor, whereby the selected head is held out of the dip without interference with the dip movements of the other heads, said means for locking the motor comprising a valve, a fluid pressure line supplying operating fluid to said motor and controlled by said valve, and devices individual to said heads and manually set for actuating said valve.

15. A machine for forming glass articles comprising a mold carriage, molds thereon, means for driving the carriage, mechanism having operating connections with the molds and operating through said connections to normally effect periodic movements of the molds on the carriage when the molds are brought to a predetermined position by their movement with the carriage, and supplemental mechanism operable automatically through said connections to effect said movements when the molds reach said positions in the event said first mentioned mechanism fails to operate, thereby serving as a safety means.

16. A machine for forming hollow glass articles comprising molds, hydraulic mechanism for normally effecting periodic movements of the molds, and automatic mechanical means for effecting said movements in the event of failure of the hydraulic mechanism to operate, said hydraulic mechanism and mechanical means having interconnections by which said mechanical means normally is caused to operate concurrently with the operation of said hydraulic mechanism.

17. The combination of a mold carriage, dip heads thereon, molds carried by the dip heads, means for rotating the carriage, hydraulic mechanism including a hydraulically driven element operated periodically for periodically lowering and lifting the dip heads by hydraulic power, and mechanical means connected to said element and operative automatically through said element to lower and lift the dip heads in the event of failure of the hydraulic power to effect said lifting and lowering of the dip heads.

18. The combination of a mold carriage, dip heads thereon, molds carried by the dip heads, means for rotating the carriage, hydraulic mechanism including a hydraulically driven element operated periodically for periodically lowering and lifting the dip heads by hydraulic power, mechanical means connected to said element and operative automatically through said element to lower and lift the dip heads in the event of failure of the hydraulic power to effect said lifting and lowering of the dip heads, and driving connections between the mold carriage and said mechanical means for driving the latter.

19. The combination of a mold carriage, dip heads thereon, molds carried by the dip heads, means for rotating the carriage, hydraulic mechanism, power transmitting means between the hydraulic mechanism and the dip heads through which power is transmitted from said mechanism for periodically lowering and lifting the dip heads by hydraulic power, a cam driven in synchronism with the movements of the mold carriage, and operating connections between the cam and said power transmitting means normally operated in synchronism with the operations of said hydraulic mechanism, said cam being operable through said connections and power transmitting means to lower and lift the dip heads upon failure of said hydraulic power.

20. The combination of a mold carriage, a dip head thereon, a mold carried by the dip head, means for rotating the mold carriage, a piston motor, operating connections between the motor piston and the dip head for periodically lowering and lifting said head, means for supplying fluid under pressure to said piston motor for operating the latter, and mechanical driving connections between the mold carriage and the motor piston for automatically operating the latter upon failure of the fluid pressure supply.

21. A machine for molding glass articles, comprising a rotating mold carriage, a series of units thereon, each unit including a dip head and a suction gathering mold on the head, a fluid operated motor, means actuated by said motor for lowering each dip head at a predetermined point during the rotation of the mold carriage for bringing the mold thereon into a charge gathering position and thereafter lifting the dip head, means for closing each mold before and opening it after the dipping operation, and means for preventing the closing of a mold on a selected dip head and thereby retaining the mold in open position while traversing the gathering zone.

22. A machine for molding glass articles, comprising a rotating mold carriage, a series of units thereon, each comprising a partible mold, automatic means for closing each said mold at a predetermined point during the rotation of the carriage and opening the mold at a later point during said rotation, and manually operable devices individual to said units for preventing the closing and opening movements of any selected mold without interrupting the normal travel of the mold carriage and the closing and opening movements of the other said molds.

23. A machine for forming glass articles, comprising a rotating mold carriage, a mold thereon, a hydraulic motor operatively connected for opening and closing the mold, a plunger valve controlling the supply of fluid pressure to said motor, a cam, operating connections between the cam and the valve plunger for periodically actuating the latter and thereby supplying fluid pressure to said motor for operating the mold, manually controlled means for preventing the operation of said fluid motor and thereby preventing the closing and opening of the mold, said connections between the valve plunger and the cam comprising a cam roll and a spring interposed between the roll and the valve plunger, permitting the cam roll to be moved idly by the cam while the said motor is held against operation.

24. The combination of a mold carriage, a series of dip heads thereon, molds carried by the dip heads, a rotary drive pump, a hydraulic motor driven thereby and geared to the mold carriage for rotating the latter, a rotary dip pump, a hydraulic piston motor driven by the dip pump and having driving connections with the dip heads for lowering and lifting the latter, a cam shaft, driving connections between the mold carriage and cam shaft by which the latter during each complete rotation of the mold carriage is given a number of rotations corresponding to the number of dip heads on the carriage, a cam on said cam shaft, means actuated by said cam for periodically changing the speed of the drive pump and operable thereby to decelerate and accelerate the speed of the mold carriage, a second cam on said cam shaft, and operating connections between said second cam and the said dip pump for periodically varying the fluid output of the dip pump and thereby effecting periodic operations of said piston motor, whereby the dip heads are periodically lowered and lifted, said movements being synchronized to cause each dip head to be lowered while the mold carriage is being driven at a reduced speed.

25. The combination of a mold carriage, a series of dip heads thereon, molds carried by the dip heads, a rotary drive pump, a hydraulic motor driven thereby and geared to the mold carriage for rotating the latter, a rotary dip pump, a hydraulic piston motor driven by the dip pump and having driving connections with the dip heads for lowering and lifting the latter, a cam shaft, driving connections between the mold carriage and cam shaft by which the latter during each complete rotation of the mold carriage is given a number of rotations corresponding to the number of dip heads on the carriage, a cam on said cam shaft, means actuated by said cam for periodically changing the speed of the drive pump and operable thereby to decelerate and accelerate the speed of the mold carriage, a second cam on said cam shaft, operating connections between said second cam and the said dip pump for periodically varying the fluid output of the dip pump and thereby effecting periodic operations of said piston motor, whereby the dip heads are periodically lowered and lifted, said movements being synchronized to cause each dip head to be lowered while the mold carriage is being driven at a reduced speed, and a manual adjusting device operable to simultaneously adjust the connections between said cams and the said drive pump and dip pump, whereby the speed of the mold carriage is adjustably varied and the operations of the dip heads adjusted to correspond with the speed of the mold carriage.

26. The combination of a mold carriage, a series of dip heads thereon, molds carried by the dip heads, a rotary drive pump, a hydraulic motor driven thereby and geared to the mold carriage for rotating the latter, a rotary dip pump, a hydraulic piston motor driven by the dip pump and having driving connections with the dip heads for lowering and lifting the latter, a cam shaft, driving connections between the mold carriage and cam shaft by which the latter during each complete rotation of the mold carriage is given a number of rotations corresponding to the number of dip heads on the carriage, a cam on said cam shaft, means actuated by said cam for periodically changing the speed of the drive pump and operable thereby to decelerate and accelerate the speed of the mold carriage, a second cam on said cam shaft, operating connections between said second cam and the said dip pump for periodically varying the fluid output of the dip pump and thereby effecting periodic operations of said piston motor, whereby the dip heads are periodically lowered and lifted, said movements being synchronized to cause each dip head to be lowered while the mold carriage is being driven at a reduced speed, finishing mold carriers connected to rotate with the mold carriage, finishing molds on said carriers, a mold carrier pump, hydraulic motors operated by the mold carrier pump, operating connections between the last mentioned motors and the mold carriers, a third cam on said cam shaft, and operating connections between said third cam and the mold carrier pump for periodically varying the fluid output of the latter and thereby causing periodic operations of the mold carriers.

27. A machine for forming hollow glass articles comprising a mold carriage, means for rotating it, finishing mold units connected to rotate with the carriage, each said unit comprising a mold carrier and a finishing mold thereon, and automatic means for periodically lowering each finishing mold by a downward swinging movement of its carrier about a horizontal axis and a downward vertical movement of the carrier and mold bodily.

28. A machine for forming hollow glass articles comprising a mold carriage, means for rotating it, finishing mold units connected to rotate with the carriage, each said unit comprising a mold carrier and a finishing mold thereon, and automatic means for lowering the finishing mold carriers periodically and in succession, said lowering means including mechanism for moving each mold carrier bodily downward a predetermined distance, swinging the carrier and mold downwardly and inwardly toward the axis of the mold carriage, and then moving the carrier and mold bodily downward by a straight line movement.

29. In a machine for forming glass articles, the combination of a mold carriage rotatable about a vertical axis, a series of finishing mold units connected to rotate with the mold carriage, each said unit comprising a mold carrier and a finishing mold thereon, and means for lifting and lowering the mold carriers periodically and in succession, said means including mechanism for bodily moving each carrier vertically a predetermined distance and swinging the carrier about a horizontal axis during an intermediate portion of its vertical movement.

30. A machine for forming hollow glass articles comprising a mold carriage, means for rotating it about a vertical axis, a series of finishing mold units connected to rotate with the carriage, each said unit comprising a horizontally disposed carrier or arm extending radially of the mold carriage and a finishing mold mounted at the outer end thereof, a supporting frame on which said carrier is pivotally mounted adjacent its inner end for up and down swinging movement about a horizontal axis, means for moving said frame bodily up and down, and means for swinging said carrier downward and inward about said horizontal axis during the downward movement of said frame.

31. The combination of a mold carriage rotatable about a vertical axis, a swinging frame extending radially of the mold carriage, a finishing mold carried on said frame adjacent the outer end thereof, a second frame mounted for up and down movement on the mold carriage, said swinging frame being pivotally connected at its inner end to said second frame, means for periodically moving said second frame up and down, a cam on the mold carriage, said swinging frame comprising a depending arm, a cam roll on said arm running on said cam, and means for moving said frames up and down, said cam being positioned and shaped to cause a downward and inward swinging movement of the swinging frame during the downward movement of said second frame.

32. The combination of a mold carriage, means for rotating it about a vertical axis, a hydraulic piston motor rotatable with the mold carriage, said motor comprising a vertical cylinder, a piston and a piston rod extending upwardly therefrom, a swinging frame pivotally connected to the upper end of said rod by a horizontal pivot and extending radially outward therefrom, a mold carried at the outer end of said frame, the frame and mold being movable bodily up and down with the piston, and a cam controlling the swinging movement of said frame and arranged to cause the frame and mold to swing downwardly and inwardly during the downward movement of the piston.

33. A machine for forming glass articles comprising a mold carriage, means for rotating it about a vertical axis, an annular series of finishing mold units connected to rotate with the mold carriage, each said unit comprising a mold carrier bodily movable up and down on the carriage and a finishing mold thereon, each said mold carrier being mounted to swing about a horizontal axis and thereby swing the mold thereon toward and from the vertical axis of the mold carriage during said up and down movement of the mold carrier, fluid motors individual to said carriers and operatively connected thereto for lifting and swinging the carriers, valves individual to said motors and rotating with the mold carriage, and a stationary cam arranged to operate said valves in succession and thereby cause said fluid motors to operate in succession.

34. A machine for forming glass articles comprising a mold carriage, means for driving the carriage, molds on the carriage, piston motors individual to the molds and operatively connected thereto for opening the molds, valves individual to and controlling the operation of said motors, latch devices for holding said valves in a predetermined position, and cam means for operating said latch devices.

35. A machine for forming glass articles comprising a mold carriage, means for rotating it, molds on the carriage, a hydraulic pump, hydraulic motors individual to the molds, operating connections between said motors and the molds through which the motors operate the molds, hydraulic circuits connecting the pump and motors, valves individual to the motors controlling the supply of fluid under pressure from the pump to the motors, and automatic mechanism for actuating the valves periodically and in succession, said valve actuating mechanism including cam means for operating each valve in one direction, latch devices for holding said valves in said operated position, means for releasing the latches, and spring means for returning the valves when released.

36. A machine for forming glass articles comprising a rotating mold carriage, mold carriers connected to rotate with the carriage and movable up and down thereon, molds on said carriers, hydraulic piston motors for lifting the carriers, means for supplying fluid under pressure to said motors, accumulators associated with said piston motors, means for supplying fluid under pressure to the accumulators, and means for transmitting fluid pressure from the accumulators to the piston motors for maintaining the carriers in their lifted position.

37. In a machine for forming glass articles, the combination of a mold carrier mounted for up and down movement, a mold thereon, a vertically disposed hydraulic piston motor operatively connected to the mold carrier for lifting and lowering it, means for supplying fluid under pressure to the motor, an accumulator comprising a piston and cylinder, spring means for moving the accumulator piston in one direction, means for supplying fluid under pressure to the accumulator for moving the piston in opposition to said spring means, a hydraulic piston motor for opening and closing the mold, and means for supplying fluid under pressure from the accumulator to said last mentioned motor for maintaining the mold in closed position.

38. A machine for forming glass articles comprising a mold carrier movable up and down, a mold thereon, a hydraulic piston motor for lifting and lowering the carrier, a hydraulic piston motor for opening and closing the mold, means for supplying fluid under pressure to said motors, valves individual to said motors, automatic means for actuating said valves, and safety mechanism comprising an interlocking valve mechanism operable to control the flow of fluid under pressure to and from said motors.

39. A machine for forming glass articles comprising a mold carrier movable up and down, a mold thereon, a hydraulic piston motor for lifting and lowering the carrier, a hydraulic piston motor for opening and closing the mold, means for supplying fluid under pressure to said motors, valves individual to said motors, automatic means for actuating said valves, safety mechanism comprising an interlocking valve mechanism operable to control the flow of fluid under pressure to and from said motors, and a hand operated valve mechanism controlling the operation of said interlocking valve mechanism.

40. A machine for forming glass articles comprising a rotating mold carriage, molds thereon, a stationary cam, motion-transmitting mechanism actuated by the cam for opening and closing the molds, said mechanism comprising a safety device permitting the mold to remain open when abnormal resistance to the closing of the mold is encountered, and a manually operable device interposed between the mold and said safety device for locking the mold in open position.

41. A machine for forming glass articles comprising a mold, a mold actuating device, mechanism interposed between the mold and said actuating device for transmitting movement from said device to the mold for closing the mold, a manual device for locking the mold in open position, and safety means interposed between said manual device and said actuating device permitting the operation of the latter while the mold is locked in open position.

42. A machine for forming glass articles comprising a mold carriage, molds thereon, means for rotating the carriage, mold closing means automatically operable to effect mold closing movements of the molds in succession during the rotation of the mold carriage, manual devices individual to the molds and selectively operable for locking any selected molds in open position, and safety mechanism interposed between said locking devices and said mold closing means permitting the normal closing of the unlocked molds by said closing means.

43. A machine for forming glass articles comprising a mold carriage, a series of parison molds thereon each including a body blank mold and a neck mold, automatic mechanism for separately opening the body blank mold and neck mold of each said parison mold, locking mechanisms individual to the parison molds and each comprising a locking device for the body blank mold and a locking device for the neck mold, and manually operable devices individual to said locking mechanisms and operable selectively to simultaneously lock the body blank mold and neck mold of any selected parison mold.

44. The combination of a mold carriage, automatic means for rotating the carriage, a parison mold mounted on the carriage and comprising a body blank mold and a neck mold, cam mechanism, motion-transmitting mechanism between the cam mechanism and the molds for periodically opening the said body blank mold and neck mold separately, said motion-transmitting mechanism including safety means permitting the molds molds to remain open when abnormal resistance is offered to their closing movement, locking devices individual to the said body mold and neck mold for locking them in open position, and a manual device for simultaneously operating said locking devices and thereby locking the molds in open position.

45. A machine for forming glass articles comprising a mold carriage, means for rotating the carriage, a dip frame mounted for up and down movement on the carriage, a stationary cam supporting the dip frame during a portion of its travel, a neck mold carried by the dip frame, means for forming a parison and suspending it from the neck mold, a finishing mold carrier beneath the dip frame, a finishing mold on said carrier, means for lifting the carrier and bringing the finishing mold into position to be closed around a suspended parison, means for causing said carrier to lift the dip frame and support it independently of said cam, and means for closing the finishing mold around the parison while the latter is suspended from the neck mold and while the dip frame is supported independently of said cam.

46. The combination of a travelling mold carriage, dip heads connected to travel therewith, parison molds carried by the dip heads and each comprising a neck mold, means cooperating with the neck molds for forming parisons and suspending them from the neck molds, finishing molds, supporting frames carrying the finishing molds and travelling with the mold carriage, said supporting frames being positioned beneath the dip heads, a stationary cam track supporting the dip heads during a portion of their travel, means for lifting the finishing mold carriers and causing them to lift the dip heads and support them independently of the cam track, and means for closing the finishing molds around the suspended parisons while supported independently of the cam track.

47. A machine for forming hollow glass articles of the Owens suction gathering type, comprising a suction gathering mold, a plunger adapted to project into the mold, an air operated piston motor for actuating the plunger, valve mechanism including a valve operable to supply air to said motor and cause it to lift the plunger and a valve controlling the application of suction to the mold, a cam, and a device operated thereby for opening said valves in succession.

48. A machine for forming hollow glass articles of the Owens suction gathering type, comprising a suction gathering mold, a plunger adapted to project into the mold, an air operated piston motor for actuating the plunger, valve mechanism including a valve controlling the supply of air to said motor for lifting the plunger and a valve controlling the application of suction to the mold, a bar mounted for reciprocation, a cam roll carried thereby, a stationary cam arranged to engage said roll and move said bar in one direction, and means carried by said bar to actuate said valves.

49. A machine for forming hollow glass articles of the Owens suction gathering type, comprising a suction gathering mold, a plunger adapted to project into the mold, an air operated piston motor for actuating the plunger, valve mechanism including a valve controlling the supply of air to said motor for lifting the plunger and a valve controlling the application of suction to the mold, a bar mounted for reciprocation, a cam roll carried thereby, a stationary cam arranged to engage said roll and move said bar in one direction, a cross-head carried by said bar, and adjustable stops carried by the cross-head and arranged to engage and open the valves when said bar is moved by the cam.

50. A machine of the Owens suction gathering type, comprising a rotating mold carriage and a series of units thereon each said unit including a suction gathering mold, a piston motor, a plunger connected to the motor and movable thereby into and out of position to project into the mold, valve mechanisms individual to said units, each said valve mechanism comprising a valve controlling the operation of the corresponding piston motor and a valve controlling the application of suction to the corresponding mold, a stationary cam, and valve operating devices individual to said units arranged to be operated by said cam and each operable by a single movement to effect the operation of said valves of the corresponding unit in succession.

51. A machine of the Owens suction gathering type, comprising a rotating mold carriage and a series of units thereon, each said unit including a suction gathering mold, a piston motor, a plunger connected to the motor and movable thereby into and out of position to project into the mold, valve mechanisms individual to said units, each said valve mechanism comprising a valve controlling the operation of the corresponding piston motor and a valve controlling the application of suction to the corresponding mold, a stationary cam, valve operating devices individual to said units arranged to be operated by said cam and operable to open said valves, and latches individual to said valve operating devices for holding the latter independently of the cam and thereby holding the valves in open position.

52. A machine of the suction gathering type for molding hollow glass articles, comprising a mold carriage, a dip head thereon, means for lifting and lowering the dip head, a mold carried by the dip head and movable up and down therewith, a vacuum chamber above the dip head, means providing communicaion between the vacuum chamber and the mold for exhausting the air from the mold, said means comprising a vacuum pipe having telescoping sections directly connected respectively to the vacuum chamber and the dip head, a valve intermediate the vacuum pipe and mold cavity and controlling communication between said pipe and the mold cavity, and an air motor for operating said valve, said motor mounted to move up and down with the dip head and mold.

53. A machine of the suction gathering type for molding hollow glass articles, comprising a mold carriage, a dip head thereon, means for lifting and lowering the dip head, a mold carried by the dip head and movable up and down therewith, a vacuum chamber above the dip head, means providing communication between the vacuum chamber and the mold for exhausting the air from the mold, said means comprising a vacuum pipe having telescoping sections connected respectively to the vacuum chamber and the dip head, a valve controlling communication between said pipe and the mold cavity, an air motor connected to the valve for actuating the latter, a stationary cam, and a valve actuated by the cam for automatically controlling said motor.

54. A machine of the suction gathering type for molding hollow glass articles, comprising a mold carriage, a dip head thereon, means for lifting and lowering the dip head, a mold carried by the dip head and movable up and down therewith, a vacuum chamber above the dip head, means providing communication between the vacuum chamber and the mold for exhausting the air from the mold, said means comprising a vacuum pipe having telescoping sections connected respectively to the vacuum chamber and the dip head, and scouring means comprising an aggregate of small, solid particles interposed between said telescoping sections and operable to scour the inner surface of the outer section.

55. A machine of the suction gathering type for molding hollow glass articles, comprising a mold carriage, a dip head thereon, means for lifting and lowering the dip head, a mold carried by the dip head and movable up and down therewith, a vacuum chamber above the dip head, means providing communication between the vacuum chamber and the mold for exhausting the air from the mold, said means comprising a vacuum pipe having telescoping sections connected respectively to the vacuum chamber and the dip head, the inner telescoping section of said pipe being of substantially smaller diameter than the interior of the outer section, whereby an annular space is provided between the said sections, and scouring means comprising an aggregate of small balls of hard material within said annular space.

56. A machine of the suction gathering type for molding hollow glass articles, comprising a mold carriage, a dip head thereon, means for lifting and lowering the dip head, a mold carried by the dip head and movable up and down therewith, a vacuum chamber above the dip head, means providing communication between the vacuum chamber and the mold for exhausting the air from the mold, said means comprising a vacuum pipe having telescoping sections connected respectively to the vacuum chamber and the dip head, the inner telescoping section of said pipe being of substantially smaller diameter than the interior of the outer section, whereby an annular space is provided between the said sections, a packing gland connected to the outer section of said pipe, packing material held in position by said gland between the telescoping sections, and an aggregate of scouring balls within said annular space and confined between the packing material and the inner end of the inner section.

57. A machine for forming hollow glass articles comprising a mold, a knife mounted for movement across the mouth of the mold, a hydraulic motor, operating connections between the motor and the knife, and automatic means for actuating the motor, said connections comprising a cam, a cam roll, means operated independently of said motor for causing the cam roll to travel along a surface of the cam, the motor being operable to swing the cam during said travel of the cam roll therealong and cause it to move said roll in a direction transverse to its path of travel along the cam surface, and means for transmitting said movement of the cam roll to the knife and thereby effecting said movement of the knife across the mouth of the mold.

58. A machine of the suction gathering type for forming glass articles, comprising a mold, a cutter arranged to shear across the mouth of the mold, a travelling mold carriage on which the mold and cutter are mounted, a cam, a cam roll running thereon, operating connections between the cam roll and the cutter for actuating the latter, a swinging cam arm arranged to be engaged by said roll, and means for swinging said cam arm and thereby operating through said roll to impart an accelerated movement to the cutter.

59. A machine of the suction gathering type for forming glass articles, comprising a rotating mold carriage, a gathering mold thereon, a cutter mounted on the carriage and cooperating with the mold, cam means comprising a stationary cam section and a movable cam section, a cam roll mounted to travel with the carriage, operating connections between the cam roll and the cutter, said cam roll being arranged to engage said cam sections successively, and means for actuating said movable section and thereby accelerating the movement of the cam roll and the cutter.

60. The combination of a mold, a swinging cutter, a carriage on which said parts are mounted to travel, a cam comprising a stationary section and a movable section forming an extension thereof, a cam roll running on said sections and operatively connected to said cutter, said stationary cam section being arranged to impart an initial swinging movement to the cutter and said swinging section operable to accelerate and complete said movement of the cutter.

61. The combination of a mold, a swinging cutter, a carriage on which said parts are mounted to travel, a cam comprising a stationary section and a movable section forming an extension thereof, a cam roll running on said sections and operatively connected to said cutter, said stationary cam section being arranged to impart an initial swinging movement to the cutter and said swinging section operable to accelerate and complete said movement of the cutter, and a second stationary cam in the path of the cam roll and operable to shift the roll away from the first mentioned cam and thereby complete the swinging movement of the cutter upon failure of the said swinging cam section to operate.

62. An Owens type suction gathering machine comprising a rotating mold carriage, a suction gathering mold thereon, a cutter mounted to travel with the mold, means for moving the mold up and down on the carriage, a fluid operated motor, operating connections between the motor and said cutter, a valve controlling the supply of an operating fluid to the motor, and a locking device for the valve controlled by said up and down movements of the mold.

63. An Owens type suction gathering machine comprising a rotating mold carriage, a suction gathering mold thereon, a cutter mounted to travel with the mold, means for moving the mold up and down on the carriage, a fluid operated motor, operating connections between the motor and said cutter, and a valve controlling the supply of an operating fluid to the motor, said valve comprising a valve stem, a spring for moving said stem in one direction, a cam for moving said stem in the reverse direction, a latch for locking said stem and holding it against the tension of said spring, and means for automatically releasing the latch.

64. A machine for forming glass articles comprising a mold carriage, means for rotating the carriage about a vertical axis, a series of mold groups thereon, each comprising a suction gathering mold, cutters individual to the gathering molds and mounted to travel therewith, a piston motor having a stationary mounting, and means actuated by said piston motor for operating said cutters periodically and in succession.

65. A machine for forming glass articles comprising a mold carriage, means for rotating the carriage about a vertical axis, a series of mold groups thereon, each comprising a suction gathering mold, cutters individual to the gathering molds and mounted to travel therewith, a piston motor having a stationary mounting, means actuated by said piston motor for operating said cutters periodically and in succession, a valve controlling the operation of the piston motor, said valve comprising a stem movable in opposite directions for reversing the valve, stationary cams each arranged to operate the valve stem in one direction, means for locking the valve stem in said operated position, automatic means controlled by the movement of the mold carriage to release the valve stem, and spring means to operate said valve stem in the reverse direction.

66. The combination of a horizontally rotating mold carriage, an annular series of dip heads thereon, molds carried by the dip heads, cutters cooperating with the molds for severing mold charges, a piston motor having a stationary mounting, mechanism actuated by said motor for imparting a cutting stroke to each said cutter in succession, a valve controlling said motor and comprising a valve stem, spring means for moving the valve stem in one direction into position to supply operating fluid to one end of the motor piston and thereby actuate the motor for imparting a cutting stroke to a cutter, cams on the mold carriage individual to the dip heads for returning the valve stem, a latch for holding the valve stem in its returned position, and means for automatically releasing said latch and permitting the spring means to act.

67. The combination of a suction gathering mold, a cutter, a rock shaft on which the cutter is mounted, means for rocking said shaft and thereby swinging the cutter for severing mold charges, a cam, mechanism operated by the cam for lifting said shaft and cutter and holding the cutter in its lifted position during the cutting stroke, a piston motor operable to hold the cutter in said lifted position for a predetermined period after the cutting stroke, and means for then releasing the cutter from the control of said piston motor and permitting the cutter to drop by gravity.

68. The combination of a rotating mold carriage, a suction gathering mold thereon, a vertically disposed rock shaft, a cutter carried thereby, means for rocking said shaft and thereby swinging the cutter across the mouth of the mold, a stationary cam, a cam roll running thereon, operating connections between the cam roll and said shaft for causing said cam to lift the shaft and cutter, a piston motor operable to hold said shaft in its lifted position after it has passed beyond the control of said cam, and means for releasing the shaft from the control of the piston motor at a predetermined point during the travel of the mold carriage and thereby causing the cutter to be lowered.

69. A machine of the suction gathering type for forming glass articles, comprising a horizontally rotating mold carriage, dip heads thereon, gathering molds on the dip heads, means for lowering the dip heads in succession, gathering charges of glass by suction into the molds and lifting said heads, means for periodically reducing the speed of the mold carriage and causing it to travel at a relatively low speed during each charge gathering operation and then accelerating the speed, cam means comprising a stationary cam section and a movable cam section, cam rolls on the mold carriage arranged to run on said cam sections, cutters individual to the dip heads, operating connections between the cam rolls and cutters for actuating the latter, said cam rolls arranged to run on said movable cam section while the mold carriage is running at said reduced speed, and means for actuating said movable section while the cam rolls are running thereon and thereby accelerating the speed at which the cutters are operated.

70. A machine of the suction gathering type for forming glass articles, comprising a horizontally rotating mold carriage, dip heads thereon, gathering molds on the dip heads, means for lowering the dip heads in succession, gathering charges of glass by suction into the molds and lifting said heads, means for periodically reducing the speed of the mold carriage and causing it to travel at a relatively low speed during each charge gathering operation and then accelerating the speed, cam means comprising a stationary cam section and a movable cam section, cam rolls on the mold carriage arranged to run on said cam sections, cutters individual to the dip heads, operating connections between the cam rolls and cutters for actuating the latter, said cam rolls arranged to run on said movable cam section while the mold carriage is running at said reduced speed, a hydraulic motor operatively connected to said movable cam section, a valve controlling a supply of operating fluid to the motor for actuating the latter, and automatic means for periodically operating the valve and causing said motor to actuate the movable cam section during the periods of decelerated movement of the mold carriage.

71. A machine of the suction gathering type for forming glass articles, comprising a rotating mold carriage, a series of dip heads thereon, molds on the dip heads, means for lowering said heads in succession at a charge gathering station for gathering charges of glass into the molds, means for periodically decelerating the mold carriage and causing the molds to travel at a relatively slow speed during the charge gathering operation, cutters carried with the dip heads, hydraulic means for actuating the cutters while the molds are travelling at said reduced speed, and a stationary cam for actuating the cutters and controlling their movements during the intervals between said reduced speeds.

72. A machine for forming glass articles, comprising a rotating mold carriage, a series of molds therein, means for cracking each said mold at a predetermined point during its rotation with the mold carriage, and means for completing the opening movement of each mold at a predetermined position in advance of that in which the mold is cracked, and means individual to the molds for adjustably varying the point at which in the rotation of the mold carriage, each mold is cracked, independently of the points at which the other molds are cracked.

73. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, and means individual to the molds for adjustably varying the positions at which they are cracked and thereby adjustably varying the time intervals between said opening movements.

74. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, and means individual to the molds for adjustably varying the positions at which they are cracked and thereby adjustably varying the time intervals between said opening movements, said cracking mechanism comprising a movable cam slide and means individual to the molds and brought into operative relation to the cam slide in succession and actuated thereby for effecting said cracking of the blank molds.

75. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, and means individual to the molds for adjustably varying the positions at which they are cracked and thereby adjustably varying the time intervals between said opening movements, said blank cracking mechanism including a slide movable radially of the mold carriage and mechanism individual to said molds operable by said slide, said means for completing the opening movements of the molds operating independently of said slide.

76. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, and means individual to the molds for adjustably varying the positions at which they are cracked and thereby adjustably varying the time intervals between said opening movements, said blank cracking mechanism including a reciprocable element and cam rolls individual to the molds and brought singly and in succession into operating relation to said element by the rotation of the mold carriage, said means for completing the opening movements of the molds comprising a stationary cam track on which said rolls run during the completion of the mold opening movements, and operating connections between said cam rolls and the molds for effecting said mold opening movements.

77. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, means individual to the molds for adjustably varying the positions at which they are cracked and thereby adjustably varying the time intervals between said opening movements, the mold opening mechanism including an endless cam track comprising a fixed section and a movable section, cam rolls individual to the molds running on said track, and means for actuating said movable section while each cam roll is running thereon and thereby cracking the blank, said fixed section being so formed that it operates through the cam roll to complete the opening movements of the molds.

78. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, means individual to the molds for adjustably varying the positions at which they are cracked and thereby adjustably varying the time intervals between said opening movements, a fluid motor for operating the mold cracking mechanism, a valve controlling the operation of said motor, and means individual to the molds for actuating said valve.

79. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, a fluid motor for operating the mold cracking mechanism, a valve controlling the operation of said motor, cams individual to the mold units, operating connections between said cams and valve, and adjusting means individual to the cams and operable to adjustably vary the time at which each said cam operates the valve and thereby adjustably vary the time intervals between the cracking and final opening of each mold.

80. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, a hydraulic piston motor for operating the mold cracking mechanism, valve mechanism controlling said motor and comprising a valve plunger and a cushioning plunger, said valve plunger operable to control the supply of operating fluid to the motor and said cushioning plunger operable to throttle said flow and thereby cushion the movement of the motor piston and mechanism operated thereby, and means individual to the molds and cooperating with the valve mechanism for adjustably varying the positions at which the molds are cracked and thereby adjustably varying the time intervals between said opening movements.

81. A machine for molding glass articles, comprising a mold carriage, means for rotating it, a series of molds thereon, mechanism for cracking or slightly opening each mold when it reaches a predetermined position during its rotation with the carriage, means for completing the opening movement of each mold at a predetermined position beyond said cracking position, said mold cracking mechanism comprising a slide mounted to reciprocate, a piston motor operatively connected to said slide, a valve mechanism controlling the operation of the piston motor, said valve mechanism including a valve plunger and a cushoning plunger, means for operating the valve plunger and thereby effecting an operation of the piston motor and said slide, an operating connection between said slide and the cushioning plunger for actuating the latter, and means individual to the molds and cooperating with the valve mechanism for adjustably varying the positions at which the molds are cracked and thereby adjustably varying the time intervals between said opening movements.

82. A machine of the character described, comprising a mold carriage, means for rotating it horizontally, a vertical center column about which the carriage rotates, an annular series of units on the mold carriage, each comprising a dip head, a suction gathering mold thereon, mold opening and closing mechanism and means for blowing parisons in the mold, mechanism for lifting and lowering the dip heads singly and in succession, including a dip head lever having a stationary mounting above the dip head, a motor beneath the mold carriage, operating connections between the motor and said lever comprising a rod extending upward through the center column and pivoted to said lever, and means for operatively connecting said lever to each of the dip heads in succession.

83. A machine of the character described, comprising a mold carriage, means for rotating it horizontally, a vertical center column about which the carriage rotates, an annular series of units on the mold carriage, each comprising a dip head, a suction gathering mold thereon, mold opening and closing mechanism and means for blowing parisons in the mold, a vacuum chamber positioned above said units and comprising vertically spaced horizontal disk-shaped plates forming the upper and lower walls of said chamber, said plates mounted on said center column and extending outwardly therefrom a sufficient distance to position them directly over the dip heads and molds, vertical vacuum pipes comprising upper and lower telescoping sections, the upper sections fixed to and depending from the lower wall of said vacuum chamber and the lower sections connected to the dip heads adjacent to the molds to move up and down with the dip heads, said lower sections communicating with the molds for applying suction thereto, and valves between said lower sections and the molds controlling said application of suction to the molds.

84. A machine of the character described, comprising a mold carriage, means for rotating it horizontally, a vertical center column about which the carriage rotates, an annular series of units on the mold carriage, each comprising a dip head, a suction gathering mold thereon, mold opening and closing mechanism and means for blowing parisons in the mold, a vacuum chamber positioned above said units and comprising vertically spaced horizontal disk-shaped plates forming the upper and lower walls of said chamber, said plates mounted on said center column and extending outwardly therefrom a sufficient distance to position them directly over the dip heads and molds, valves mounted on the upper plate of the vacuum chamber for rotation therewith, stationary cams arranged to actuate said valves, and fluid motors controlled by said valves and individual to said units for operating parts comprised in said units.

85. A machine for forming glass articles, comprising a stationary center column, a mold carriage mounted to rotate about said column, molds on the carriage, devices cooperating with the molds for forming glass articles and delivering them from the molds, fluid motors for actuating said devices, said carriage comprising a horizontally disposed plate journaled on the center column above the molds, valves mounted on said plate and controlling the operations of said fluid motors, an arc-shaped hollow frame arranged concentric with said column, radially disposed arms carried on said column and supporting said frame, cams mounted on said hollow frame and controlling the operations of said valves, cam adjusting mechanism within said frame, and manual means for actuating said adjusting mechanism and thereby individually adjusting the cams.

86. A machine for forming hollow glass articles, comprising a mold, means for supplying air under pressure to the mold for blowing the glass therein, a cam, a valve traveling along the cam and controlling the supply of air to the mold, said cam operable to open the valve, a cam roll connected to travel with the valve and running on said cam and forming an operating connection between the cam and the valve, and means for causing the cam roll to run ahead in the direction of its travel with the valve as it passes beyond the peak of the cam and thereby cause the valve to close with a snap action.

87. In a machine for molding glass articles, the combination of a traveling mold carriage, a mold thereon, means for conducting air under pressure to the mold for blowing a parison therein, a valve travelling with the mold and controlling the air supply to the mold, said valve comprising a plunger movable in one direction to open the valve, a spring for returning said plunger to close the valve, a swinging arm or link pivoted to the valve plunger, a cam roll on said arm, and a stationary cam on which said roll runs and operable through said arm and plunger to open the valve, said arm being arranged to swing forwardly in the direction of its travel with the valve under the influence of said spring as the cam roll passes the peak of the cam and thereby permit the valve to be closed with a snap action under the influence of said spring.

88. A machine for forming hollow glass articles, comprising a rotating mold carriage, a mold thereon, an air pressure line extending to the mold for supplying air for blowing a parison of glass within the mold, a valve in said air line and travelling with the mold, a stationary cam shaped and arranged to momentarily open the valve a certain extent and permit a puff of air to the mold, means for then closing the valve, a second cam arranged to open the valve to a greater extent, a latch automatically actuated by said last opening of the valve to lock it in opened position, and automatic means for releasing the latch at a predetermined point in its travel with the mold.

89. A machine for forming hollow glass articles, comprising a vertical center column, a mold carriage mounted to rotate about the column, a base supporting the mold carriage, said base formed to provide an annular passageway leading upward therethrough, said mold carriage comprising a supporting and guiding frame formed to provide an annular series of conduits surrounding said column and having vertical walls extending upward from said base, said conduits being in communication with said annular passageway and forming substantially a vertical extension thereof, mold carrier units each comprising a mold supporting frame and a mold thereon, the outer vertical walls of said conduits being formed to provide an annular series of guiding surfaces for the mold supporting frames and interposed between said units and said center column, said mold supporting frames being formed to provide air chambers slidable up and down on said vertical walls, the walls of said slidable chambers and said conduits having openings in register, means for supplying cooling air and directing it through said annular passageway and conduits and from thence through said registered openings into said chambers, and means for directing the air from thence to the molds for cooling the latter.

90. A machine for forming hollow glass articles, comprising a vertical center column, a mold carriage mounted to rotate about the column, a base supporting the mold carriage, said base formed to provide an annular passageway leading upward therethrough, said mold carriage comprising a frame formed to provide an annular series of vertical conduits surrounding said column directly over and in communication with said annular passageway and forming substantially a continuation thereof, the outer walls of said conduits substantially completely surrounding said column, an annular series of sectional molds on the carriage, hollow arms carrying the mold sections, hollow carrier frames on which the mold arms are mounted, said carrier frames mounted for up and down sliding movement on said first mentioned frame with the inner walls of the carrier frames in sliding contact with said outer walls of the said conduits, and means for supplying cooling air through said annular passageway, said sliding frames and the mold arms, and directing the cooling air against the molds.

91. In a machine for forming hollow glass articles, the combination of a mold carriage, a mold thereon, mechanism for severing mold charges comprising a rock shaft and a knife thereon, a blow pipe positioned and arranged to direct cooling air against the knife, a valve controlling the supply of air to said pipe, means for rocking said shaft and knife, a device for opening and closing said valve, and means operated by the rock shaft for actuating said device.

92. In a machine for forming glass articles, the combination of a mold in which glass articles are formed, means for opening and closing the mold, and mechanism for holding an article during the opening of the mold, said mechanism comprising a rock shaft, a head thereon, means on the head for engaging said article, said rock shaft being mounted for reciprocating movement in the direction of its length and oscillation about its axis, a lever arranged to engage said rock shaft and move it in the direction of its length, cam means for oscillating the rock shaft when it is moved in the direction of its length, a cam, and a slide bar providing an operating connection between the said cam and said lever for actuating the latter.

93. In a machine for molding glass articles, the combination of a rotating mold carriage, a mold carrier mounted on the carriage for rotation therewith, a mold on said carrier, means for moving the carrier up and down on the carriage, means for opening the mold to discharge a molded article therefrom, mechanism mounted to move up and down with said carrier and operative to hold the article during the opening of the mold, a stationary cam for actuating said mechanism, and a motion transmitting device mounted on the carriage and brought into operative relation to the said mechanism by the downward movement of said mechanism and into operative relation to the cam by the rotation of the carriage, and thereby effecting an operative connection between the cam and said mechanism.

94. In a machine for molding glass articles, the combination of a rotating mold carriage, a mold carrier mounted on the carriage for rotation therewith, a mold on said carrier, means for moving the carrier up and down on the carriage, means for opening the mold to discharge a molded article therefrom, mechanism mounted to move up and down with said carrier and operative to hold the article during the opening of the mold, said mechanism comprising a rock shaft and means thereon for engaging and holding the molded article, a stationary cam, and means for effecting an operating connection between the cam and said rock shaft when the mold carrier is moved downward, said last mentioned means comprising a motion transmitting device mounted on the carriage and brought into operative relation to the said rock shaft by the downward movement of said mechanism and into operative relation to the cam by the rotation of the carriage.

95. In a machine for molding glass articles, the combination of a rotating mold carriage, a mold carrier mounted on the carriage for rotation therewith, a mold on said carrier, means for moving the carrier up and down on the carriage, means for opening the mold to discharge a molded article therefrom, mechanism for holding the article during the opening of the mold, said mechanism comprising a rock shaft and means thereon for engaging and holding the molded article, a stationary cam, and means for effecting an operating connection between the cam and said rock shaft when the mold carrier is moved downward, said last mentioned means including a lever, a roll carried on the rock shaft and arranged to be brought into the path of the lever as the mold carrier moves downward, and motion transmitting means between the cam and said lever.

96. A machine for molding glass articles, comprising a horizontally rotating mold carriage, an annular series of units mounted to rotate with the carriage, means for moving said units up and down on the carriage, each said unit comprising a mold carrier, a partible mold thereon and a device for holding a molded article during the opening movement of the mold, a stationary cam, and mechanisms individual to said units and mounted on the carriage separately from said units, said holding devices being brought into operative relation to said mechanisms by the downward movement of the corresponding said units, said mechanisms being arranged to be actuated in succession by said stationary cam.

97. A machine for molding glass articles, comprising a rotating mold carriage, a blank mold thereon, a hydraulic motor having operating connections with the blank mold for opening and closing the latter, a plunger valve controlling the supply of fluid pressure to said motor, a spring for moving the valve plunger in one direction, a cam operable to move the plunger in the opposite direction, a latch for automatically engaging and holding the plunger, and a cam operable at a predetermined point during the rotation of the carriage to operate the latch and release said plunger.

98. In a machine for forming glass articles the combination of a mold carriage, means for driving the carriage, a mold thereon, a cam, means for actuating the cam in synchronism with the movements of the mold carriage, mechanism providing operating connections between the cam and the mold, said cam being operative through said mechanism to effect periodic movements of the mold, and a motor connected to and operating said mechanism for effecting said movements of the mold, said mechanism including a lost motion connection between the motor and the cam.

99. A machine for forming glass articles comprising a mold carriage, means for driving the carriage, a mold on the carriage, a cam, motion transmitting mechanism forming operating connections between the cam and the mold through which mechanism the cam is operative to effect periodic movements of the mold, a motor connected to said mechanism and operative therethrough to effect said movements of the mold, and means providing a lost motion connection between said motor and cam, permitting the cam to be driven idly while the mold is held in a predetermined position on the mold carriage.

100. The combination of a mold carriage, means for rotating the carriage, a mold thereon, a cam, mechanism actuated by the cam for periodically lifting the mold and permitting the mold to be lowered by gravity, and means for locking the mold in its lifted position, said mechanism including a lost motion connection by which the cam is permitted to operate idly when the mold is locked in its lifted position.

101. The combination of a rotating mold carriage, a mold thereon movable up and down on the carriage, power devices, each operable to lift the mold when it reaches a predetermined point during its rotation with the carriage, motion-transmitting mechanism interposed between the mold and said power devices and common to both, said mechanism comprising a lost motion connection, permitting the mold to be lifted by either of said devices independently of power supplied by the other.

JOSEPH P. BENOIT.
CLARENCE C. KINKER.
RUSSELL G. ALLEN.
HAROLD A. ROHRICH.
CARL W. SCHREIBER.